US00RE43338E

(19) United States
(12) Reissued Patent
Murakami et al.

(10) Patent Number: US RE43,338 E
(45) Date of Reissued Patent: May 1, 2012

(54) MODULATION METHOD AND RADIO COMMUNICATION SYSTEM

(75) Inventors: Yutaka Murakami, Kadoma (JP); Masayuki Orihashi, Kadoma (JP); Akihiko Matsuoka, Kadoma (JP); Morikazu Sagawa, Kadoma (JP)

(73) Assignee: Panasonic Corporation, Osaka (JP)

(21) Appl. No.: 12/764,512

(22) Filed: Apr. 21, 2010

Related U.S. Patent Documents

Reissue of:
(64) Patent No.: 7,362,824
Issued: Apr. 22, 2008
Appl. No.: 09/240,632
Filed: Feb. 1, 1999

(30) Foreign Application Priority Data

Jan. 30, 1998 (JP) ..... 10-018593
Feb. 26, 1998 (JP) ..... 10-044983

(51) Int. Cl.
*H04L 27/20* (2006.01)

(52) U.S. Cl. ..... 375/308; 375/300; 375/302

(58) Field of Classification Search ..... 375/300, 375/302, 308, 261, 279, 281, 283, 298, 377; 370/321, 329, 442, 468
See application file for complete search history.

(56) References Cited

U.S. PATENT DOCUMENTS

| | | | | |
|---|---|---|---|---|
| 4,891,806 | A | 1/1990 | Farias et al. | 370/110.1 |
| 5,027,372 | A | 6/1991 | Wong | 375/67 |
| 5,313,494 | A * | 5/1994 | Park et al. | 375/295 |
| 5,535,215 | A | 7/1996 | Hieatt, III | 370/95.1 |
| 5,577,087 | A | 11/1996 | Furuya | 375/377 |
| 5,771,224 | A | 6/1998 | Seki et al. | 370/206 |
| 5,909,469 | A | 6/1999 | Frodigh et al. | 375/302 |
| 5,914,959 | A | 6/1999 | Marchetto et al. | 370/468 |
| 5,933,421 | A | 8/1999 | Alamouti et al. | 370/330 |
| 6,087,986 | A | 7/2000 | Shoki et al. | 342/383 |
| 6,125,148 | A | 9/2000 | Frodigh et al. | 375/261 |
| 6,393,064 | B1 * | 5/2002 | Nagai et al. | 375/259 |

FOREIGN PATENT DOCUMENTS

| | | |
|---|---|---|
| EP | 0 734 132 A2 | 9/1996 |
| JP | 7-297862 A | 11/1995 |
| JP | 08-265293 | 10/1996 |
| JP | 8-265293 A | 10/1996 |
| JP | 9-93302 A | 4/1997 |

OTHER PUBLICATIONS

European Search Report, for corresponding European Application No. 99101877.1, dated Jun. 17, 2002, 3 pages.
European Search Report, EP 99101877, Jun. 6, 2002, pp. 1-3.

* cited by examiner

*Primary Examiner* — Kevin Kim
(74) *Attorney, Agent, or Firm* — Seed IP Law Group PLLC

(57) ABSTRACT

An input digital signal is periodically and alternately subjected to first modulation and second modulation, being thereby converted into a pair of a baseband I signal and a baseband Q signal. The first modulation and the second modulation are different from each other. The pair of the baseband I signal and the baseband Q signal are outputted. The first modulation may be at least 8-signal-point modulation while the second modulation may be phase shift keying.

14 Claims, 46 Drawing Sheets

MODULATION METHOD AND RADIO COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a modulation method. This invention also relates to a radio communication system.

2. Description of the Related Art

Japanese published unexamined patent application 9-93302 discloses a digital radio communication system in which a transmitted signal is composed of a stream of frames each having N successive symbols. Here, N denotes a predetermined natural number. In every frame, the first and second symbols are pilot symbols of known data (fixed data), and the pilot symbols are followed by (N-2) symbols representing main information to be transmitted.

In the digital radio communication system of Japanese application 9-93302, since pilot symbols in every frame are composed of fixed data and are not used in the transmission of main information, they cause a decrease in the main-information transmission rate.

SUMMARY OF THE INVENTION

It is a first object of this invention to provide a modulation method which can prevent the occurrence of a decrease in an information transmission rate.

It is a second object of this invention to provide a radio communication system which can prevent the occurrence of a decrease in an information transmission rate.

A first aspect of this invention provides a method of modulation which comprises the steps of periodically and alternately subjecting an input digital signal to first modulation and second modulation to convert the input digital signal into a pair of a baseband I signal and a baseband Q signal, the first modulation and the second modulation being different from each other; and outputting the pair of the baseband I signal and the baseband Q signal.

A second aspect of this invention is based on the first aspect thereof, and provides a method wherein the first modulation is at least 8-signal-point modulation, and the second modulation is phase shift keying.

A third aspect of this invention is based on the second aspect thereof, and provides a method wherein the phase shift keying is quadrature phase shift keying.

A fourth aspect of this invention is based on the third aspect thereof, and provides a method wherein the quadrature phase shift keying provides signal points on an I axis and a Q axis in an I-Q plane.

A fifth aspect of this invention is based on the second aspect thereof, and provides a method wherein the at least 8-signal-point modulation is at least 8 quadrature amplitude modulation.

A sixth aspect of this invention is based on the fourth aspect thereof, and provides a method wherein the at least 8-signal-point modulation is at least 8 quadrature amplitude modulation.

A seventh aspect of this invention is based on the fifth aspect thereof, and provides a method wherein the at least 8 quadrature amplitude modulation is 16 quadrature amplitude modulation.

An eighth aspect of this invention is based on the sixth aspect thereof, and provides a method wherein the at least 8 quadrature amplitude modulation is 16 quadrature amplitude modulation.

A ninth aspect of this invention is based on the fifth aspect thereof, and provides a method wherein the at least 8 quadrature amplitude modulation provides signal points which result from rotation of signal points of at least 8-value normal quadrature amplitude modulation through an angle of $\pi/4$ radian about an origin in an I-Q plane.

A tenth aspect of this invention is based on the sixth aspect thereof, and provides a method wherein the at least 8 quadrature amplitude modulation provides signal points which result from rotation of signal points of at least 8-value normal quadrature amplitude modulation through an angle of $\pi/4$ radian about an origin in an I-Q plane.

An eleventh aspect of this invention is based on the seventh aspect thereof, and provides a method wherein the 16 quadrature amplitude modulation provides signal points which result from rotation of signal points of 16-value normal quadrature amplitude modulation through an angle of $\pi/4$ radian about an origin in an I-Q plane.

A twelfth aspect of this invention is based on the eighth aspect thereof, and provides a method wherein the 16 quadrature amplitude modulation provides signal points which result from rotation of signal points of 16-value normal quadrature amplitude modulation through an angle of $\pi/4$ radian about an origin in an I-Q plane.

A thirteenth aspect of this invention is based on the second aspect thereof, and provides a method wherein a maximum of amplitudes corresponding to signal points of the at least 8-signal-point modulation in an I-Q plane is equal to an amplitude of a signal point of the phase shift keying in the I-Q plane.

A fourteenth aspect of this invention is based on the seventh aspect thereof, and provides a method wherein a distance between signal points of the 16 quadrature amplitude modulation in an I-Q plane is equal to a given value times a distance between signal points of the phase shift keying in the I-Q plane, the given value being in a range of 0.9 to 1.5.

A fifteenth aspect of this invention is based on the seventh aspect thereof, and provides a method wherein a distance between signal points of the 16 quadrature amplitude modulation in an I-Q plane is equal to twice a distance between signal points of the phase shift keying in the I-Q plane.

A sixteenth aspect of this invention is based on the eighth aspect thereof, and provides a method wherein a distance between signal points of the 16 quadrature amplitude modulation in the I-Q plane is equal to $\sqrt{2}$ times a distance between signal points of the quadrature phase shift keying in the I-Q plane.

A seventeenth aspect of this invention is based on the second aspect thereof, and provides a method wherein the phase shift keying providing periodically-spaced symbols which represent corresponding portions of the input digital signal in terms of differences between phases of the periodically-spaced symbols.

An eighteenth aspect of this invention is based on the seventeenth aspect thereof, and provides a method wherein the at least 8-signal-point modulation assigns logic states of the input digital signal to respective signal points for a first symbol in response to a signal point used by a second symbol of the phase shift keying which precedes the first symbol.

A nineteenth aspect of this invention is based on the seventeenth aspect thereof, and provides a method wherein the at least 8-signal-point modulation is at least 8 quadrature amplitude modulation.

A twentieth aspect of this invention is based on the nineteenth aspect thereof, and provides a method wherein the at least 8 quadrature amplitude modulation is 16 quadrature amplitude modulation.

A twenty-first aspect of this invention is based on the nineteenth aspect thereof, and provides a method wherein the at least 8 quadrature amplitude modulation provides signal points which result from rotation of signal points of at least 8-value normal quadrature amplitude modulation through an angle of $\pi/4$ radian about an origin in an I-Q plane.

A twenty-second aspect of this invention is based on the twentieth aspect thereof, and provides a method wherein the 16 quadrature amplitude modulation provides signal points which result from rotation of signal points of 16-value normal quadrature amplitude modulation through an angle of $\pi/4$ radian about an origin in an I-Q plane.

A twenty-third aspect of this invention is based on the seventeenth aspect thereof, and provides a method wherein the phase shift keying is quadrature phase shift keying.

A twenty-fourth aspect of this invention is based on the twenty-third aspect thereof, and provides a method wherein the quadrature phase shift keying provides signal points on an I axis and a Q axis in an I-Q plane.

A twenty-fifth aspect of this invention is based on the first aspect thereof, and provides a method wherein the first modulation is 16 quadrature amplitude modulation, and the second modulation is quadrature phase shift keying.

A twenty-sixth aspect of this invention is based on the twenty-fifth aspect thereof, and provides a method wherein the 16 quadrature amplitude modulation provides signal points which result from rotation of signal points of 16-value normal quadrature amplitude modulation through an angle of $\pi/4$ radian about an origin in an I-Q plane.

A twenty-seventh aspect of this invention is based on the twenty-fifth aspect thereof, and provides a method wherein the quadrature phase shift keying provides signal points on an I axis and a Q axis in an I-Q plane.

A twenty-eighth aspect of this invention is based on the twenty-fifth aspect thereof, and provides a method wherein the 16 quadrature amplitude modulation provides signal points which result from rotation of signal points of 16-value normal quadrature amplitude modulation through an angle of $\pi/4$ radian about an origin in an I-Q plane, and the quadrature phase shift keying provides signal points on an I axis and a Q axis in the I-Q plane. A twenty-ninth aspect of this invention is based on the twenty-fifth aspect thereof, and provides a method wherein a maximum of amplitudes corresponding to signal points of the 16 quadrature amplitude modulation in an I-Q plane is equal to an amplitude of a signal point of the quadrature phase shift keying in the I-Q plane.

A thirtieth aspect of this invention is based on the twenty-fifth aspect thereof, and provides a method wherein a distance between signal points of the 16 quadrature amplitude modulation in an I-Q plane is equal to a given value times a distance between signal points of the quadrature phase shift keying in the I-Q plane, the given value being in a range of 0.9 to 1.5.

A thirty-first aspect of this invention is based on the twenty-fifth aspect thereof, and provides a method wherein a distance between signal points of the 16 quadrature amplitude modulation in an I-Q plane is equal to twice a distance between signal points of the quadrature phase shift keying in the I-Q plane.

A thirty-second aspect of this invention is based on the twenty-sixth aspect thereof, and provides a method wherein a distance between signal points of the 16 quadrature amplitude modulation in the I-Q plane is equal to $\sqrt{2}$ times a distance between signal points of the quadrature phase shift keying in the I-Q plane.

A thirty-third aspect of this invention provides a transmission apparatus comprising first means for periodically and alternately subjecting an input digital signal to first modulation and second modulation to convert the input digital signal into a pair of a baseband I signal and a baseband Q signal, the first modulation and the second modulation being different from each other, the first modulation being at least 8-signal-point modulation, the second modulation being phase shift keying; and second means for outputting the pair of the baseband I signal and the baseband Q signal.

A thirty-fourth aspect of this invention provides a reception apparatus comprising first means for recovering a pair of a baseband I signal and a baseband Q signal from a received signal; and second means for periodically and alternately subjecting the pair of the baseband I signal and the baseband Q signal to first demodulation and second demodulation to convert the pair of the baseband I signal and the baseband Q signal into an original digital signal; wherein the first demodulation is for signals of at least 8 signal points modulation, and the second demodulation is phase shift keying demodulation.

A thirty-fifth aspect of this invention provides a radio communication system comprising a transmission apparatus including a1) first means for periodically and alternately subjecting an input digital signal to first modulation and second modulation to convert the input digital signal into a pair of a baseband I signal and a baseband Q signal, the first modulation and the second modulation being different from each other, the first modulation being at least 8-signal-point modulation, the second modulation being phase shift keying; a2) second means for converting the pair of the baseband I signal and the baseband Q signal generated by the first means into a corresponding RF signal; and a3) third means for transmitting the RF signal generated by the second means; a reception apparatus including b1) fourth means for receiving the RF signal transmitted by the third means; b2) fifth means for recovering a pair of a baseband I signal and a baseband Q signal from the RF signal received by the fourth means; and b3) sixth means for periodically and alternately subjecting the pair of the baseband I signal and the baseband Q signal recovered by the fifth means to first demodulation and second demodulation to convert the pair of the baseband I signal and the baseband Q signal into an original digital signal; wherein the first demodulation is for signals of at least 8 signal points modulation, and the second demodulation is phase shift keying demodulation.

DESCRIPTION OF THE PREFERRED EMBODIMENTS

In the following description, $2^{2m}$-value QAM means $2^{2m}$QAM, and 16-value QAM means 16QAM and 16-value APSK means 16APSK.

First Embodiment

Figure 1:
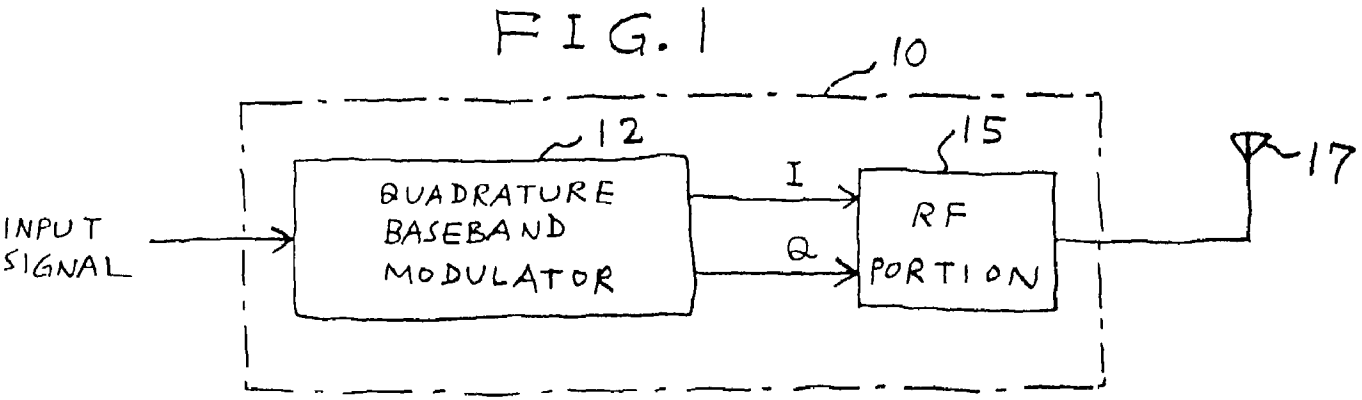
FIG. 1 is a block diagram of a transmitter in a radio communication system according to a first embodiment of this invention.

FIG. 1 shows a transmitter 10 in a radio communication system according to a first embodiment of this invention. With reference to FIG. 1, the transmitter 10 includes a modulator 12 and an RF (radio frequency) portion 15. The modulator 12 is defined and referred to as the quadrature baseband modulator 12.

A digital signal to be transmitted (that is, an input digital signal or main information to be transmitted) is fed to the quadrature baseband modulator 12. The device 12 subjects the input digital signal to quadrature baseband modulation, thereby converting the input digital signal into a pair of modulation-resultant baseband signals, that is, a baseband I (in-phase) signal and a baseband Q (quadrature) signal. The quadrature baseband modulator 12 outputs the baseband I signal and the baseband Q signal to the RF portion 15.

Figure 7:
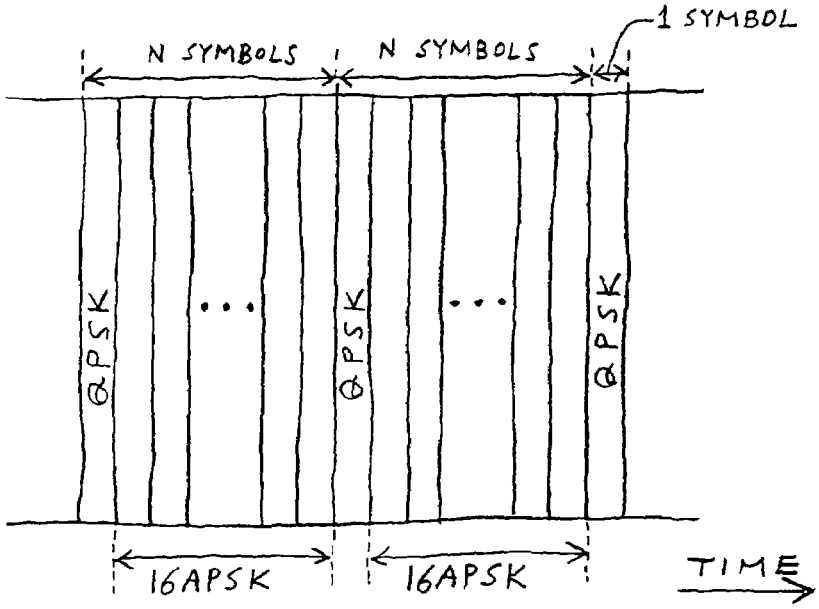
FIG. 7 is a time-domain diagram of a symbol stream.

As is well known in the art, a pair of modulated baseband I and Q signals is composed of (or contains) a stream of modulated symbols. According to the invention, the quadrature baseband modulator 12 outputs the baseband I and Q signals composed of a stream of modulated symbols as shown in FIG. 7. FIG. 7 shows an arrangement of a symbol stream according to the base concept of the invention. In FIG. 7, the symbol stream is basically composed of first symbols having been subjected to a first modulation scheme (16 APSK in the specific example of FIG. 7) and periodically includes second symbols having been subjected to a second modulation scheme (QPSK in the specific example of FIG. 7) which is different from the first modulation scheme. This enables a receiver to use each of the second symbols as a pilot symbol from which the amplitude distortion and the phase distortion can be estimated for use in demodulation of the second symbols following the first symbol. Many widely different embodiments of the quadrature baseband modulator 12 can be constructed. Some embodiments will be described in the followings.

The RF portion 15 converts the baseband I signal and the baseband Q signal into an RF signal through frequency conversion which may include RF modulation. The RF portion 15 feeds the RF signal to an antenna 17. The RF signal is radiated by the antenna 17.

Figure 2:
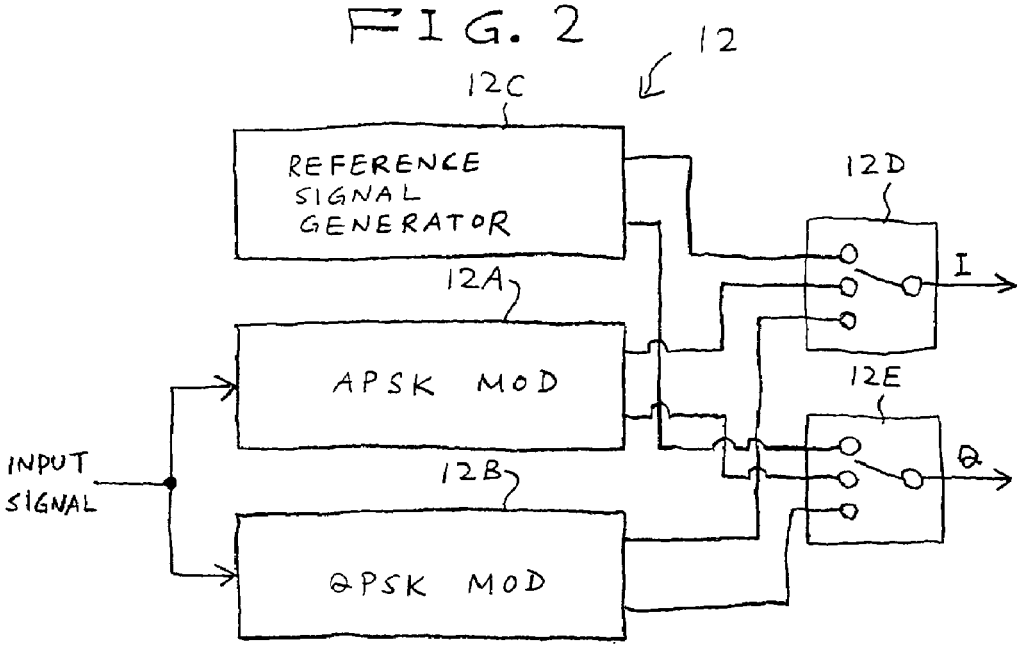
FIG. 2 is a block diagram of a modulator (a quadrature baseband modulator) in FIG. 1.

As shown in FIG. 2, the quadrature baseband modulator 12 includes a 16-value APSK (amplitude phase shift keying) modulator 12A, a QPSK (quadrature phase shift keying) modulator 12B, a reference signal generator 12C, and switches 12D and 12E.

The APSK modulator 12A and the QPSK modulator 12B receives the input digital signal. The device 12A subjects the input digital signal to 16APSK (16-value APSK modulation), thereby converting the input digital signal into a pair of a baseband I signal and a baseband Q signal. The APSK modulator 12A outputs the baseband I signal to the switch 12D. The APSK modulator 12A outputs the baseband Q signal to the switch 12E. The device 12B subjects the input digital signal to QPSK (QPSK modulation), thereby converting the input digital signal into a pair of a baseband I signal and a baseband Q signal. The QPSK modulator 12B outputs the baseband I signal to the switch 12D. The QPSK modulator 12B outputs the baseband Q signal to the switch 12E. The reference signal generator 12C outputs a reference baseband I signal to the switch 12D. The reference signal generator 12C outputs a reference baseband Q signal to the switch 12E. The output I and Q signals from the reference signal generator 12C are used in acquiring synchronization between the transmitter 10 and a receiver during an initial stage of signal transmission. The switch 12D selects one of the output I signal from the APSK modulator 12A, the output I signal from the QPSK modulator 12B, and the output I signal from the reference signal generator 12C, and transmits the selected I signal to the RF portion 15. The switch 12E selects one of the output Q signal from the APSK modulator 12A, the output Q signal from the QPSK modulator 12B, and the output Q signal from the reference signal generator 12C, and transmits the selected Q signal to the RF portion 15.

During an initial stage of signal transmission, the switch 12D selects the output I signal from the reference signal generator 12C while the switch 12E selects the output Q signal from the reference signal generator 12C. During an interval of time which follows the initial stage, the switch 12D alternately selects one of the output I signal from the APSK modulator 12A and the output I signal from the QPSK modulator 12B at a predetermined period, and transmits the selected I signal to the RF portion 15. During the time interval following the initial stage, the switch 12E alternately selects one of the output Q signal from the APSK modulator 12A and the output Q signal from the QPSK modulator 12B at the predetermined period, and transmits the selected Q signal to the RF portion 15.

Accordingly, with respect to the input digital signal, the quadrature baseband modulator 12 alternately implements the 16-value APSK modulation and the QPSK modulation at the predetermined period.

Figure 3:
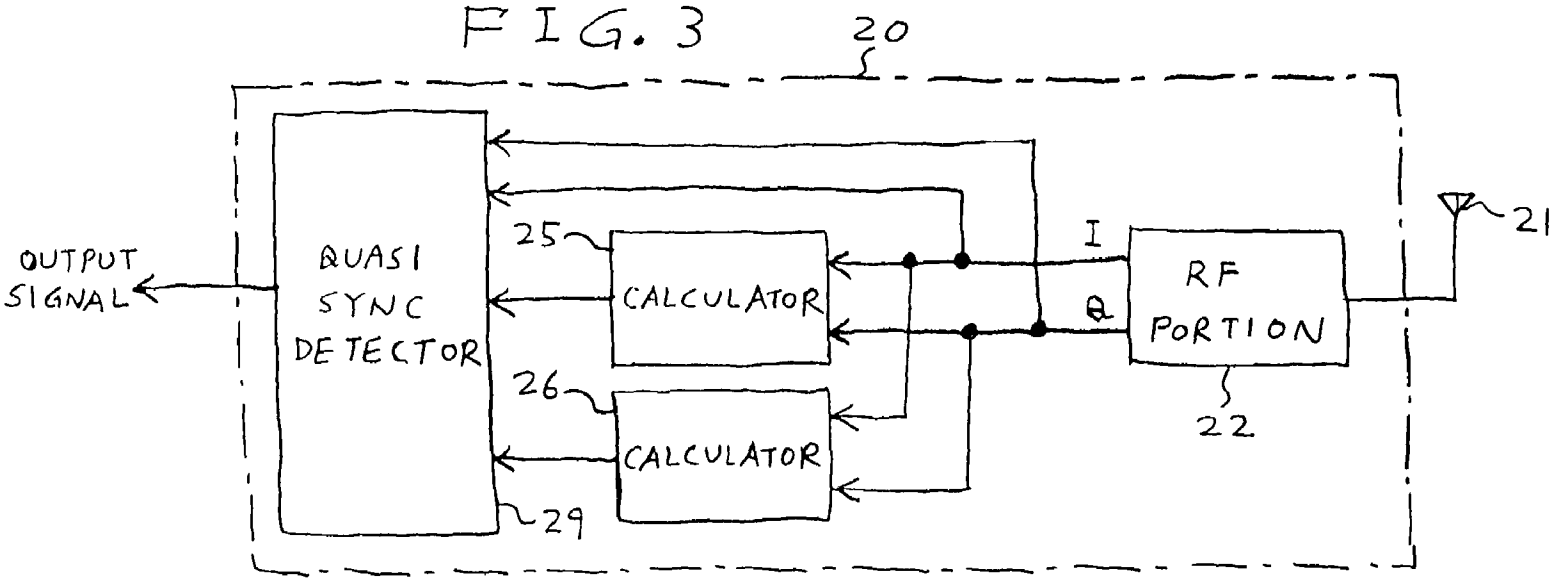
FIG. 3 is a block diagram of a receiver in the radio communication system according to the first embodiment of this invention.

FIG. 3 shows a receiver 20 in the radio communication system according to the first embodiment of this invention. With reference to FIG. 3, the receiver 20 includes an RF portion 22, calculators 25 and 26, and a quasi synchronous detector 29.

An RF signal caught by an antenna 21 is applied to the RF portion 22. The RF portion 22 subjects the applied RF signal to frequency conversion (which may include RF demodulation), thereby converting the applied RF signal into a pair of a baseband I signal and a baseband Q signal. The RF portion 22 outputs the baseband I signal and the baseband Q signal to the calculators 25 and 26, and the quasi synchronous detector 29.

The calculator 25 estimates an amplitude distortion amount from the baseband I signal and the baseband Q signal. The calculator 25 informs the quasi synchronous detector 29 of the estimated amplitude distortion amount. The calculator 26 estimates a frequency offset amount from the baseband I signal and the baseband Q signal. The calculator 26 informs the quasi synchronous detector 29 of the estimated frequency offset amount.

The device 29 subjects the baseband I signal and the baseband Q signal to quasi synchronous detection responsive to the estimated amplitude distortion amount and the estimated frequency offset amount, thereby demodulating the baseband I signal and the baseband Q signal into an original digital signal. Thus, the quasi synchronous detector 29 recovers the original digital signal from the baseband I signal and the baseband Q signal. The quasi synchronous detector 29 outputs the recovered original digital signal.

Figure 4:
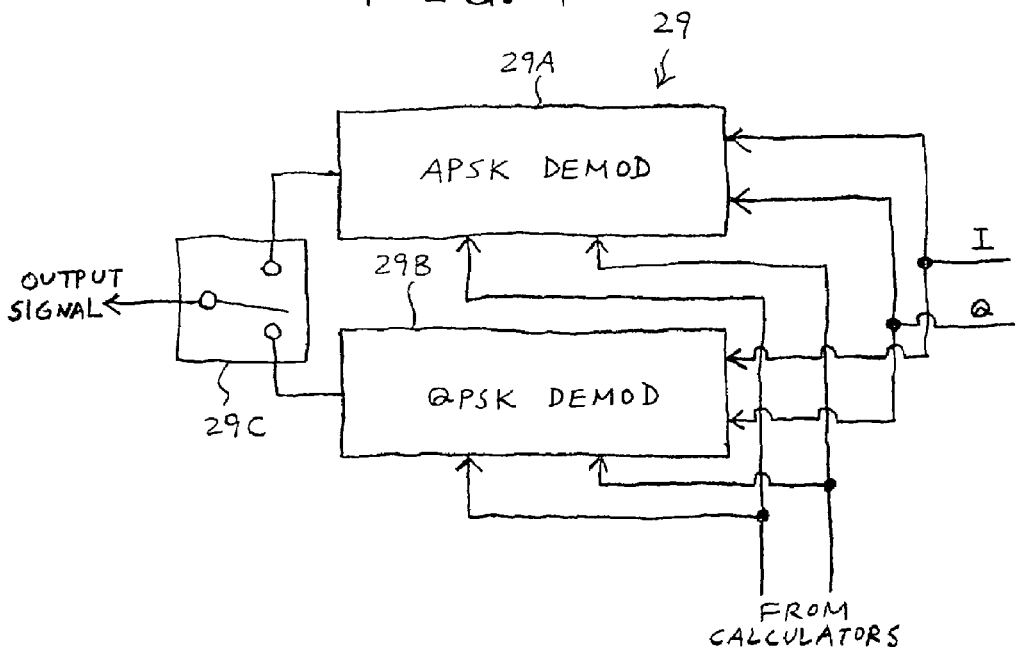
FIG. 4 is a block diagram of a quasi synchronous detector in FIG. 3.

As shown in FIG. 4, the quasi synchronous detector 29 includes a 16-value APSK demodulator 29A, a QPSK demodulator 29B, and a switch 29C.

The APSK demodulator 29A and the QPSK demodulator 29B receive the baseband I and Q signals from the RF portion 22. In addition, the APSK demodulator 29A and the QPSK demodulator 29B are informed of the estimated amplitude distortion amount and the estimated frequency offset amount by the calculators 25 and 26.

The device 29A subjects the baseband I signal and the baseband Q signal to 16-value APSK demodulation responsive to the estimated amplitude distortion amount and the estimated frequency offset amount, thereby demodulating the baseband I signal and the baseband Q signal into an original digital signal. Thus, the APSK demodulator 29A recovers the original digital signal from the baseband I signal and the baseband Q signal. The APSK demodulator 29A outputs the recovered original digital signal to the switch 29C.

The device 29B subjects the baseband I signal and the baseband Q signal to QPSK demodulation responsive to the estimated amplitude distortion amount and the estimated frequency offset amount, thereby demodulating the baseband I signal and the baseband Q signal into an original digital signal. Thus, the QPSK demodulator 29B recovers the original digital signal from the baseband I signal and the baseband Q signal. The QPSK demodulator 29B outputs the recovered original digital signal to the switch 29C.

The switch 29C alternately selects the output digital signal from the APSK demodulator 29A and the output digital signal from the QPSK demodulator 29B in response to a timing signal (a frame and symbol sync signal), and transmits the selected digital signal to a later stage. When the baseband I and Q signals outputted from the RF portion 22 to the quasi synchronous detector 29 correspond to a result of the 16-value APSK modulation, the switch 29C selects the output digital signal from the APSK demodulator 29A. When the I and Q signals outputted from the RF portion 22 to the quasi synchronous detector 29 correspond to a result of the QPSK modulation, the switch 29C selects the output digital signal from the QPSK demodulator 29B.

For example, the APSK demodulator 29A includes an amplitude correction circuit (an amplitude compensation circuit) and a frequency correction circuit (a frequency compensation circuit). The amplitude correction circuit compensates for an amplitude distortion of the baseband I signal and the baseband Q signal in response to the estimated amplitude distortion, thereby generating a first compensation-resultant baseband I signal and a first compensation-resultant baseband Q signal. The frequency correction circuit compensates for a frequency offset of the first compensation-resultant baseband I signal and the first compensation-resultant baseband Q signal in response to the estimated frequency offset amount, thereby generating a second compensation-resultant baseband I signal and a second compensation-resultant baseband Q signal. In the APSK demodulator 29A, the second compensation-resultant baseband I signal and the second compensation-resultant baseband Q signal are subjected to the 16-value APSK demodulation, being converted into the original digital signal.

For example, the QPSK demodulator 29B includes an amplitude correction circuit and a frequency correction circuit. The amplitude correction circuit compensates for an amplitude distortion of the baseband I signal and the baseband Q signal in response to the estimated amplitude distortion, thereby generating a first compensation-resultant baseband I signal and a first compensation-resultant baseband Q signal. The frequency correction circuit compensates for a frequency offset of the first compensation-resultant baseband I signal and the first compensation-resultant baseband Q signal in response to the estimated frequency offset amount, thereby generating a second compensation-resultant baseband I signal and a second compensation-resultant baseband Q signal. In the QPSK demodulator 29B, the second compensation-resultant baseband I signal and the second compensation-resultant baseband Q signal are subjected to the QPSK demodulation, being converted into the original digital signal.

Figure 5:
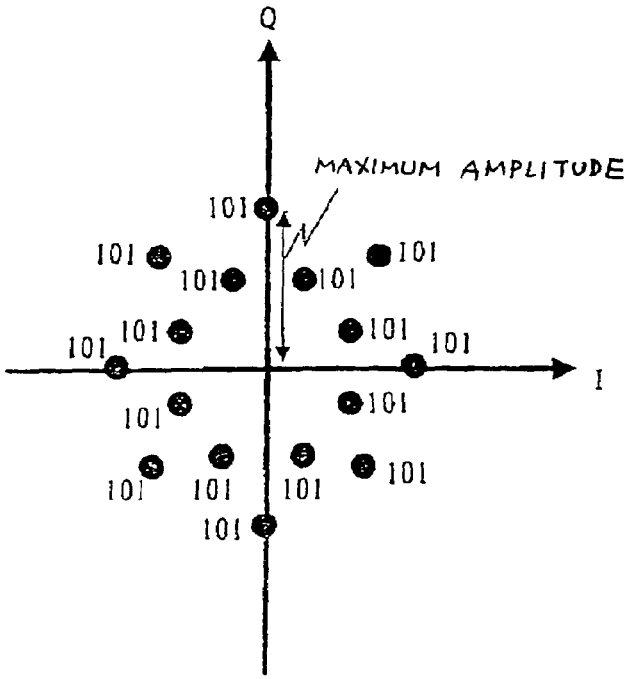
FIG. 5 is a diagram of an arrangement of 16 signal points in an I-Q plane which are provided by 16-value APSK.

FIG. 5 shows an arrangement of 16 signal points in an I-Q plane which are provided by the 16-value APSK modulation. In FIG. 5, the 16 signal points are denoted by the reference numeral "101". The 16 signal points are assigned to 16 different logic values respectively. The positions ($I_{16APSK}$, $Q_{16APSK}$) of the 16 signal points are given by the following equations.

$$I_{16APSK} = h0\left\{\cos\left(\frac{\pi}{8}\right)\cos\left(\frac{k\pi}{4}\right) - \sin\left(\frac{\pi}{8}\right)\sin\left(\frac{k\pi}{4}\right)\right\} + h1\cos\left(\frac{k\pi}{4}\right) \quad (1)$$

$$Q_{16APSK} = h0\left\{\cos\left(\frac{\pi}{8}\right)\cos\left(\frac{k\pi}{4}\right) + \sin\left(\frac{\pi}{8}\right)\cos\left(\frac{k\pi}{4}\right)\right\} + h1\sin\left(\frac{k\pi}{4}\right) \quad (2)$$

where "k" denotes a variable integer; (h0, h1)=(0, g1) or (h0, h1)=(g0, 0); "g0" and "g1" denote predetermined constants respectively; and the constant g1 is greater than the constant g0. With reference to FIG. 5, the signal points on the Q axis correspond to the maximum amplitude which is given by the constant g1.

Figure 6:
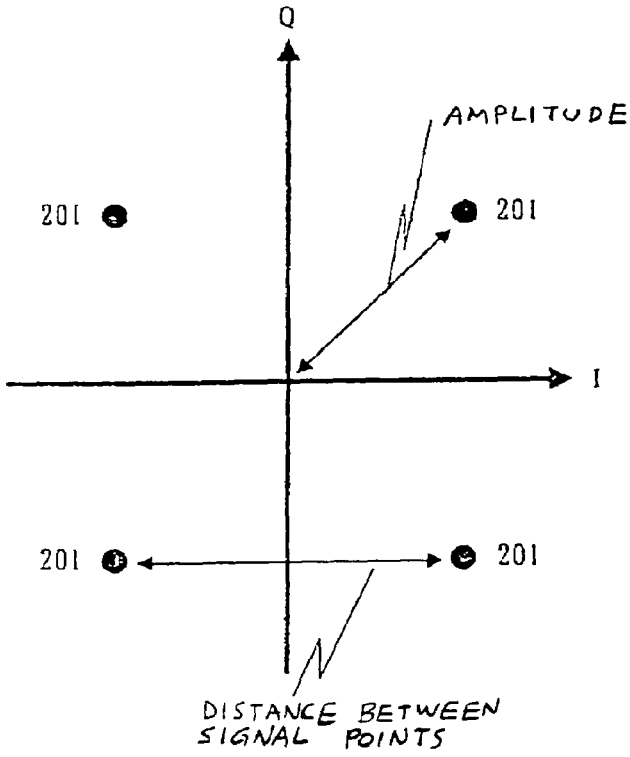
FIG. 6 is a diagram of an arrangement of signal points in an I-Q plane which are provided by QPSK.

FIG. 6 shows an arrangement of signal points in an I-Q plane which are provided by the QPSK modulation. In FIG. 6, the signal points are denoted by the reference numeral "201". The signal points are assigned to different logic values respectively. The positions ($I_{QPSK}$, $Q_{QPSK}$) of the signal points are given by the following equations.

$$I_Q PSK = p\left\{\cos\left(\frac{\pi}{4}\right)\cos\left(\frac{k\pi}{2}\right) - \sin\left(\frac{\pi}{4}\right)\sin\left(\frac{k\pi}{2}\right)\right\} \quad (3)$$

$$Q_Q PSK = p\left\{\cos\left(\frac{\pi}{4}\right)\sin\left(\frac{k\pi}{2}\right) + \sin\left(\frac{\pi}{4}\right)\cos\left(\frac{k\pi}{2}\right)\right\} \quad (4)$$

where "k" denotes a variable integer, and "p" denotes a predetermined constant. With reference to FIG. 6, all the signal points correspond to a same amplitude given by the constant "p". In addition, all the distances between the neighboring signal points are equal to a same value given by $\sqrt{2}p$. Furthermore, the signal points are spaced at equal angular intervals. Accordingly, a QPSK modulation-resultant signal is suited for detecting an amplitude distortion and a frequency offset.

With reference to FIG. 7, a pair of the I signal and the Q signal outputted from the quadrature baseband modulator 12 in the transmitter 10, or the RF signal outputted from the RF portion 15 in the transmitter 10 is composed of a stream of frames each having N successive symbols. Here, N denotes a predetermined natural number. In every frame, the first symbol results from the QPSK modulation, and the second and later symbols result from the 16-value APSK modulation. The first symbol in every frame (that is, the QPSK symbol in every frame) is used by the receiver 20 as a pilot symbol for estimating an amplitude distortion amount and a frequency offset amount. It should be noted that every pilot symbol also carries a part of the main information to be transmitted.

In the receiver 20, the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude g1 provided by the 16-value APSK modulation is equal to the amplitude "p" provided by the QPSK modulation. In this case, the amplitude distortion amount and the frequency offset amount can be accurately estimated.

The quasi synchronous detector 29 in the receiver 20 is designed to implement the following processes. The quasi synchronous detector 29 subjects the output I and Q signals of the RF portion 22 to the QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to the 16-value APSK demodulation and outputs the APSK-demodulation-resultant digital signal when the output I and Q signals of the RF portion 22 represent a normal symbol different from a pilot symbol.

Second Embodiment

A second embodiment of this invention is similar to the first embodiment thereof except for design changes indicated hereinafter.

Figure 8:
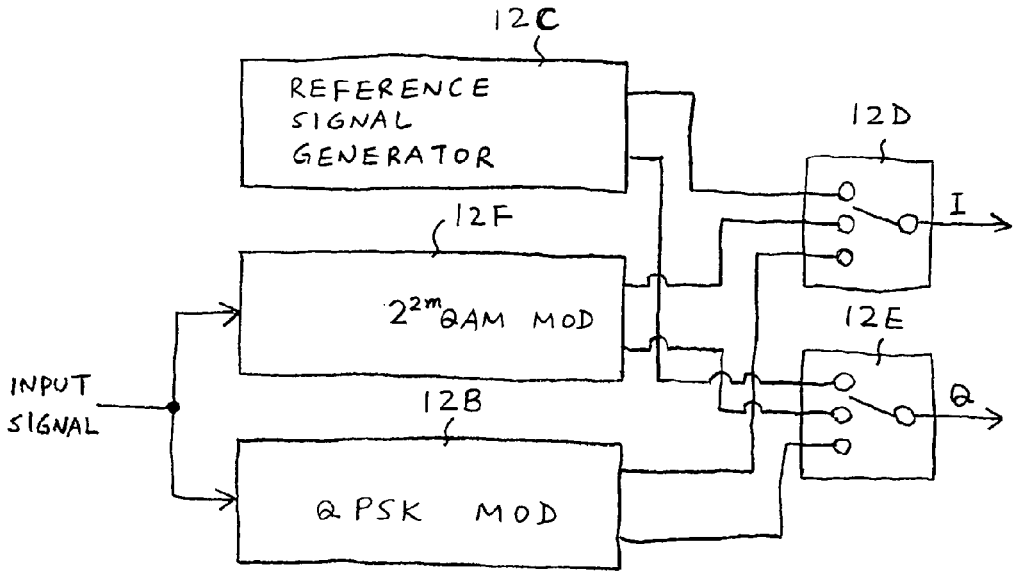
FIG. 8 is a bock diagram of a modulator (a quadrature baseband modulator) in a transmitter in a radio communication system according to a second embodiment of this invention.

As shown in FIG. 8, a modulator (a quadrature baseband modulator) in a transmitter in the second embodiment of this invention includes a $2^{2m}$QAM ($2^{2m}$-value QAM or $2^{2m}$-value quadrature amplitude modulation) modulator 12F instead of the 16-value APSK modulator 12A (see FIG. 2). Here, "m" denotes a predetermined integer equal to or greater than "2".

Figure 9:
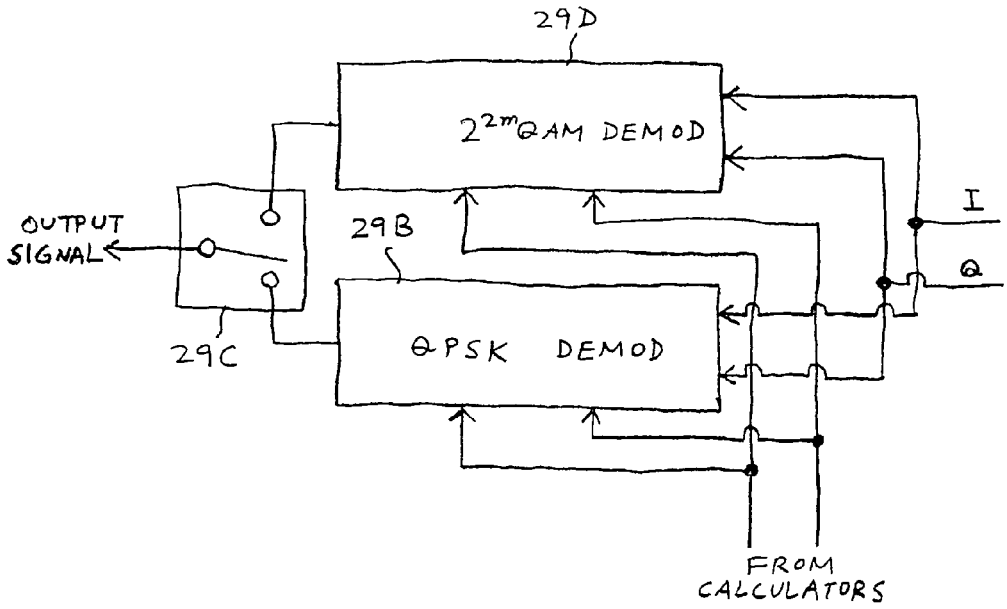
FIG. 9 is a bock diagram of a quasi synchronous detector in a receiver in the radio communication system according to the second embodiment of this invention.

As shown in FIG. 9, a quasi synchronous detector in a receiver in the second embodiment of this invention includes a $2^{2m}$-value QAM demodulator 29D instead of the 16-value APSK demodulator 29A (see FIG. 4).

Figure 10:
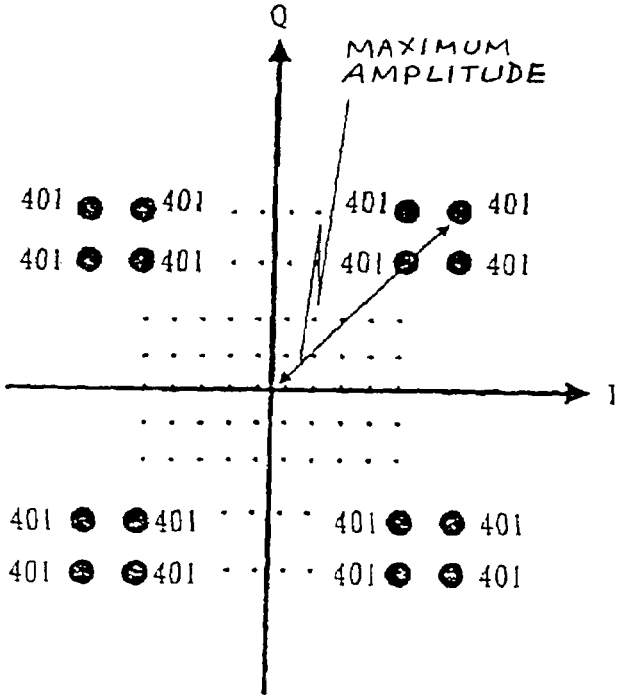
FIG. 10 is a diagram of an arrangement of signal points in an I-Q plane which are provided by $2^{2m}$QAM ($2^{2m}$-value QAM).

FIG. 10 shows an arrangement of signal points in an I-Q plane which are provided by $2^{2m}$-value QAM executed in the QAM modulator 12F. In FIG. 10, the signal points are denoted by the reference numeral "401". The signal points are assigned to different logic values respectively. The positions ($I_{QAM}$, $Q_{QAM}$) of the signal points are given by the following equations.

$$I_{QAM}=q(2^{m-1}a1+2^{m-2}a2+\ldots+2^{0}am) \quad (5)$$

$$Q_{QAM}=q(2^{m-1}b1+2^{m-2}b2+\ldots+2^{0}bm) \quad (6)$$

where "m" denotes a predetermined integer equal to or greater than "2"; (a1, b1), (a2, b2), . . . , (am, bm) are binary code words of "1" and "−1"; and "q" denotes a predetermined constant. With reference to FIG. 10, specified ones of the signal points correspond to the maximum amplitude which is given as follows.

$$(2^{m-1}+2^{m-2}+\ldots+2^{0})\sqrt{2}q \quad (7)$$

Figure 11:
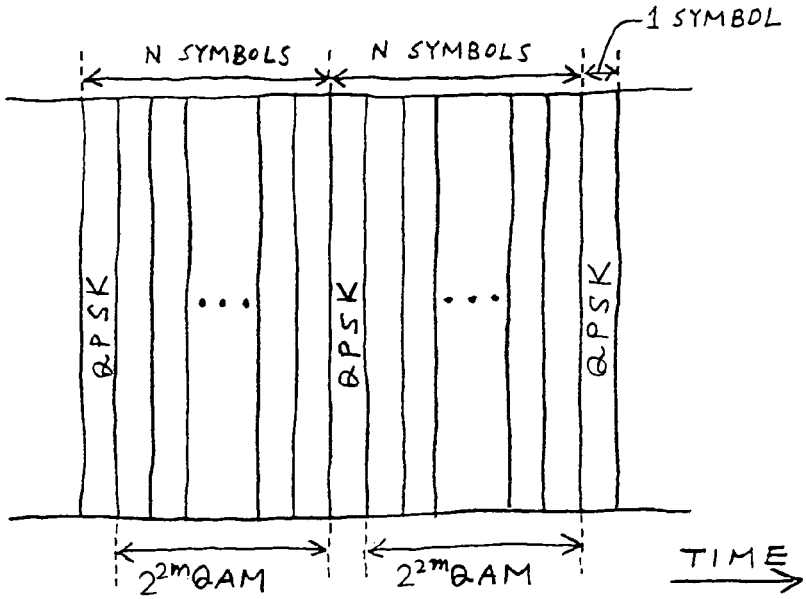
FIG. 11 is a time-domain diagram of a symbol stream.

With reference to FIG. 11, a pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the $2^{2m}$-value QAM, that is, the value given by the expression (7), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to $2^{2m}$-value QAM demodulation and outputs the QAM-demodulation-resultant digital signal when the output I and Q signals of the RF portion 22 represent a normal symbol different from a pilot symbol.

Third Embodiment

A third embodiment of this invention is similar to the second embodiment thereof except that 16-value QAM replaces $2^{2m}$-value QAM.

According to the third embodiment of this invention, a modulator (a quadrature baseband modulator) in a transmitter includes a 16-value QAM modulator instead of the $2^{2m}$-value QAM modulator 12F (see FIG. 8). In addition, a quasi synchronous detector in a receiver includes a 16-value QAM demodulator instead of the $2^{2m}$-value QAM demodulator 29D (see FIG. 9).

Figure 12:
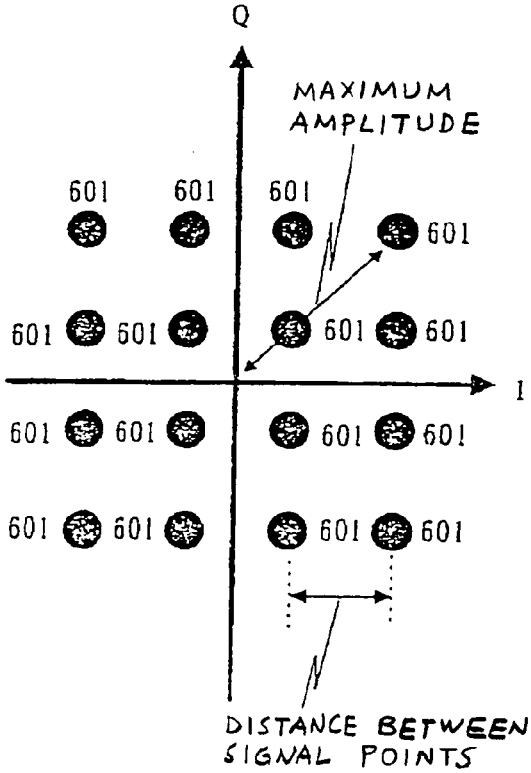
FIG. 12 is a diagram of an arrangement of signal points in an I-Q plane which are provided by 16QAM (16-value QAM).

FIG. 12 shows an arrangement of signal points in an I-Q plane which are provided by the 16-value QAM. In FIG. 12, the signal points are denoted by the reference numeral "601". The signal points are assigned to different logic values respectively. The positions ($I_{16QAM}$, $Q_{16QAM}$) of the signal points are given by the following equations.

$$I_{16QAM}=r(2^{1}a+2^{0}a2) \quad (8)$$

$$Q_{16QAM}=r(2^{1}b1+2^{0}b2 \quad (9)$$

where (a1, b1) and (a2, b2) are binary code words of "1" and "31 1", and "r" denotes a predetermined constant. With reference to FIG. 12, specified ones of the signal points correspond to the maximum amplitude which is given as follows.

$$(2^{1}+2^{0})\sqrt{2}r \quad (10)$$

In addition, the distances between the neighboring signal points are equal to a same value given by "2r".

Figure 13:
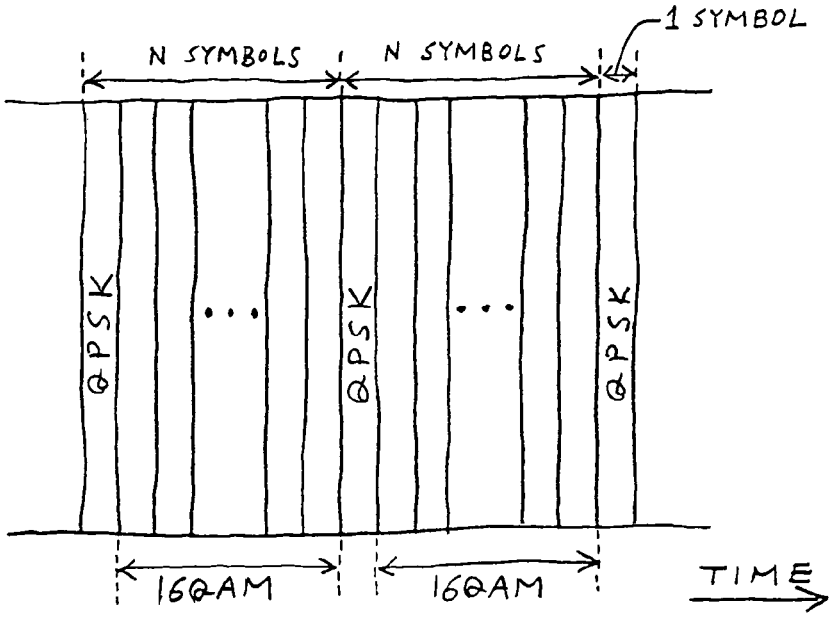
FIG. 13 is a time-domain diagram of a symbol stream.

With reference to FIG. 13, a pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 16-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

The inter-signal-point distance "$\sqrt{2p}$" in the QPSK modulation may be equal to twice the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Fourth Embodiment

A fourth embodiment of this invention is similar to the first embodiment thereof except for design changes indicated hereinafter.

Figure 14:
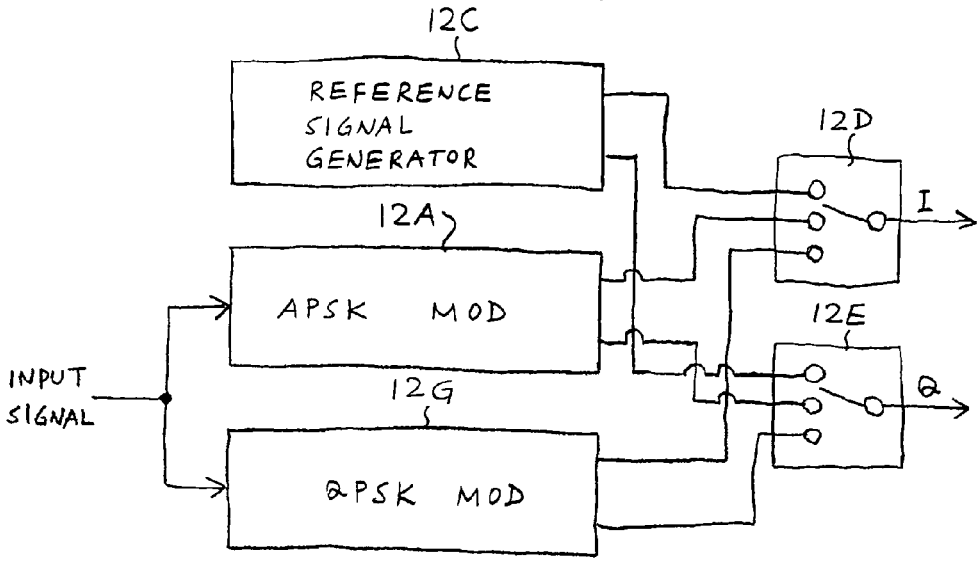
FIG. 14 is a block diagram of a modulator (a quadrature baseband modulator) in a transmitter in a radio communication system according to a fourth embodiment of this invention.

As shown in FIG. 14, a modulator (a quadrature baseband modulator) in a transmitter in the fourth embodiment of this invention includes a QPSK modulator 12G instead of the QPSK modulator 12B (see FIG. 2).

Figure 15:
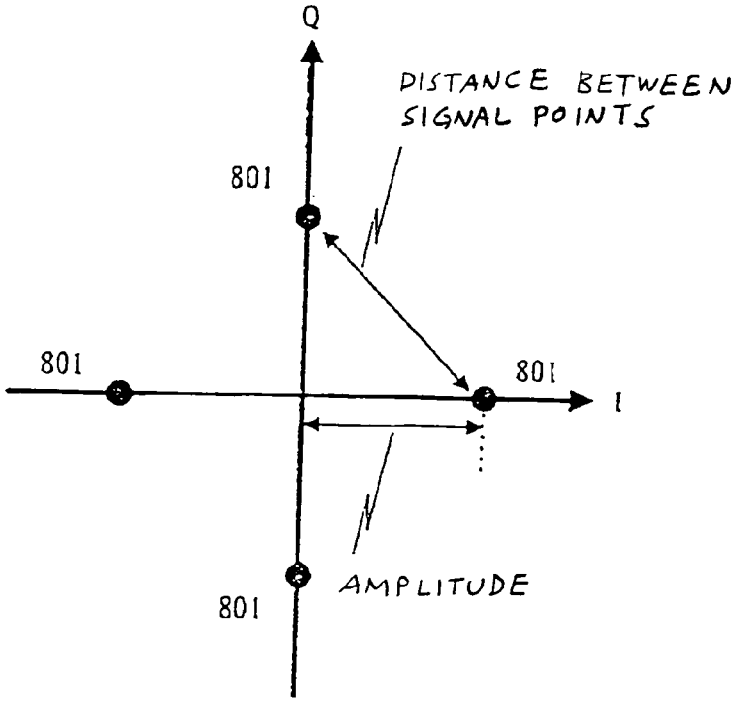
FIG. 15 is a diagram of an arrangement of signal points in an I-Q plane which are provided by QPSK.

FIG. 15 shows an arrangement of signal points in an I-Q plane which are provided by QPSK modulation implemented by the QPSK modulator 12G. In FIG. 15, the signal points are denoted by the reference numeral "801". The signal points are assigned to different logic values respectively. The positions ($I_{QPSKR}$, $Q_{QPSKR}$) of the signal points are given by the following equations.

$$I_Q\mathrm{PSKR} = I_Q\mathrm{PSK}\left\{\cos\left(\frac{\pi}{4} + \frac{n\pi}{2}\right)\right\} - Q_Q\mathrm{PSK}\left\{\sin\left(\frac{\pi}{4} + \frac{n\pi}{2}\right)\right\} \tag{11}$$

$$Q_Q\mathrm{PSKR} = I_Q\mathrm{PSK}\left\{\sin\left(\frac{\pi}{4} + \frac{n\pi}{2}\right)\right\}Q_Q\mathrm{PSK}\left\{\cos\left(\frac{\pi}{4} + \frac{n\pi}{2}\right)\right\} \tag{12}$$

where "n" denotes an integer, and ($I_{QPSK}$, $Q_{QPSK}$) are given by the equations (3) and (4). With reference to FIG. 15, all the signal points correspond to a same amplitude given by the constant "p". In addition, all the distances between the neighboring signal points are equal to a same value given by $\sqrt{2p}$. Furthermore, the signal points are spaced at equal angular intervals. Accordingly, a QPSK modulation-resultant signal is suited for detecting an amplitude distortion and a frequency offset.

Figure 16:
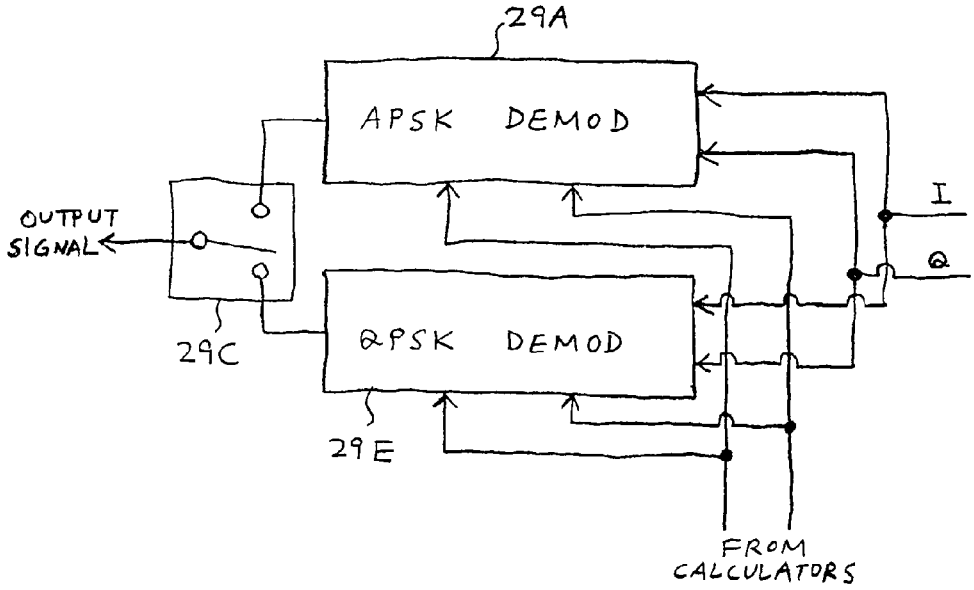
FIG. 16 is a block diagram of a quasi synchronous detector in a receiver in the radio communication system according to the fourth embodiment of this invention.

As shown in FIG. 16, a quasi synchronous detector in a receiver in the fourth embodiment of this invention includes a QPSK demodulator 29E instead of the QPSK demodulator 29B (see FIG. 4).

The QPSK demodulator 29E implements demodulation inverse with respect to the modulation by the QPSK modulator 12G.

A pair of the I signal and the Q signal outputted from the quadrature baseband modulator 12 in the transmitter 10 (see FIG. 1), or the RF signal outputted from the RF portion 15 in the transmitter 10 is composed of a stream of frames each having N successive symbols. Here, N denotes a predetermined natural number. In every frame, the first symbol results from the QPSK modulation, and the second and later symbols result from the 16-value APSK modulation. The first symbol in every frame (that is, the QPSK symbol in every frame) is used by the receiver 20 (see FIG. 3) as a pilot symbol for estimating an amplitude distortion amount and a frequency offset amount. It should be noted that every pilot symbol also carries a part of the main information to be transmitted.

In the receiver 20, the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude g1 provided by the 16-value APSK modulation is equal to the amplitude "p" provided by the QPSK modulation. In this case, the amplitude distortion amount and the frequency offset amount can be accurately estimated.

The quasi synchronous detector 29 in the receiver 20 is designed to implement the following processes. The quasi synchronous detector 29 subjects the output I and Q signals of the RF portion 22 to the QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to the 16-value APSK demodulation and outputs the APSK-demodulation-resultant digital signal when the output I and Q signals of the RF portion 22 represent a normal symbol different from a pilot symbol.

Fifth Embodiment

A fifth embodiment of this invention is similar to the second embodiment thereof except for design changes indicated hereinafter.

Figure 17:
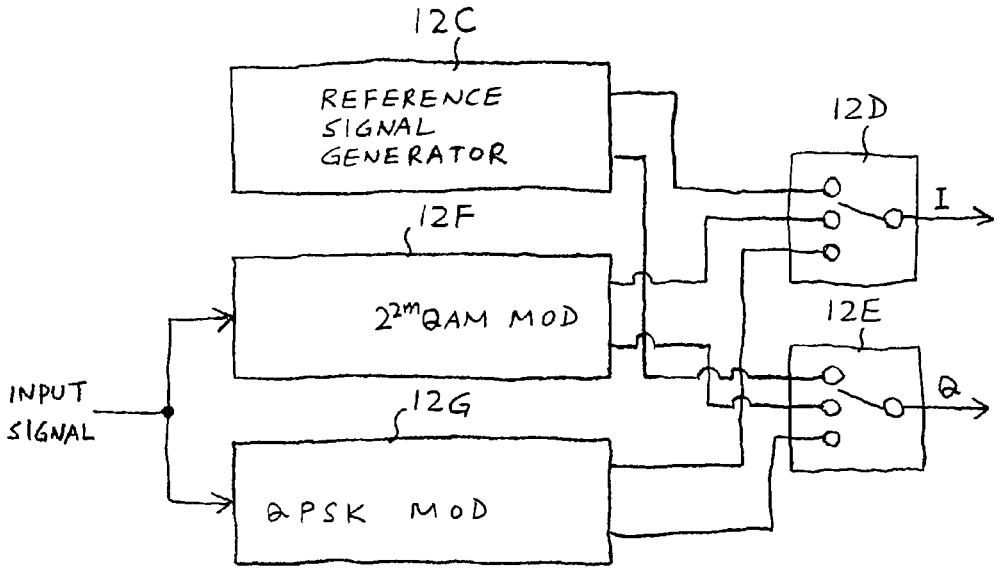
FIG. 17 is a block diagram of a modulator (a quadrature baseband modulator) in a transmitter in a radio communication system according to a fifth embodiment of this invention.

As shown in FIG. 17, a modulator (a quadrature baseband modulator) in a transmitter in the fifth embodiment of this invention includes a QPSK modulator 12G instead of the QPSK modulator 12B (see FIG. 8). The QPSK modulator 12G implements QPSK modulation providing signal points which are arranged in an I-Q plane as shown in FIG. 15.

Figure 18:
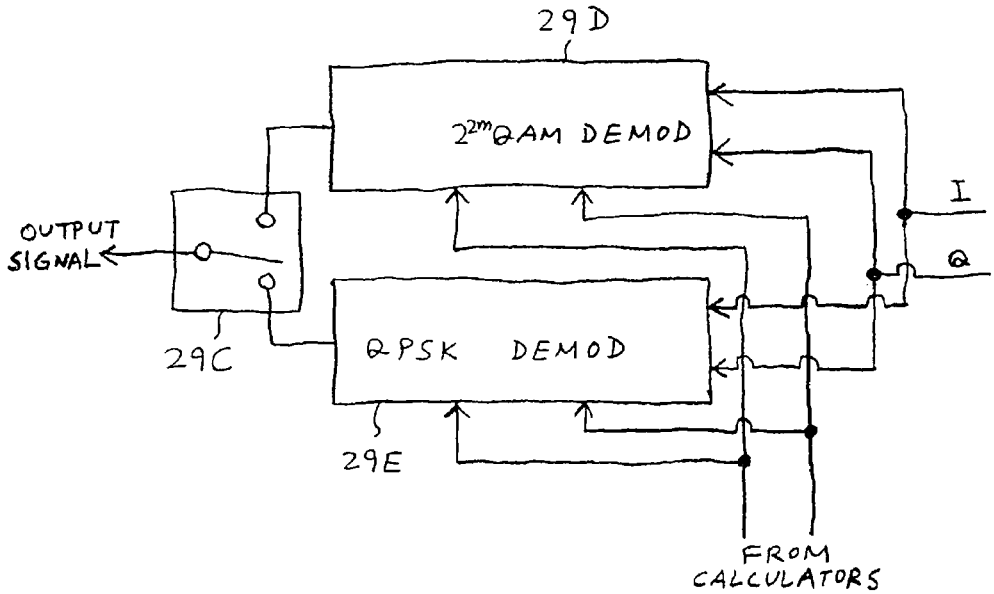
FIG. 18 is a block diagram of a quasi synchronous detector in a receiver in the radio communication system according to the fifth embodiment of this invention.

As shown in FIG. 18, a quasi synchronous detector in a receiver in the fifth embodiment of this invention includes a QPSK demodulator 29E instead of the QPSK demodulator 29B (see FIG. 9).

The QPSK demodulator 29E implements demodulation inverse with respect to the modulation by the QPSK modulator 12G.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the $2^{2m}$-value QAM, that is, the value given by the expression (7), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to $2^{2m}$-value QAM demodulation and outputs the QAM-demodulation-resultant digital signal when the output I and Q signals of the RF portion 22 represent a normal symbol different from a pilot symbol.

Sixth Embodiment

A sixth embodiment of this invention is similar to the fifth embodiment thereof except that 16-value QAM replaces $2^{2m}$-value QAM.

According to the sixth embodiment of this invention, a modulator (a quadrature baseband modulator) in a transmitter includes a 16-value QAM modulator instead of the $2^{2m}$-value QAM modulator 12F (see FIG. 17). The QAM modulator implements 16-value QAM providing signal points which are arranged in an I-Q plane as shown in FIG. 12. According to the sixth embodiment of this invention, a quasi synchronous detector in a receiver includes a 16-value QAM demodulator instead of the $2^{2m}$-value QAM demodulator 29D (see FIG. 18).

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 16-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2}$p" in the QPSK modulation is equal to a given value times the inter-signal-point distance "2r" in the 16-value QAM. Preferably, the given value is in the range of 0.90 to 1.50. In this case, a sufficiently low bit error rate is provided.

The inter-signal-point distance "$\sqrt{2}$p" in the QPSK modulation may be equal to twice the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Seventh Embodiment

A seventh embodiment of this invention is similar to the first embodiment thereof except for design changes indicated hereinafter.

Figure 19:
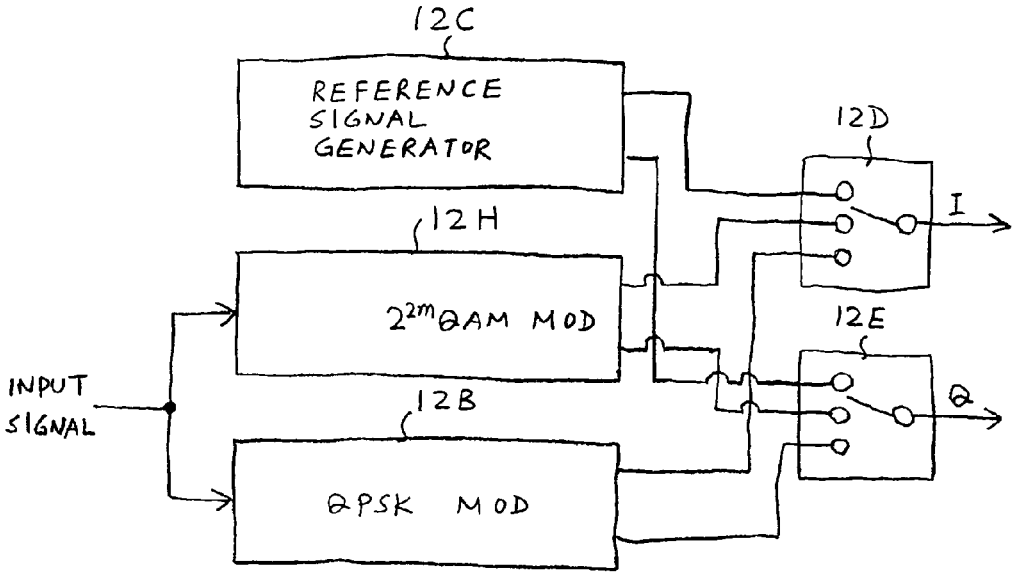
FIG. 19 is a block diagram of a modulator (a quadrature baseband modulator) in a transmitter in a radio communication system according to a seventh embodiment of this invention.

As shown in FIG. 19, a modulator (a quadrature baseband modulator) in a transmitter in the seventh embodiment of this invention includes a $2^{2m}$-value QAM modulator 12H instead of the 16-value APSK modulator 12A (see FIG. 2). Here, "m" denotes a predetermined integer equal to or greater than "2".

Figure 20:
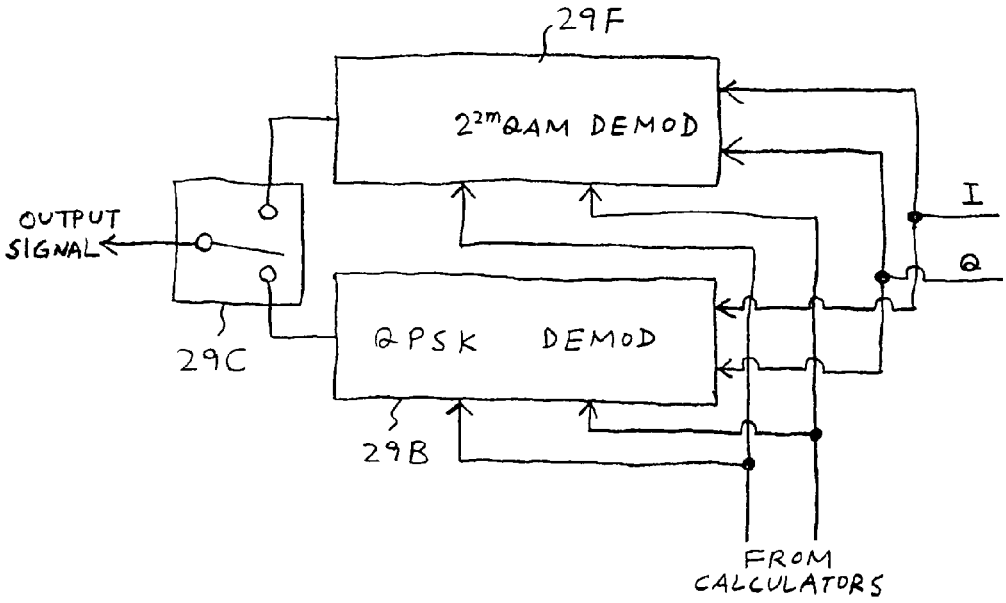
FIG. 20 is a block diagram of a quasi synchronous detector in a receiver in the radio communication system according to the seventh embodiment of this invention.

As shown in FIG. 20, a quasi synchronous detector in a receiver in the seventh embodiment of this invention includes a $2^{2m}$-value QAM demodulator 29F instead of the 16-value APSK demodulator 29A (see FIG. 4).

Figure 21:
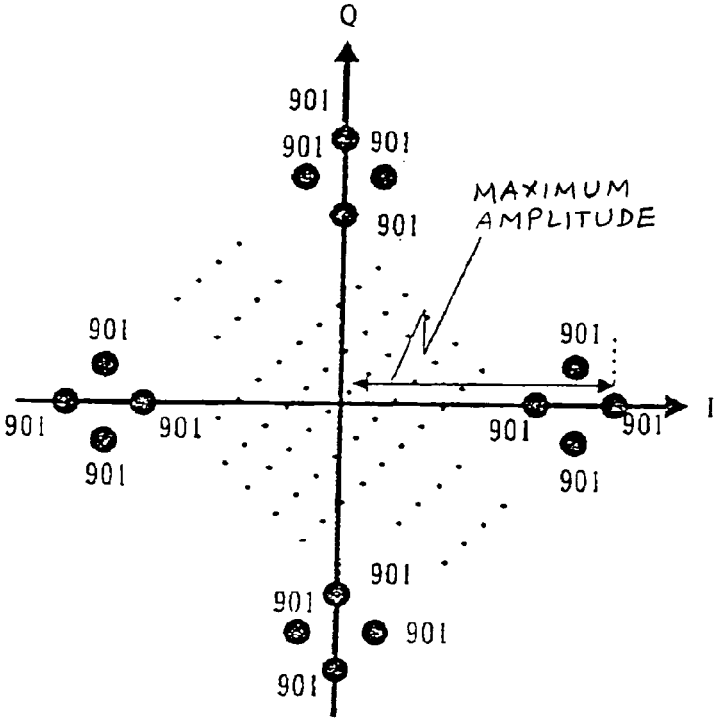
FIG. 21 is a diagram of an arrangement of signal points in an I-Q plane which are provided by $2^{2m}$QAM ($2^{2m}$-value QAM).

FIG. 21 shows an arrangement of signal points in an I-Q plane which are provided by $2^{2m}$-value QAM executed in the QAM modulator 12H. In FIG. 21, the signal points are denoted by the reference numeral "901". The signal points are assigned to different logic values respectively. The positions of the signal points in FIG. 21 result from rotation of the signal points in FIG. 10 through an angle of π/4 radian about the origin. Specifically, the positions ($I_{QAMR}$, $Q_{QAMR}$) of the signal points in FIG. 21 are given by the following equations.

$$I_Q AMR = I_Q AM\left\{\cos\left(\frac{\pi}{4} + \frac{n\pi}{2}\right)\right\} - Q_Q AM\left\{\sin\left(\frac{\pi}{4} + \frac{n\pi}{2}\right)\right\} \quad (13)$$

$$Q_{QAMR} = I_{QAM}\left\{\sin\left(\frac{\pi}{4} + \frac{n\pi}{2}\right)\right\} + Q_{QAM}\left\{\cos\left(\frac{\pi}{4} + \frac{n\pi}{2}\right)\right\} \quad (14)$$

where "n" denotes an integer, and ($I_{QAM}$, $Q_{QAM}$) are given by the equations (5) and (6). With reference to FIG. 21, the maximum amplitude which corresponds to specified ones of the signal points is equal to the value given by the expression (7).

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the $2^{2m}$-value QAM, that is, the value given by the expression (7), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to $2^{2m}$-value QAM demodulation and outputs the QAM-demodulation-resultant digital signal when the output I and Q signals of the RF portion 22 represent a normal symbol different from a pilot symbol.

Eighth Embodiment

An eighth embodiment of this invention is similar to the seventh embodiment thereof except that 16-value QAM replaces $2^{2m}$-value QAM.

According to the eighth embodiment of this invention, a modulator (a quadrature baseband modulator) in a transmitter includes a 16-value QAM modulator instead of the $2^{2m}$-value QAM modulator 12H (see FIG. 19). In addition, a quasi synchronous detector in a receiver includes a 16-value QAM demodulator instead of the $2^{2m}$-value QAM demodulator 29F (see FIG. 20).

Figure 22:
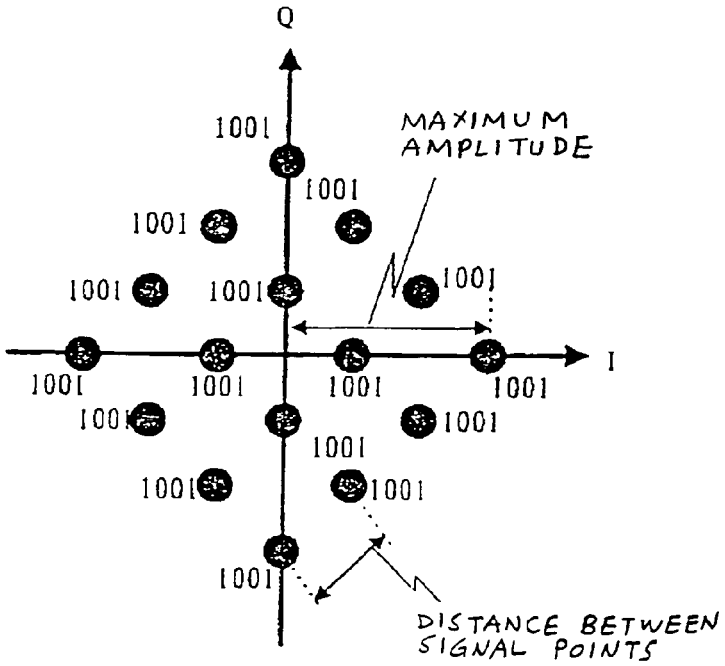
FIG. 22 is a diagram of an arrangement of signal points in an I-Q plane which are provided by 16QAM (16-value QAM).

FIG. 22 shows an arrangement of signal points in an I-Q plane which are provided by 16-value QAM executed in the 16-value QAM modulator. In FIG. 22, the signal points are denoted by the reference numeral "1001". The signal points are assigned to different logic values respectively. The positions of the signal points in FIG. 22 result from rotation of the signal points in FIG. 12 through an angle of π/4 radian about the origin. Specifically, the positions ($I_{16QAMR}$, $Q_{16QAMR}$) of the signal points in FIG. 22 are given by the following equations.

$$I_{16QAMR} = I_{16QAM}\left\{\cos\left(\frac{\pi}{4} + \frac{n\pi}{2}\right)\right\} - Q_{16QAM}\left\{\sin\left(\frac{\pi}{4} + \frac{n\pi}{2}\right)\right\} \quad (15)$$

$$Q_{16QAMR} = I_{16QAM}\left\{\sin\left(\frac{\pi}{4} + \frac{n\pi}{2}\right)\right\} + Q_{16QAM}\left\{\cos\left(\frac{\pi}{4} + \frac{n\pi}{2}\right)\right\} \quad (16)$$

where "n" denotes an integer, and ($I_{16QAM}$, $Q_{16QAM}$) are given by the equations (8) and (9). With reference to FIG. 22, the maximum amplitude which corresponds to specified ones of the signal points is equal to the value given by the expression (10). In addition, the distances between the neighboring signal points are equal to a same value given by "2r".

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 16-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

The inter-signal-point distance "$\sqrt{2p}$" in the QPSK modulation may be equal to "$\sqrt{2p}$" times the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Ninth Embodiment

A ninth embodiment of this invention is similar to the seventh embodiment thereof except for design changes indicated hereinafter.

Figure 23:
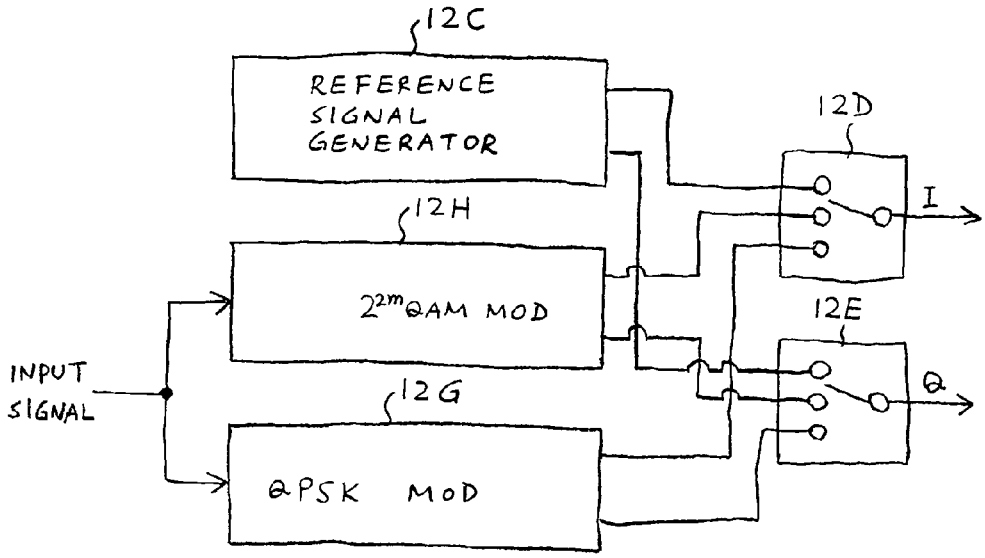
FIG. 23 is a block diagram of a modulator (a quadrature baseband modulator) in a transmitter in a radio communication system according to a ninth embodiment of this invention.

As shown in FIG. 23, a modulator (a quadrature baseband modulator) in a transmitter in the ninth embodiment of this invention includes a QPSK modulator 12G instead of the QPSK modulator 12B (see FIG. 19). The QPSK modulator 12G implements QPSK modulation providing signal points which are arranged in an I-Q plane as shown in FIG. 15.

Figure 24:
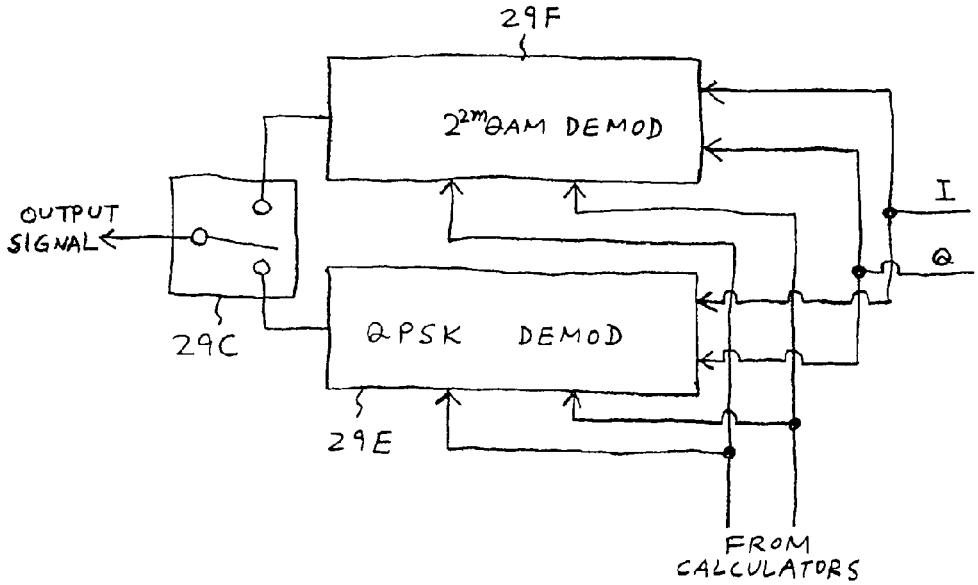
FIG. 24 is a block diagram of a quasi synchronous detector in a receiver in the radio communication system according to the ninth embodiment of this invention.

As shown in FIG. 24, a quasi synchronous detector in a receiver in the ninth embodiment of this invention includes a QPSK demodulator 29E instead of the QPSK demodulator 29B (see FIG. 20). The QPSK demodulator 29E implements demodulation inverse with respect to the modulation by the QPSK modulator 12G.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the $2^{2m}$-value QAM, that is, the value given by the expression (7), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to $2^{2m}$-value QAM demodulation and outputs the QAM-demodulation-resultant digital signal when the output I and Q signals of the RF portion 22 represent a normal symbol different from a pilot symbol.

Tenth Embodiment

A tenth embodiment of this invention is similar to the ninth embodiment thereof except that 16-value QAM replaces $2^{2m}$-value QAM.

According to the tenth embodiment of this invention, a modulator (a quadrature baseband modulator) in a transmitter includes a 16-value QAM modulator instead of the $2^{2m}$-value QAM modulator 12H (see FIG. 23). The 16-value QAM modulator implements 16-value QAM providing signal points which are arranged in an I-Q plane as shown in FIG. 22. According to the tenth embodiment of this invention, a quasi synchronous detector in a receiver includes a 16-value QAM demodulator instead of the $2^{2m}$-value QAM demodulator 29F (see FIG. 24). The 16-value QAM demodulator implements demodulation inverse with respect to the modulation by the 16-value QAM modulator.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 16-value QAM. The first symbol in every frame (that is, the QPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 3), the calculator 25 separates pilot symbols (first symbols in frames) from the output I and Q signals of the RF portion 22 in response to a signal (a frame and symbol sync signal) having a period corresponding to N symbols. The calculator 25 estimates an amplitude distortion amount from the separated pilot symbols. Similarly, the calculator 26 separates pilot symbols (first symbols in frames) from the output I and Q signals of the RF portion 22 in response to a signal (a frame and symbol sync signal) having a period corresponding to N symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

The inter-signal-point distance "°$\sqrt{2p}$" in the QPSK modulation may be equal to twice the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Eleventh Embodiment

An eleventh embodiment of this invention is similar to the third embodiment thereof except for design changes indicated hereinafter.

Figure 25:
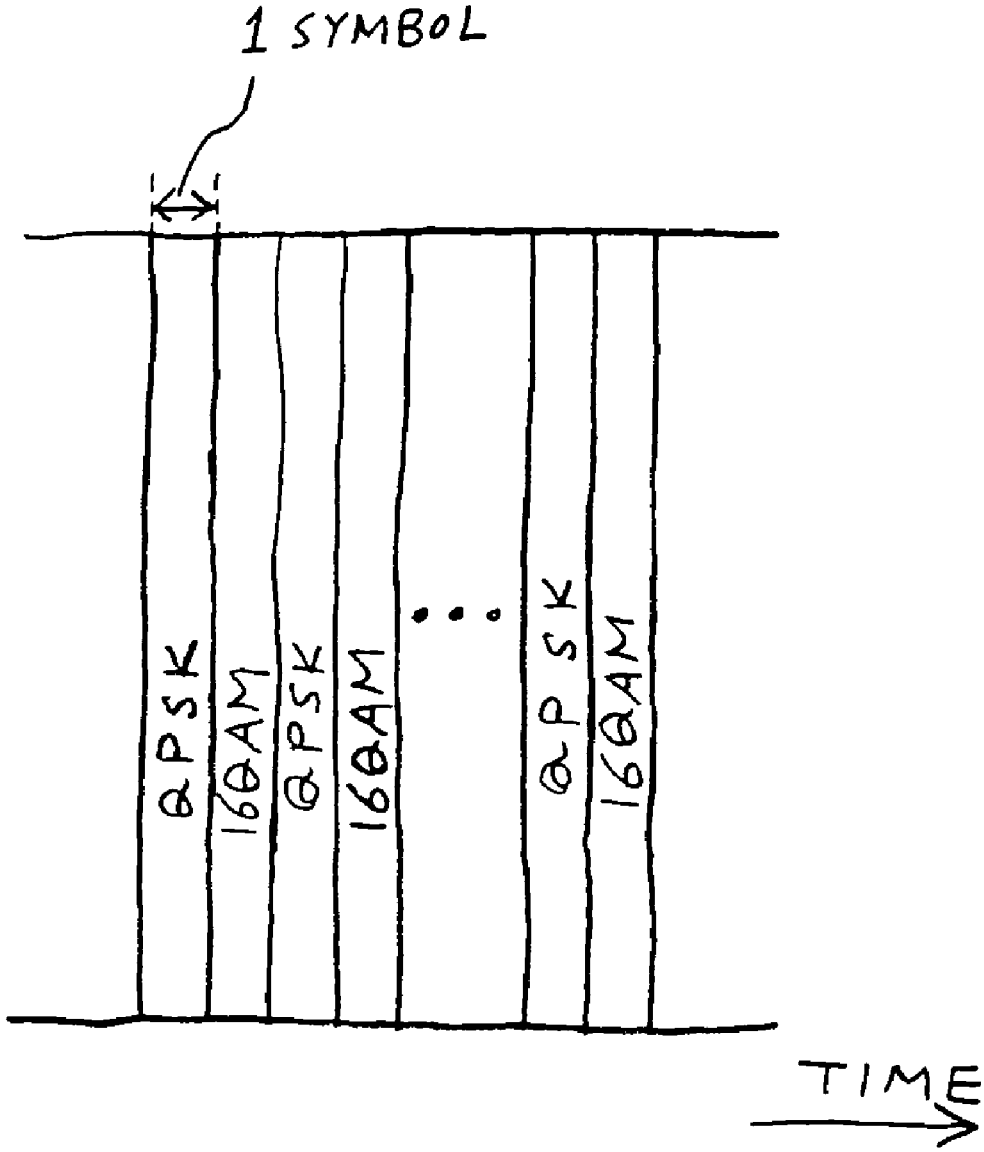
FIG. 25 is a time-domain diagram of a symbol stream.

With reference to FIG. 25, a pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, first alternate symbols result from the QPSK modulation, and second alternate symbols result from the 16-value QAM. The QPSK symbols in every frame are used by the receiver as pilot symbols for estimating an amplitude distortion amount and a frequency offset amount. It should be noted that every pilot symbol also carries a part of the main information to be transmitted.

In the receiver (see FIG. 3), the calculator 25 separates pilot symbols from the output I and Q signals of the RF portion 22 in response to a signal (a 2-symbol sync signal) having a period corresponding to two symbols. The calculator 25 estimates an amplitude distortion amount from the separated pilot symbols. Similarly, the calculator 26 separates pilot symbols from the output I and Q signals of the RF portion 22 in response to a signal (a 2-symbol sync signal) having a period corresponding to 2 symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

Figure 26:
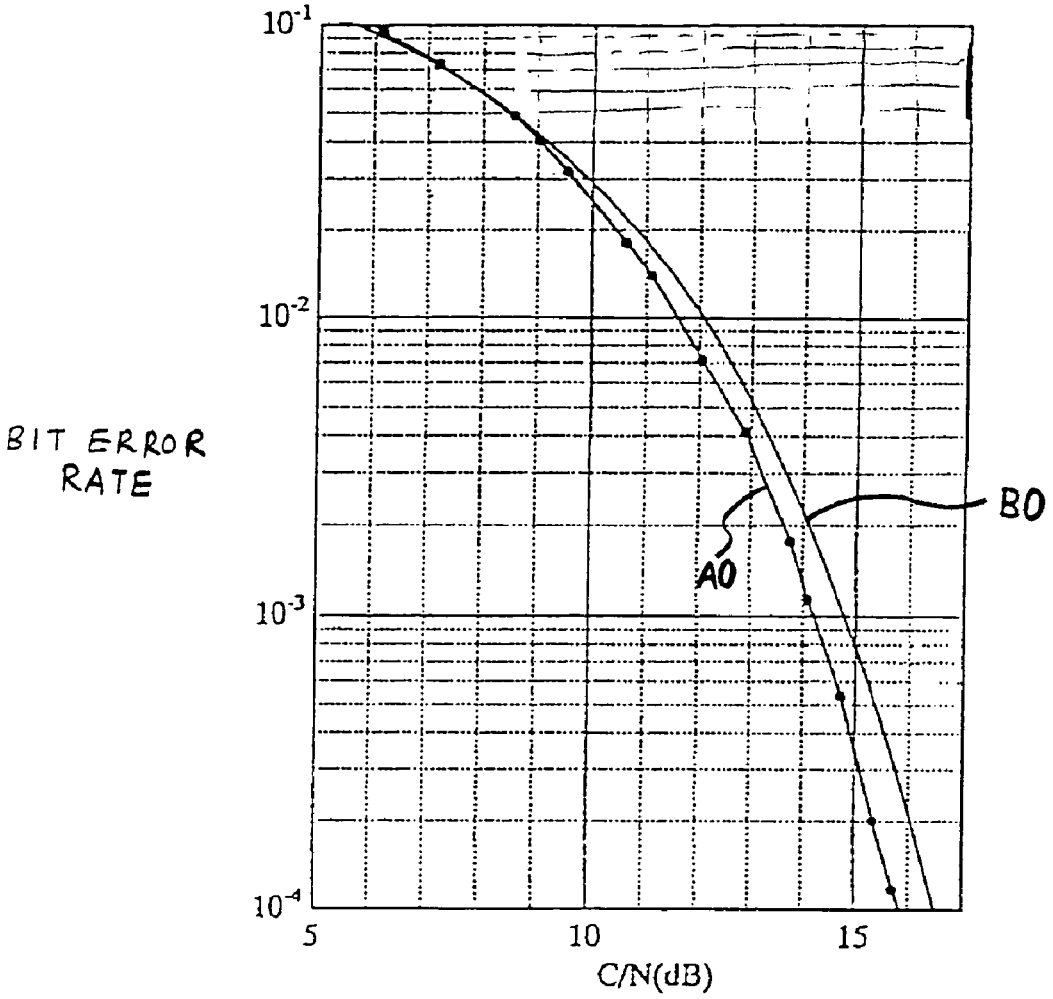
FIG. 26 is a diagram of the relation between the bit error rate and the carrier-to-noise power ratio which is provided in an eleventh embodiment of this invention, and the corresponding relation in a prior-art system.

With reference to FIG. 26, in the case where the inter-signal-point distance "$\sqrt{2p}$" in the QPSK modulation is equal to 1.20 times the inter-signal-point distance "2r" in the 16-value QAM, the bit error rate provided in the embodiment of this invention decreases along the curve A0 as the carrier-to-noise power ratio C/N increases. FIG. 26 also indicates a comparative example being the relation B0 between the bit error rate and the carrier-to-noise power ratio C/N which occurs in a prior-art 8PSK (8 or octonary phase shift keying) system. As shown in FIG. 26, the bit error rate (the curve A0) provided in the embodiment of this invention is better than that in the prior-art 8PSK system.

The inter-signal-point distance "$\sqrt{2p}$" in the QPSK modulation may be equal to twice the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Twelfth Embodiment

A twelfth embodiment of this invention is similar to the sixth embodiment thereof except for design changes indicated hereinafter.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, first alternate symbols result from the QPSK modulation, and second alternate symbols result from the 16-value QAM. The QPSK symbols in every frame are used by the receiver as pilot symbols for estimating an amplitude distortion amount and a frequency offset amount. It should be noted that every pilot symbol also carries a part of the main information to be transmitted.

In the receiver (see FIG. 3), the calculator 25 separates pilot symbols from the output I and Q signals of the RF portion 22 in response to a signal (a 2-symbol sync signal) having a period corresponding to two symbols. The calculator 25 estimates an amplitude distortion amount from the separated pilot symbols. Similarly, the calculator 26 separates pilot symbols from the output I and Q signals of the RF portion 22 in response to a signal (a 2-symbol sync signal) having a period corresponding to 2 symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

Figure 27:
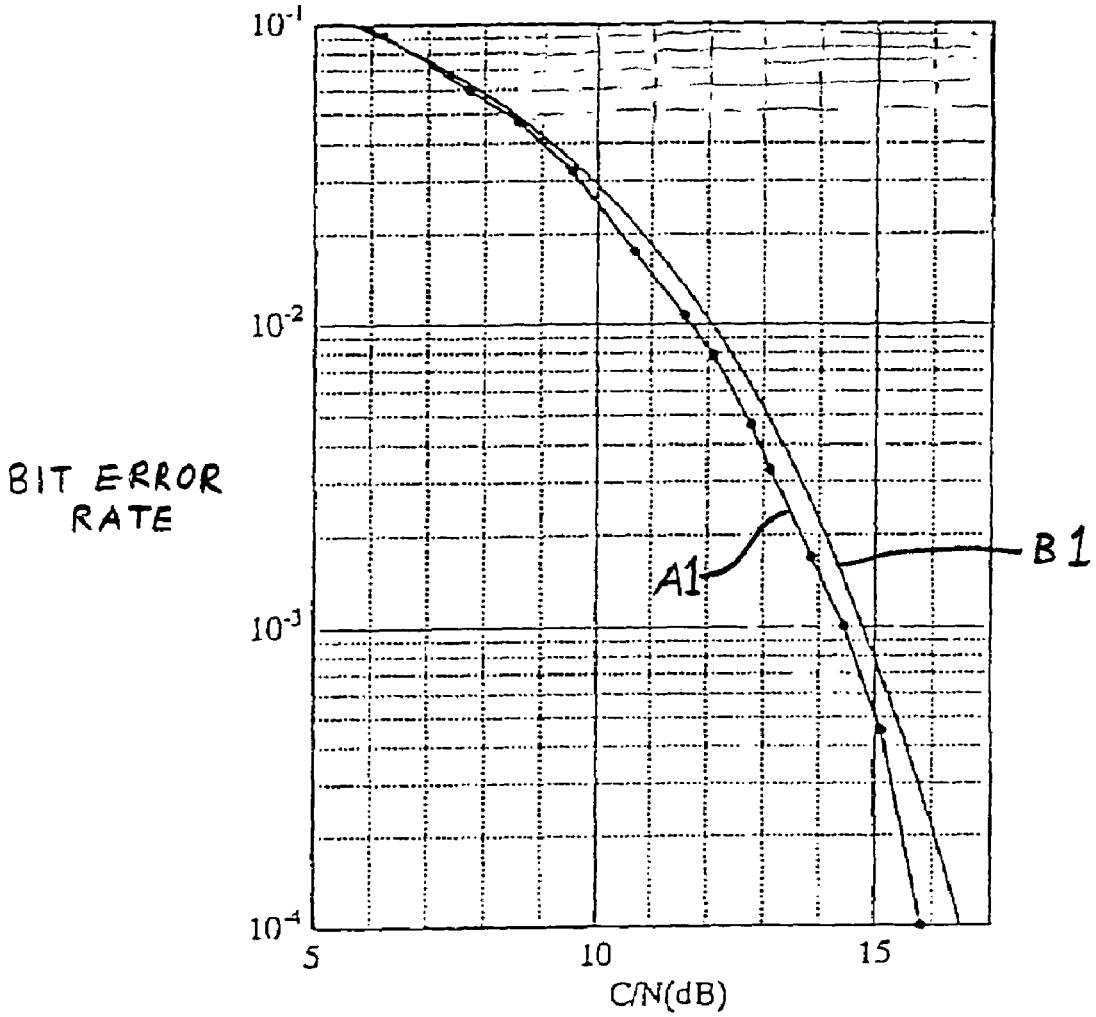
FIG. 27 is a diagram of the relation between the bit error rate and the carrier-to-noise power ratio which is provided in a twelfth embodiment of this invention, and the corresponding relation in a prior-art system.

With reference to FIG. 27, in the case where the inter-signal-point distance "$\sqrt{2p}$" in the QPSK modulation is equal to 1.20 times the inter-signal-point distance "2r" in the 16-value QAM, the bit error rate provided in the embodiment of this invention decreases along the curve A1 as the carrier-to-noise power ratio C/N increases. FIG. 27 also indicates a comparative example being the relation B1 between the bit error rate and the carrier-to-noise power ratio C/N which occurs in a prior-art 8PSK (8 or octonary phase shift keying) system. As shown in FIG. 27, the bit error rate (the curve A1) provided in the embodiment of this invention is better than that in the prior-art 8PSK system.

The inter-signal-point distance "$\sqrt{2p}$" in the QPSK modulation may be equal to "$\sqrt{2}$" times the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Thirteenth Embodiment

A thirteenth embodiment of this invention is similar to the eighth embodiment thereof except for design changes indicated hereinafter.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, first alternate symbols result from the QPSK modulation, and second alternate symbols result from the 16-value QAM. The QPSK symbols in every frame are used by the receiver as pilot symbols for estimating an amplitude distortion amount and a frequency offset amount. It should be noted that every pilot symbol also carries a part of the main information to be transmitted.

In the receiver (see FIG. 3), the calculator 25 separates pilot symbols from the output I and Q signals of the RF portion 22 in response to a signal (a 2-symbol sync signal) having a period corresponding to two symbols. The calculator 25 estimates an amplitude distortion amount from the separated pilot symbols. Similarly, the calculator 26 separates pilot symbols from the output I and Q signals of the RF portion 22 in response to a signal (a 2-symbol sync signal) having a period corresponding to 2 symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

Figure 28:
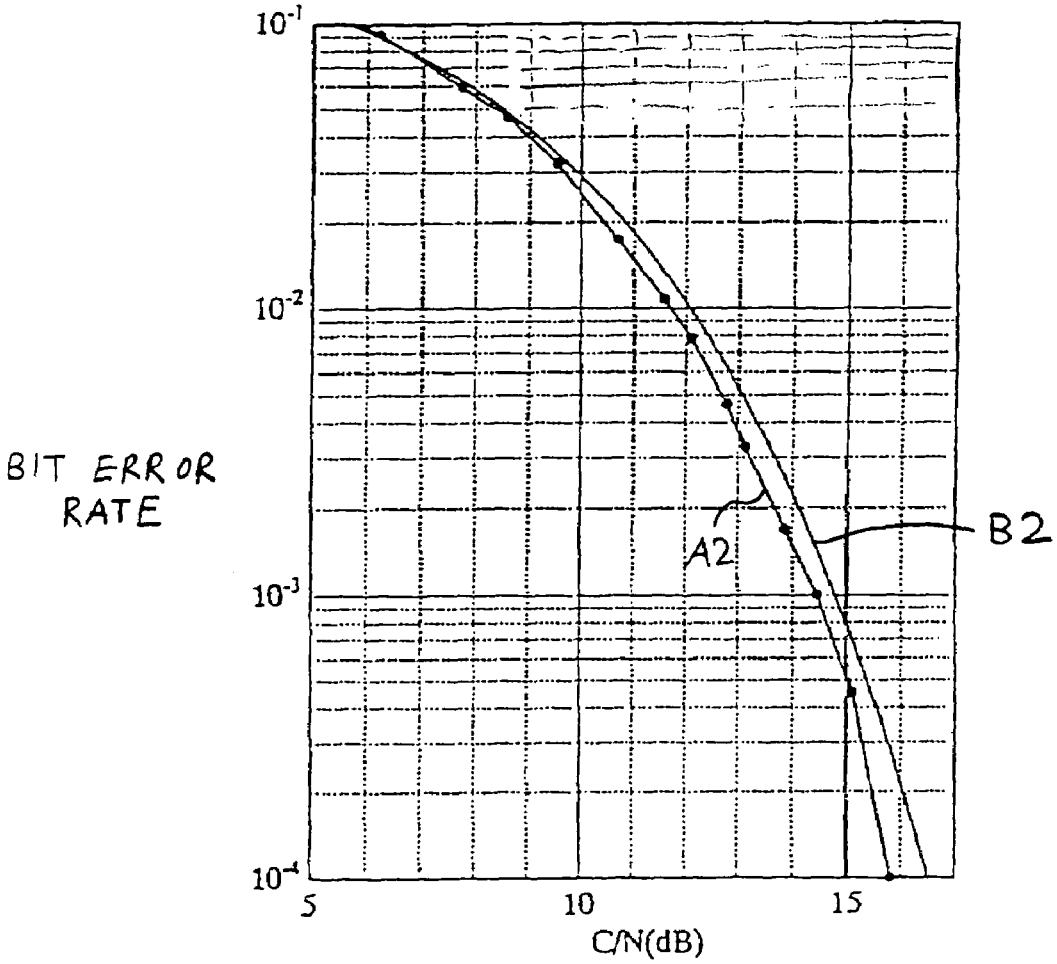
FIG. 28 is a diagram of the relation between the bit error rate and the carrier-to-noise power ratio which is provided in a thirteenth embodiment of this invention, and the corresponding relation in a prior-art system.

With reference to FIG. 28, in the case where the inter-signal-point distance "$\sqrt{2p}$" in the QPSK modulation is equal to 1.20 times the inter-signal-point distance "2r" in the 16-value QAM, the bit error rate provided in the embodiment of this invention decreases along the curve A2 as the carrier-to-noise power ratio C/N increases. FIG. 28 also indicates a comparative example being the relation B2 between the bit error rate and the carrier-to-noise power ratio C/N which occurs in a prior-art 8PSK (8 or octonary phase shift keying) system. As shown in FIG. 28, the bit error rate (the curve A2) provided in the embodiment of this invention is better than that in the prior-art 8PSK system.

The inter-signal-point distance "$\sqrt{2p}$" in the QPSK modulation may be equal to "$\sqrt{2p}$" times the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Fourteenth Embodiment

A fourteenth embodiment of this invention is similar to the tenth embodiment thereof except for design changes indicated hereinafter.

A pair of the I signal and the Q signal outputted from the quadrature baseband modulator in the transmitter (see FIG. 1), or the RF signal outputted from the RF portion in the transmitter is composed of a stream of frames each having N successive symbols. Here, N denotes a predetermined natural number. In every frame, first alternate symbols result from the QPSK modulation, and second alternate symbols result from the 16-value QAM. The QPSK symbols in every frame are used by the receiver as pilot symbols for estimating an amplitude distortion amount and a frequency offset amount. It should be noted that every pilot symbol also carries a part of the main information to be transmitted.

In the receiver (see FIG. 3), the calculator 25 separates pilot symbols from the output I and Q signals of the RF portion 22 in response to a signal (a 2-symbol sync signal) having a period corresponding to two symbols. The calculator 25 estimates an amplitude distortion amount from the separated pilot symbols.

Similarly, the calculator 26 separates pilot symbols from the output I and Q signals of the RF portion 22 in response to a signal (a 2-symbol sync signal) having a period corresponding to 2 symbols. The calculator 26 estimates a frequency offset amount from the separated pilot symbols.

Preferably, the maximum amplitude provided by the 16-value QAM, that is, the value given by the expression (10), is equal to the amplitude "p" provided by the QPSK modulation. In this case, the amplitude distortion amount and the frequency offset amount can be accurately estimated.

The quasi synchronous detector 29 in the receiver (see FIG. 3) is designed to implement the following processes. The quasi synchronous detector 29 subjects the output I and Q signals of the RF portion 22 to QPSK demodulation and outputs the QPSK-demodulation-resultant digital signal when the output I and Q signals of the RF portion 22 represent a pilot symbol. The quasi synchronous detector 29 subjects the output I and Q signals of the RF portion 22 to 16-value QAM demodulation and the QAM-demodulation-resultant digital signal when the output I and Q signals of the RF portion 22 represent a normal symbol different from a pilot symbol.

In general, the inter-signal-point distance "$\sqrt{2p}$" in the QPSK modulation is equal to a given value times the inter-signal-point distance "2r" in the 16-value QAM. Preferably, the given value is in the range of 0.90 to 1.50. In this case, a sufficiently low bit error rate is provided.

Figure 29:
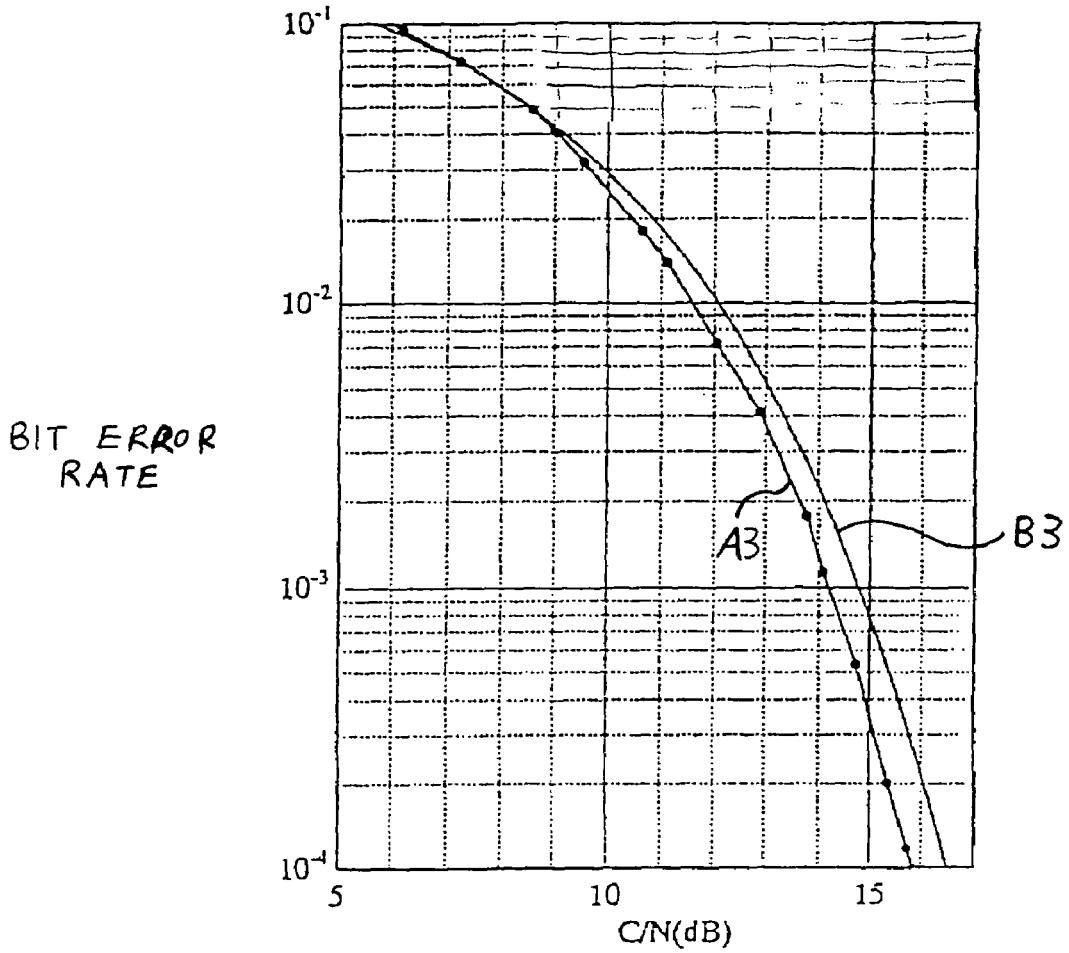
FIG. 29 is a diagram of the relation between the bit error rate and the carrier-to-noise power ratio which is provided in a fourteenth embodiment of this invention, and the corresponding relation in a prior-art system.

With reference to FIG. 29, in the case where the inter-signal-point distance "$\sqrt{2p}$" in the QPSK modulation is equal to 1.20 times the inter-signal-point distance "2r" in the 16-value QAM, the bit error rate provided in the embodiment of this invention decreases along the curve A3 as the carrier-to-noise power ratio C/N increases. FIG. 29 also indicates a comparative example being the relation B3 between the bit error rate and the carrier-to-noise power ratio C/N which occurs in a prior-art 8PSK (8 or octonary phase shift keying) system. As shown in FIG. 29, the bit error rate (the curve A3) provided in the embodiment of this invention is better than that in the prior-art 8PSK system.

The inter-signal-point distance "$\sqrt{2p}$" in the QPSK modulation may be equal to twice the inter-signal-point distance "2r" in the 16-value QAM. In this case, it is preferable that the quasi synchronous detector in the receiver detects the I-Q-plane amplitude of the output I and Q signals of the RF portion when the output I and Q signals of the RF portion 22 represent a pilot symbol, and that the detected I-Q-plane amplitude is used as an I-Q-plane amplitude threshold value for the 16-value QAM demodulation.

Fifteenth Embodiment

Figure 30:
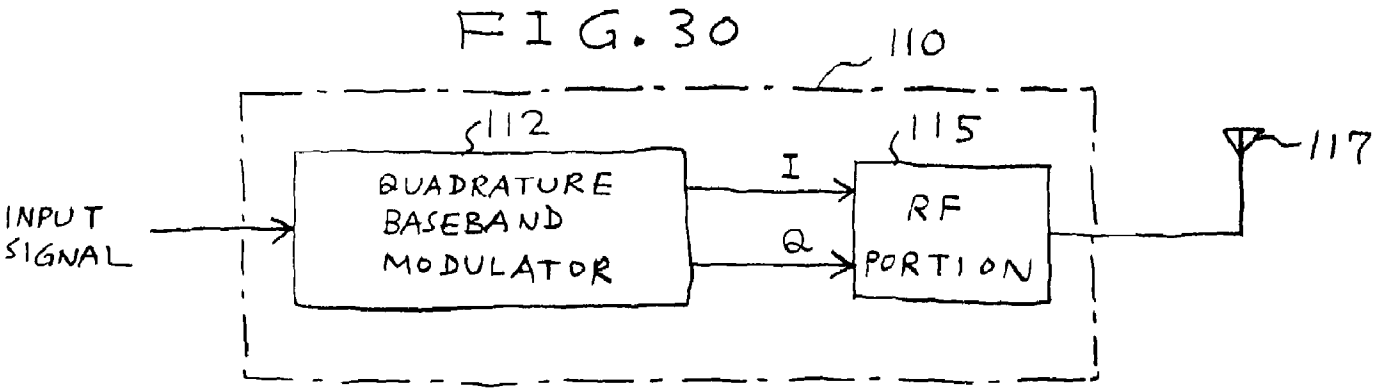
FIG. 30 is a block diagram of a transmitter in a radio communication system according to a fifteenth embodiment of this invention.

FIG. 30 shows a transmitter 110 in a radio communication system according to a fifteenth embodiment of this invention. With reference to FIG. 30, the transmitter 110 includes a modulator (a quadrature baseband modulator) 112 and an RF (radio frequency) portion 115.

A digital signal to be transmitted (that is, an input digital signal or main information to be transmitted) is fed to the quadrature baseband modulator 112. The device 112 subjects the input digital signal to quadrature baseband modulation, thereby converting the input digital signal into a pair of modulation-resultant baseband signals, that is, a baseband I (in-phase) signal and a baseband Q (quadrature) signal. The quadrature baseband modulator 112 outputs the baseband I signal and the baseband Q signal to the RF portion 115.

The RF portion 115 converts the baseband I signal and the baseband Q signal into an RF signal through frequency conversion. The RF portion 115 feeds the RF signal to an antenna 117. The RF signal is radiated by the antenna 117.

Figure 31:
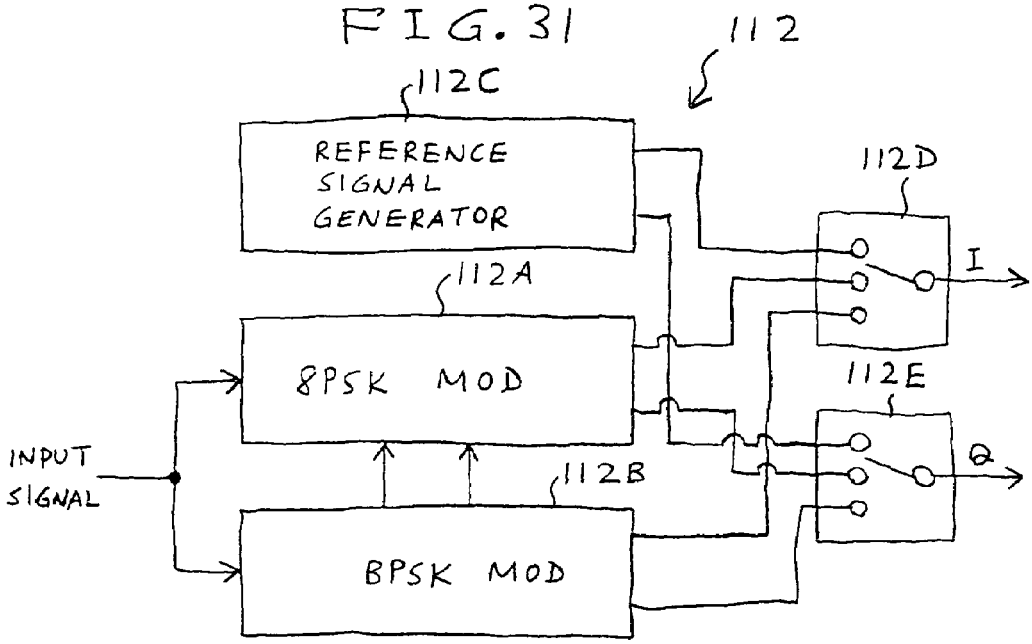
FIG. 31 is a block diagram of a modulator (a quadrature baseband modulator) in FIG. 30.

As shown in FIG. 31, the quadrature baseband modulator 112 includes a 8PSK (8 or octonary phase shift keying) modulator 112A, a BPSK (binary phase shift keying) modulator 112B, a reference signal generator 112C, and switches 112D and 112E.

The 8PSK modulator 112A and the BPSK modulator 112B receives the input digital signal. The device 112A subjects the input digital signal to 8PSK (8PSK modulation), thereby converting the input digital signal into a pair of a baseband I signal and a baseband Q signal. The BPSK modulator 112A outputs the baseband I signal to the switch 112D. The 8PSK modulator 112A outputs the baseband Q signal to the switch 112E. The device 112B subjects the input digital signal to BPSK (BPSK modulation), thereby converting the input digital signal into a pair of a baseband I signal and a baseband Q signal. The BPSK modulator 112B outputs the baseband I signal to the switch 112D. The BPSK modulator 112B outputs the baseband Q signal to the switch 112E. The reference signal generator 112C outputs a reference baseband I signal to the switch 112D. The reference signal generator 112C outputs a reference baseband Q signal to the switch 112E. The output I and Q signals from the reference signal generator 112C are used in acquiring synchronization between the transmitter 110 and a receiver during an initial stage of signal transmission. The switch 112D selects one of the output I signal from the 8PSK modulator 112A, the output I signal from the BPSK modulator 112B, and the output I signal from the reference signal generator 112C, and transmits the selected I signal to the RF portion 115. The switch 112E selects one of the output Q signal from the 8PSK modulator 112A, the output Q signal from the BPSK modulator 112B, and the output Q signal from the reference signal generator 112C, and transmits the selected Q signal to the RF portion 115.

During an initial stage of signal transmission, the switch 112D selects the output I signal from the reference signal generator 112C while the switch 112D selects the output Q signal from the reference signal generator 112C. During an interval of time which follows the initial stage, the switch 112D alternately selects the output I signal from the 8PSK modulator 112A and the output I signal from the BPSK modulator 112B at a predetermined period, and transmits the selected I signal to the RF portion 115. During the time interval following the initial stage, the switch 112E alternately selects the output Q signal from the 8PSK modulator 112A and the output Q signal from the BPSK modulator 112B at the predetermined period, and transmits the selected Q signal to the RF portion 115.

Accordingly, with respect to the input digital signal, the quadrature baseband modulator 112 alternately implements the 8PSK modulation and the BPSK modulation at the predetermined period.

In the quadrature baseband modulator 112, the output I and Q signals from the BPSK modulator 112B are fed to the 8PSK modulator 112A. The 8PSK modulation implemented by the device 112A depends on the output I and Q signals from the BPSK modulator 112B.

Figure 32:
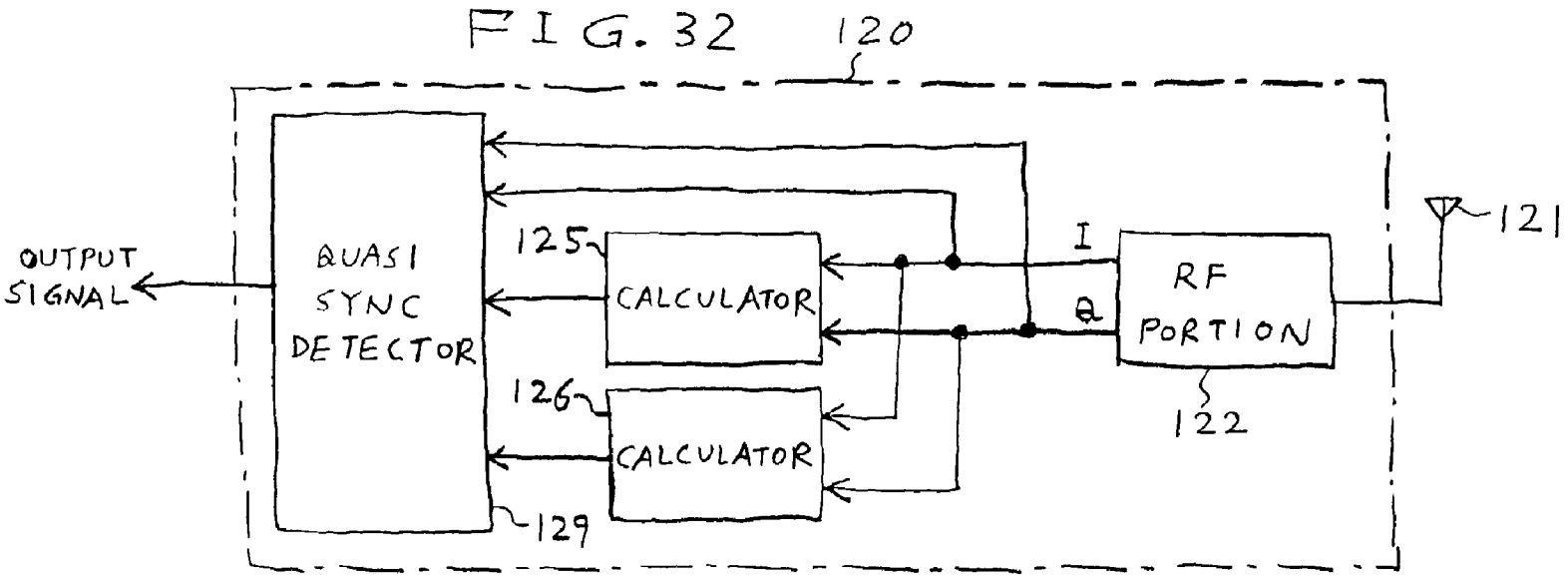
FIG. 32 is a block diagram of a receiver in the radio communication system according to the fifteenth embodiment of this invention.

FIG. 32 shows a receiver 120 in the radio communication system according to the fifteenth embodiment of this invention. With reference to FIG. 32, the receiver 120 includes an RF portion 122, calculators 125 and 126, and a quasi synchronous detector 129.

An RF signal caught by an antenna 121 is applied to the RF portion 122. The RF portion 122 subjects the applied RF signal to frequency conversion, thereby converting the applied RF signal into a pair of a baseband I signal and a baseband Q signal. The RF portion 122 outputs the baseband I signal and the baseband Q signal to the calculators 125 and 126, and the quasi synchronous detector 129.

The calculator 125 estimates an amplitude distortion amount from the baseband I signal and the baseband Q signal. The calculator 125 informs the quasi synchronous detector 129 of the estimated amplitude distortion amount. The calculator 126 estimates a frequency offset amount from the baseband I signal and the baseband Q signal. The calculator 126 informs the quasi synchronous detector 129 of the estimated frequency offset amount.

The device 129 subjects the baseband I signal and the baseband Q signal to quasi synchronous detection responsive to the estimated amplitude distortion amount and the estimated frequency offset amount, thereby demodulating the baseband I signal and the baseband Q signal into an original digital signal. Thus, the quasi synchronous detector 129 recovers the original digital signal from the baseband I signal and the baseband Q signal. The quasi synchronous detector 129 outputs the recovered original digital signal.

Figure 33:
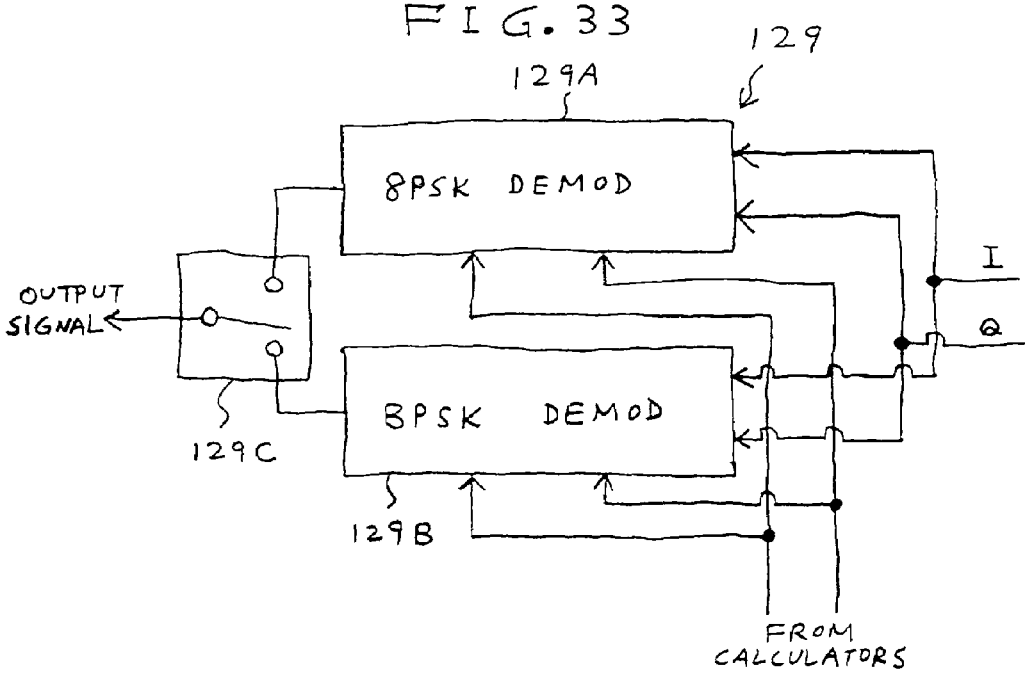
FIG. 33 is a block diagram of a quasi synchronous detector in FIG. 32.

As shown in FIG. 33, the quasi synchronous detector 129 includes an 8PSK demodulator 129A, a BPSK demodulator 129B, and a switch 129C.

The 8PSK demodulator 129A and the BPSK demodulator 129B receive the output I and Q signals from the RF portion 122. In addition, the 8PSK demodulator 129A and the BPSK demodulator 129B are informed of the estimated amplitude distortion amount and the estimated frequency offset amount by the calculators 125 and 126.

The device 129A subjects the baseband I signal and the baseband Q signal to 8PSK demodulation responsive to the estimated amplitude distortion amount and the estimated frequency offset amount, thereby demodulating the baseband I signal and the baseband Q signal into an original digital signal. Thus, the 8PSK demodulator 129A recovers the original digital signal from the baseband I signal and the baseband Q signal. The 8PSK demodulator 129A outputs the recovered original digital signal to the switch 129C.

The device 129B subjects the baseband I signal and the baseband Q signal to BPSK demodulation responsive to the estimated amplitude distortion amount and the estimated frequency offset amount, thereby demodulating the baseband I signal and the baseband Q signal into an original digital signal. Thus, the BPSK demodulator 129B recovers the original digital signal from the baseband I signal and the baseband Q signal. The BPSK demodulator 129B outputs the recovered original digital signal to the switch 129C.

The switch 129C alternately selects the output digital signal from the 8PSK demodulator 129A and the output digital signal from the BPSK demodulator 129B in response to a timing signal (a frame and symbol sync signal), and transmits the selected digital signal to a later stage. When the baseband I and Q signals outputted from the RF portion 122 to the quasi synchronous detector 129 correspond to a result of the 8PSK modulation, the switch 129C selects the output digital signal from the 8PSK demodulator 129A. When the baseband I and Q signals outputted from the RF portion 122 to the quasi synchronous detector 129 correspond to a result of the BPSK modulation, the switch 129C selects the output digital signal from the BPSK demodulator 129B.

For example, the 8PSK demodulator 129A includes an amplitude correction circuit and a frequency correction circuit. The amplitude correction circuit compensates for an amplitude distortion of the baseband I signal and the baseband Q signal in response to the estimated amplitude distortion, thereby generating a first compensation-resultant baseband I signal and a first compensation-resultant baseband Q signal. The frequency correction circuit compensates for a frequency offset of the first compensation-resultant baseband I signal and the first compensation-resultant baseband Q signal in response to the estimated frequency offset amount, thereby generating a second compensation-resultant baseband I signal and a second compensation-resultant baseband Q signal. In the 8PSK demodulator 129A, the second compensation-resultant baseband I signal and the second compensation-resultant baseband Q signal are subjected to the 8PSK demodulation, being converted into the original digital signal.

For example, the BPSK demodulator 129B includes an amplitude correction circuit and a frequency correction circuit. The amplitude correction circuit compensates for an amplitude distortion of the baseband I signal and the baseband Q signal in response to the estimated amplitude distortion, thereby generating a first compensation-resultant baseband I signal and a first compensation-resultant baseband Q signal. The frequency correction circuit compensates for a frequency offset of the first compensation-resultant baseband I signal and the first compensation-resultant baseband Q signal in response to the estimated frequency offset amount, thereby generating a second compensation-resultant baseband I signal and a second compensation-resultant baseband Q signal. In the BPSK demodulator 129B, the second compensation-resultant baseband I signal and the second compensation-resultant baseband Q signal are subjected to the BPSK demodulation, being converted into the original digital signal.

Figure 34:
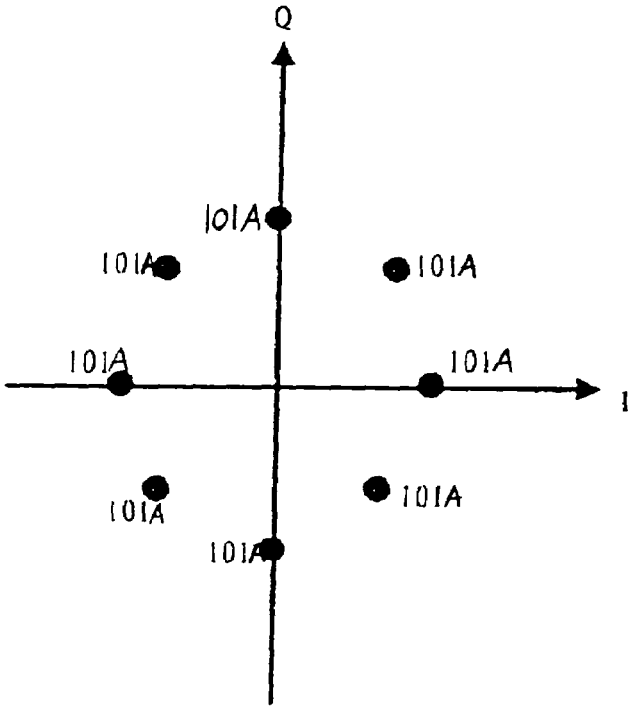
FIG. 34 is a diagram of an arrangement of 8 signal points in an I-Q plane which are provided by 8PSK.

FIG. 34 shows an arrangement of 8 signal points in an I-Q plane which are provided by the 8PSK modulation. In FIG. 34, the 8 signal points are denoted by the reference numeral "101A". The 8 signal points are assigned to 8 different levels (8 different logic states) respectively. The positions ($I_{8PSK}$, $Q_{8PSK}$) of the 8 signal points are given by the following equations.

$$I_{8PSK} = p \cdot \cos\left(\frac{k\pi}{4}\right) \tag{17}$$

$$Q_{8PSK} = p \cdot \sin\left(\frac{k\pi}{4}\right) \tag{18}$$

where "k" denotes a variable integer, and "p" denotes a predetermined constant.

Figure 35:
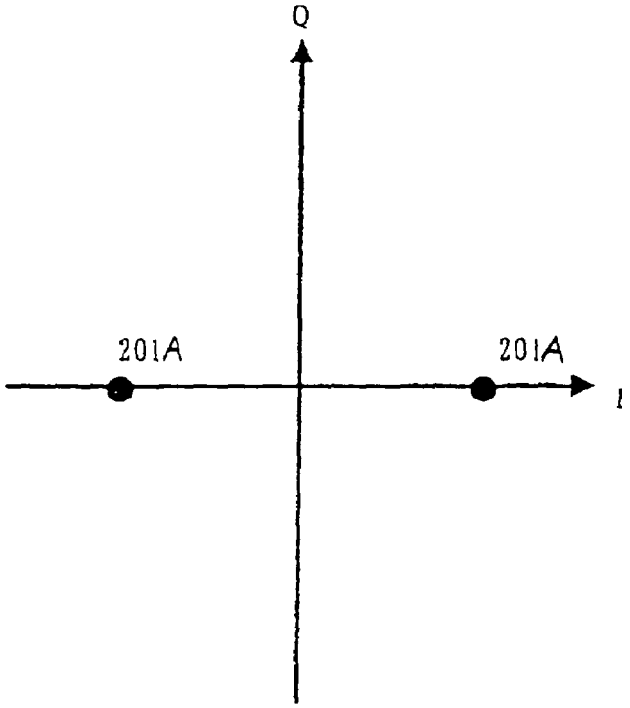
FIG. 35 is a diagram of an arrangement of two signal points in an I-Q plane which are provided by BPSK.

FIG. 35 shows an arrangement of two signal points in an I-Q plane which are provided by the BPSK modulation. In FIG. 35, the signal points are denoted by the reference numeral "201A". The positions ($I_{BPSK}$, $Q_{BPSK}$) of the signal points are given by the following equations.

$$I_{BPSK}=q\cdot\cos(k\pi) \tag{19}$$

$$Q_{BPSK}=q\cdot\sin(k\pi) \tag{20}$$

where "k" denotes a variable integer, and "q" denotes a predetermined constant. With reference to FIG. 35, the signal points are on the I axis, and correspond to a same amplitude given by the constant "q". In addition, the signal points are spaced at an angle of π radian. Accordingly, a BPSK modulation-resultant signal is suited for detecting an amplitude distortion and a frequency offset.

Figure 36:
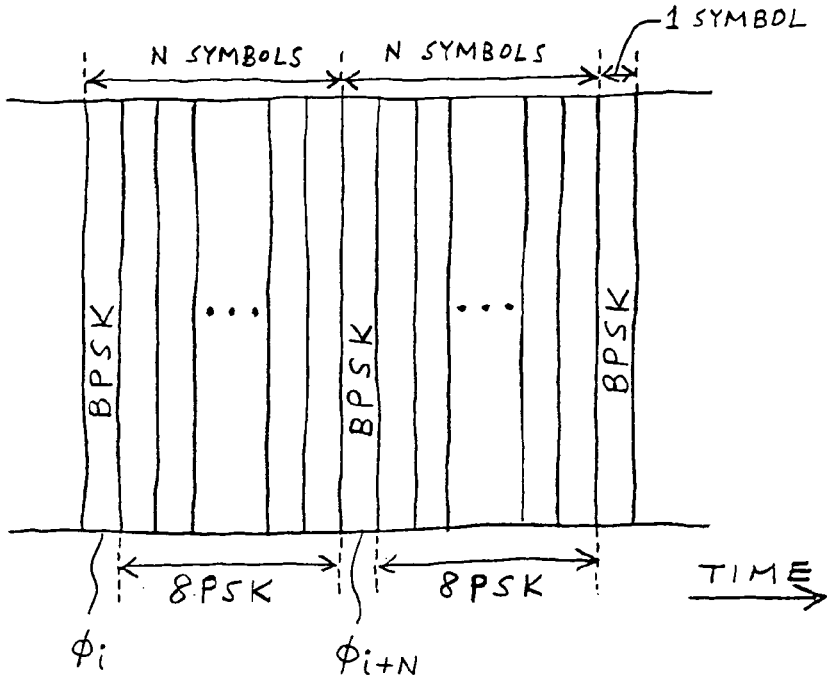
FIG. 36 is a time-domain diagram of a symbol stream.

With reference to FIG. 36, a pair of the I signal and the Q signal outputted from the quadrature baseband modulator 112 in the transmitter 110, or the RF signal outputted from the RF portion 115 in the transmitter 110 is composed of a stream of frames each having N successive symbols. Here, N denotes a predetermined natural number. In every frame, the first symbol results from the BPSK modulation, and the second and later symbols result from the 8PSK modulation. The first symbol in every frame (that is, the BPSK symbol in every frame) is used by the receiver 120 as a pilot symbol for estimating an amplitude distortion amount and a frequency offset amount. It should be noted that every pilot symbol also carries a part of the main information to be transmitted.

In the receiver 120, the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver 120 is designed to implement the following processes. The quasi synchronous detector 129 subjects the output I and Q signals of the RF portion 122 to the BPSK demodulation and outputs the BPSK-demodulation-resultant digital signal when the output I and Q signals of the RF portion 122 represent a pilot symbol. The quasi synchronous detector 129 subjects the output I and Q signals of the RF portion 122 to the 8PSK demodulation and outputs the 8PSK-demodulation-resultant digital signal when the output I and Q signals of the RF portion 122 represent a normal symbol different from a pilot symbol.

The BPSK modulator 112B in the quadrature baseband modulator 112 of the transmitter 110 is designed to implement processes indicated below. The phase of an i-th BPSK symbol in the I-Q plane is denoted by "$\phi_i$", and the phase of an (i+1)-th BPSK symbol in the I-Q plane is denoted by "$\phi_{i+1}$" The BPSK modulator 112B determines the phase "$\theta_{i+1}$" of the (i+1)-th BPSK symbol in an x-y plane on the basis of the difference between the phases "$\phi_i$" and "$\phi_{i+1}$" according to the following equation.

$$\theta_{i+1}=\phi_{i+1}-\phi_i(\text{mod. } 2\pi) \tag{21}$$

Figure 37:
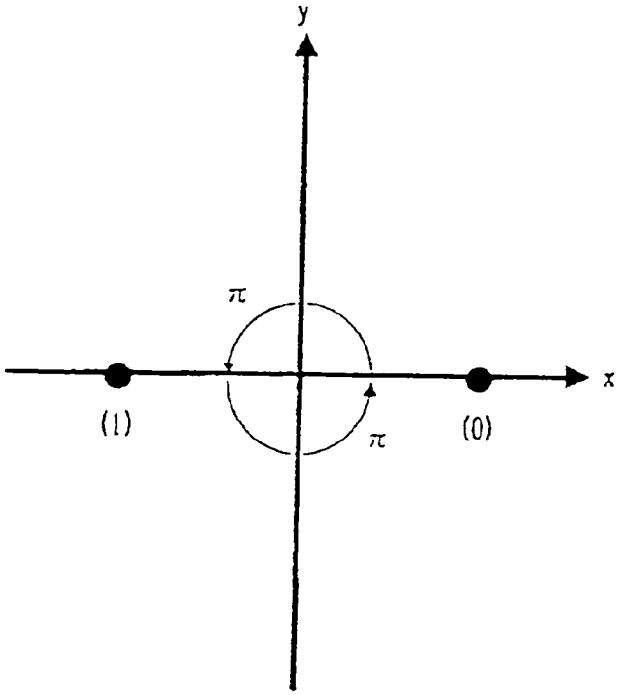
FIG. 37 is a diagram of an arrangement of signal points of BPSK, and logic states assigned thereto.

The BPSK modulator 112B implements BPSK modulation providing two signal points which are respectively on the positive side and the negative side of the x axis in the x-y plane as shown in FIG. 37. The BPSK modulator 112B assigns a bit of "0" and a bit of "1" in the input digital signal to the positive signal point and the negative signal point, respectively. Accordingly, a bit of "0" corresponds to the absence of a phase change of π radian between two successively symbols while a bit of "1" corresponds to the presence of a phase change of π radian between two successively symbols as in differential phase shift keying (DPSK). The BPSK modulator 112B outputs a pair of modulation-resultant I and Q signals to the switches 112D and 112E. The BPSK modulator 112B includes a latch or a register for sampling and holding a pair of modulation-resultant I and Q signals which are selected by the switches 112D and 112E. The modulation-resultant I and Q signals held by the latch or the register are periodically updated. The BPSK modulator 112B outputs a pair of held modulation-resultant I and Q signals to the 8PSK modulator 112A.

Figure 38:
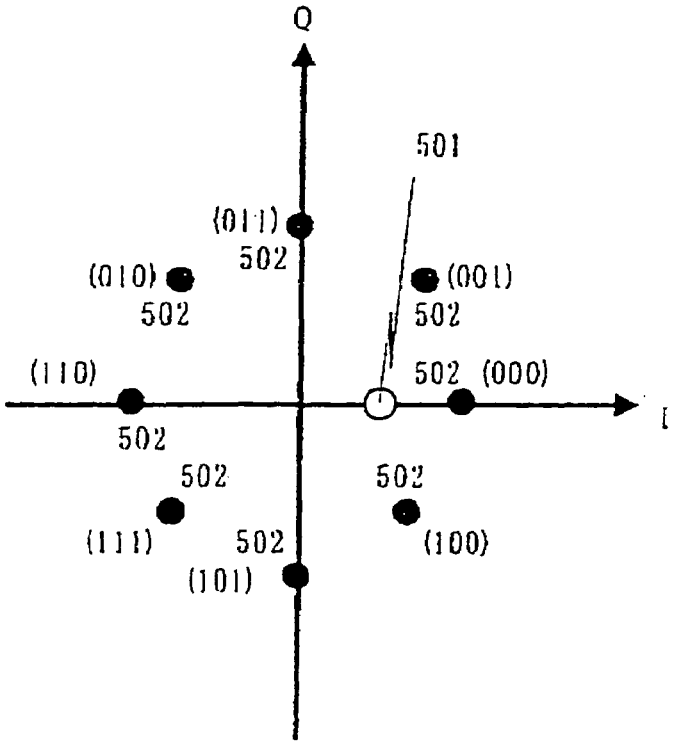
FIG. 38 is a diagram of signal points of 8PSK, logic states assigned thereto, and a first signal point of BPSK.
Figure 39:
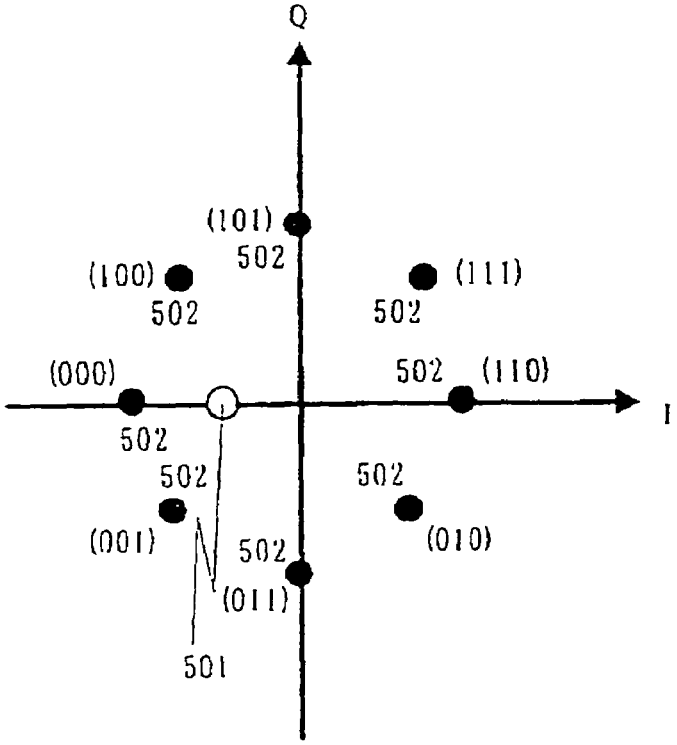
FIG. 39 is a diagram of signal points of 8PSK, logic states assigned thereto, and a second signal point of BPSK.

As previously indicated, the 8PSK modulation implemented by the 8PSK modulator 112A provides 8 different signal points to which 8 different logic states are assigned respectively. For symbols following a BPSK symbol in every frame, the 8PSK modulator 112A determines the assignment of the logic states to the signal points on the basis of the signal point used by the BPSK symbol. The signal point used by the BPSK symbol is represented by a pair of BPSK-modulation-resultant I and Q signals fed from the BPSK modulator 112B. In the case where a signal point 501 on the positive side of the I axis is used by a BPSK symbol, the 8PSK modulator 112A assigns 3-bit sets of "000", "001", "010", "011", "100", "101", "110", and "111" in the input digital signal to eight signal points 502 for following symbols as shown in FIG. 38. In the case where a signal point 501 on the negative side of the I axis is used by a BPSK symbol, the 8PSK modulator 112A assigns 3-bit sets of "000", "001", "010", "011", "100", "101", "110", and "111" in the input digital signal to eight signal points 502 for following symbols as shown in FIG. 39.

Sixteenth Embodiment

A sixteenth embodiment of this invention is similar to the fifteenth embodiment thereof except for design changes indicated hereinafter.

Figure 40:
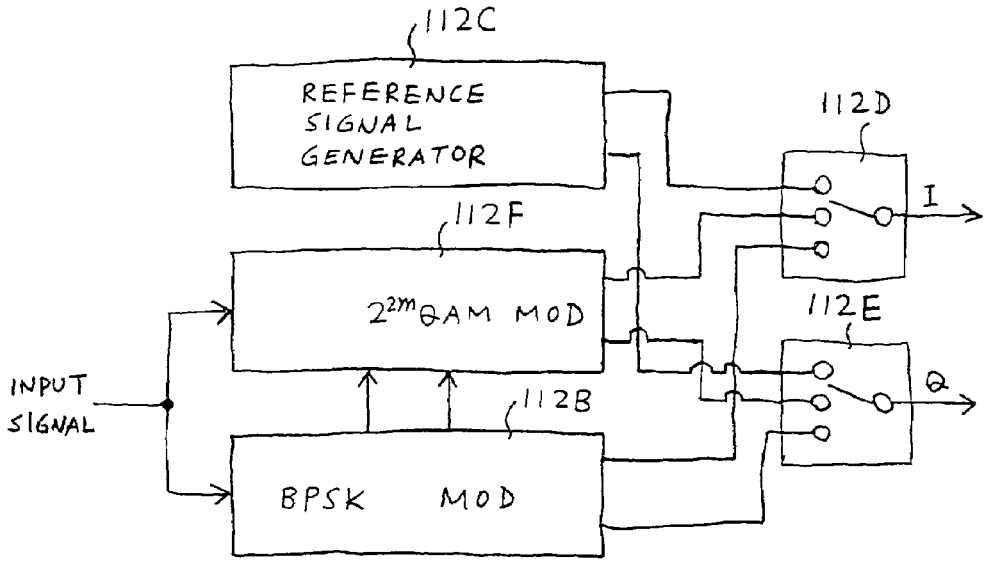
FIG. 40 is a block diagram of a modulator (a quadrature baseband modulator) in a transmitter in a radio communication system according to a sixteenth embodiment of this invention.

As shown in FIG. 40, a modulator (a quadrature baseband modulator) in a transmitter in the sixteenth embodiment of this invention includes a $2^{2m}$-value QAM (quadrature amplitude modulation) modulator 112F instead of the 8PSK modulator 112A (see FIG. 31). Here, "m" denotes a predetermined integer equal to or greater than "2".

Figure 41:
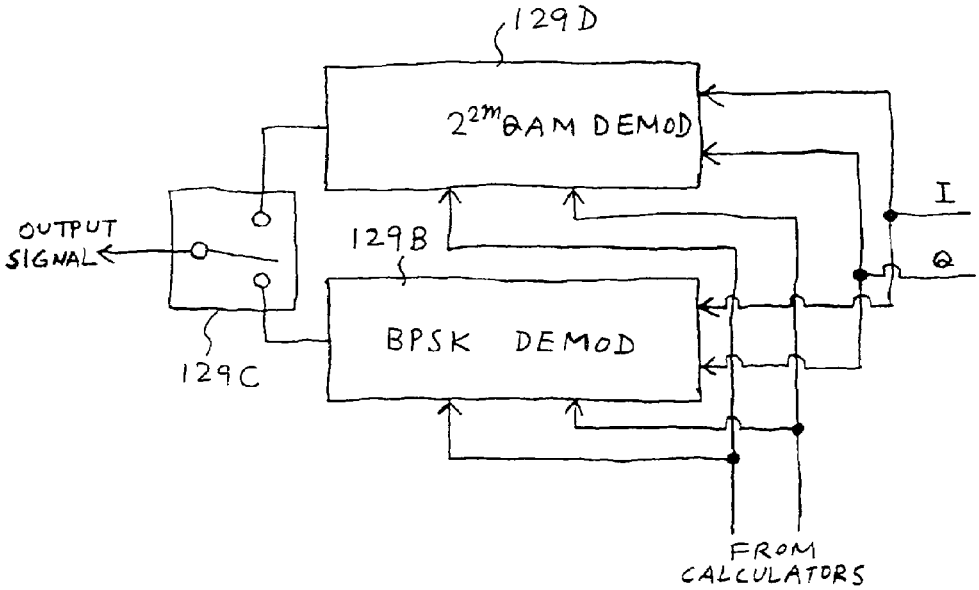
FIG. 41 is a block diagram of a quasi synchronous detector in a receiver in the radio communication system according to the sixteenth embodiment of this invention.

As shown in FIG. 41, a quasi synchronous detector in a receiver in the sixteenth embodiment of this invention includes a $2^{2m}$-value QAM demodulator 129D instead of the 8PSK demodulator 129A (see FIG. 33). The $2^{2m}$-value QAM demodulator 129D implements demodulation inverse with respect to the modulation by the QAM modulator 112F.

Figure 42:
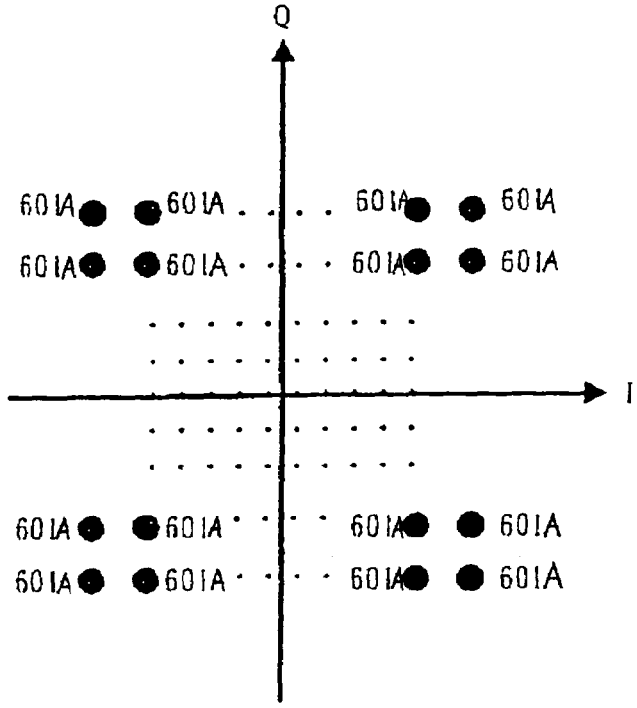
FIG. 42 is a diagram of an arrangement of signal points in an I-Q plane which are provided by $2^{2m}$QAM ($2^{2m}$-value QAM).

FIG. 42 shows an arrangement of signal points in an I-Q plane which are provided by $2^{2m}$-value QAM executed in the QAM modulator 112F. In FIG. 42, the signal points are denoted by the reference numeral "601A". The signal points are assigned to different values (different logic states) respectively. The positions ($I_{QAM}$, $Q_{QAM}$) of the signal points are given by the following equations.

$$I_{QAM}=r(2^{m-1}a1+2^{m-2}a2+\ldots+2^0am) \tag{22}$$

$$Q_{QAM}=r(2^{m-1}b1+2^{m-2}b2+\ldots+2^0bm) \tag{23}$$

where "m" denotes a predetermined integer equal to or greater than "2"; (a1, b1), (a2, b2), . . . , (am, bm) are binary code words of "1" and "−1"; and "r" denotes a predetermined constant.

Figure 43:
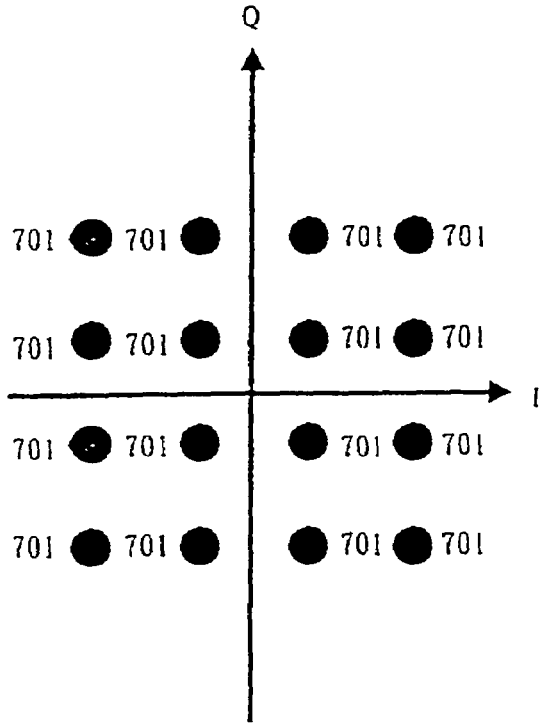
FIG. 43 is a diagram of an arrangement of signal points in an I-Q plane which are provided by 16QAM (16-value QAM).

An example of the $2^{2m}$-value QAM executed in the QAM modulator 112F is 16-value QAM. FIG. 43 shows an arrangement of signal points in an I-Q plane which are provided by the 16-value QAM. In FIG. 43, the signal points are denoted by the reference numeral "701". The signal points are assigned to different values (different logic states) respectively. The positions ($I_{16QAM}$, $Q_{16QAM}$) of the signal points are given by the following equations.

$$I_{16QAM}=s(2^1a1+2^0a2) \tag{24}$$

$$Q_{16QAM}=s(2^1b1+2^0b2) \tag{25}$$

where (a1, b1) and (a2, b2) are binary code words of "1" and "−1", and "s" denotes a predetermined constant.

Figure 44:
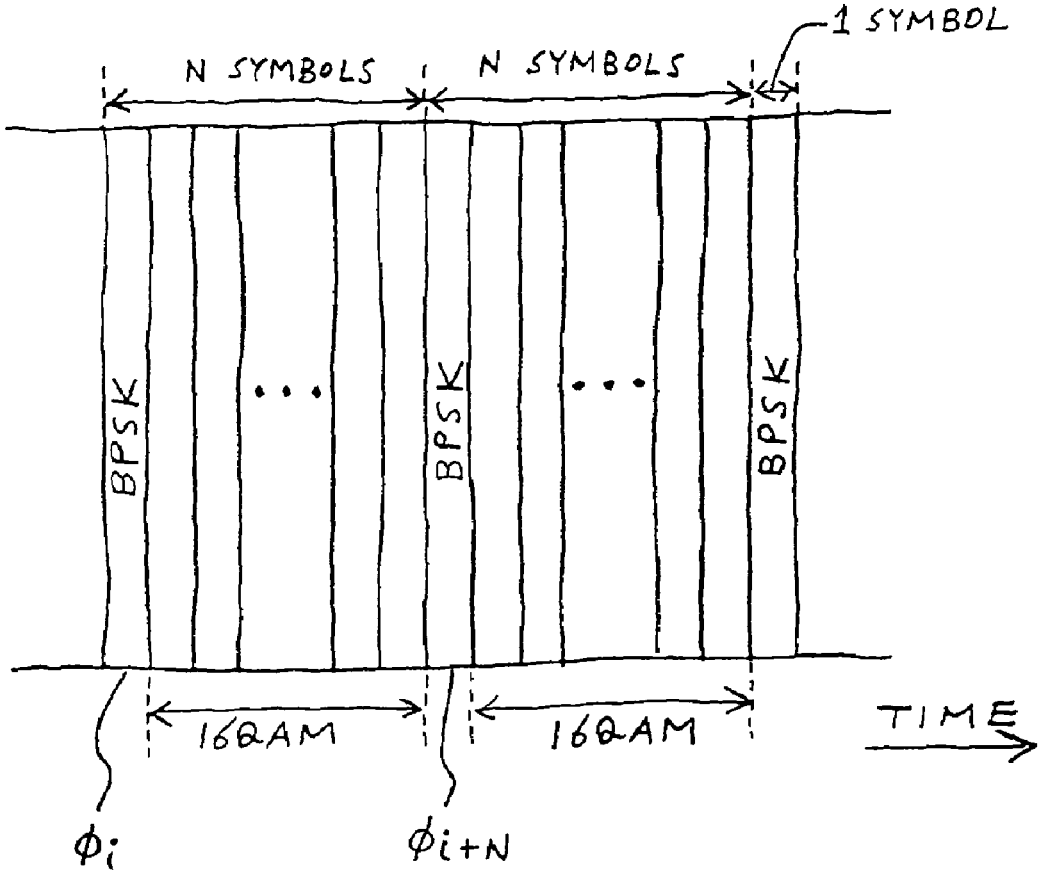
FIG. 44 is a time-domain diagram of a symbol stream.

With reference to FIG. 44, a pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the BPSK modulation, and the second and later symbols result from the 16-value QAM. The first symbol in every frame (that is, the BPSK symbol in every frame) is used by the receiver as a pilot symbol for estimating an amplitude distortion amount and a frequency offset amount.

It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to BPSK demodulation and outputs the BPSK-demodulation-resultant digital signal when the output I and Q signals of the RF portion 122 represent a pilot symbol. The quasi synchronous detector 129 subjects the output I and Q signals of the RF portion 122 to 16-value QAM demodulation and outputs the QAM-demodulation-resultant digital signal when the output I and Q signals of the RF portion 122 represent a normal symbol different from a pilot symbol.

Figure 45:
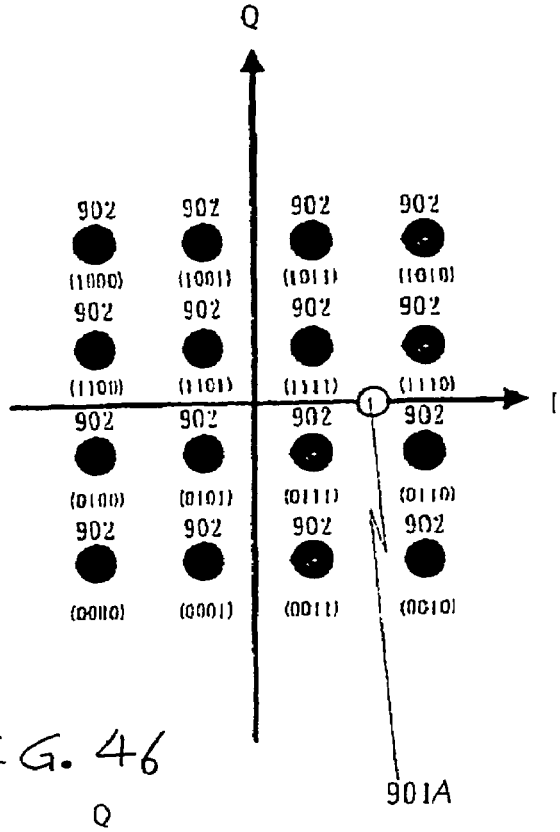
FIG. 45 is a diagram of signal points of 16QAM (16-value QAM), logic states assigned thereto, and a first signal point of BPSK.
Figure 46:
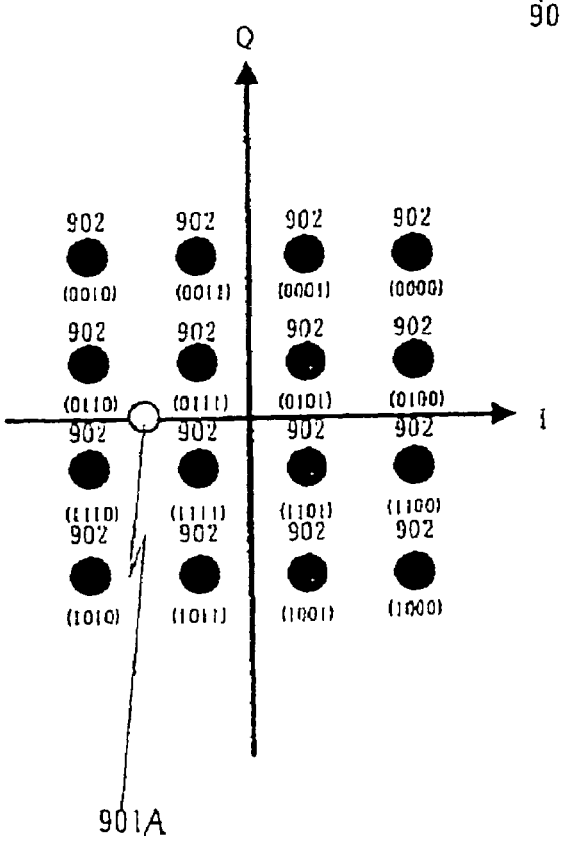
FIG. 46 is a diagram of signal points of 16QAM (16-value QAM), logic states assigned thereto, and a second signal point of BPSK.

The 16-value QAM implemented by the 16-value QAM modulator 112A provides 16 different signal points to which 16 different logic states are assigned respectively. For symbols following a BPSK symbol in every frame, the 16-value QAM modulator 112A determines the assignment of the logic stages to the signal points on the basis of the signal point used by the BPSK symbol. The signal point used by the BPSK symbol is represented by a pair of BPSK-modulation-resultant I and Q signals fed from the BPSK modulator 112B. In the case where a signal point 901A on the positive side of the I axis is used by a BPSK symbol, the 16-value QAM modulator 112A assigns 4-bit sets of "0000", "0001", "0010", . . . , "1110", and "1111" in the input digital signal to 16 signal points 902 for following symbols as shown in FIG. 45. In the case where a signal point 901A on the negative side of the I axis is used by a BPSK symbol, the 16-value QAM modulator 112A assigns 4-bit sets of "0000", "0001", "0010", . . . , "1110", and "1111" in the input digital signal to 16 signal points 902 for following symbols as shown in FIG. 46.

Seventeenth Embodiment

A seventeenth embodiment of this invention is similar to the fifteenth embodiment thereof except for design changes indicated hereinafter.

Figure 47:
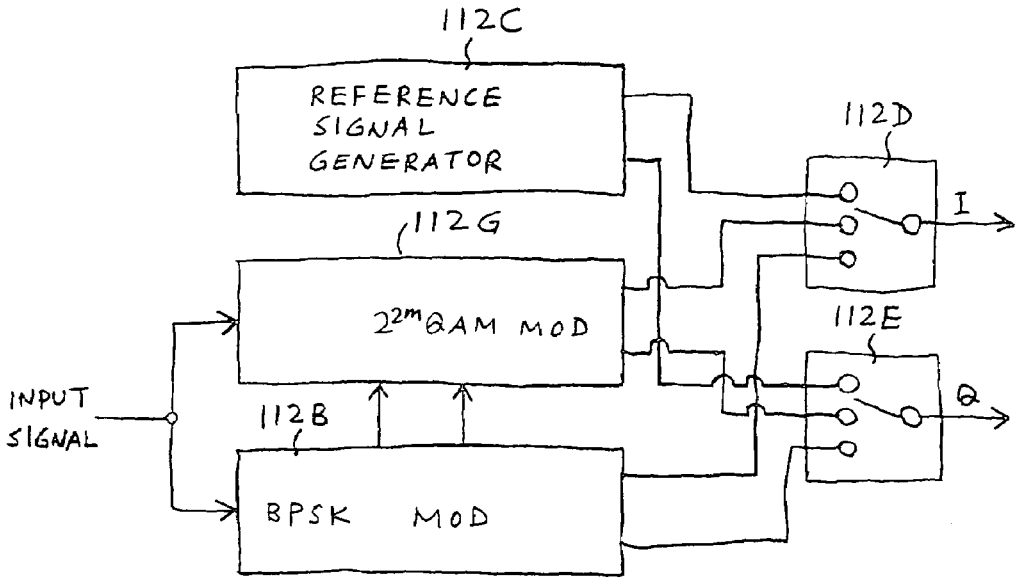
FIG. 47 is a block diagram of a modulator (a quadrature baseband modulator) in a transmitter in a radio communication system according to a seventeenth embodiment of this invention.

As shown in FIG. 47, a modulator (a quadrature baseband modulator) in a transmitter in the seventeenth embodiment of this invention includes a $2^{2m}$-value QAM (quadrature amplitude modulation) modulator 112G instead of the 8PSK modulator 112A (see FIG. 31). Here, "m" denotes a predetermined integer equal to or greater than "2".

Figure 48:
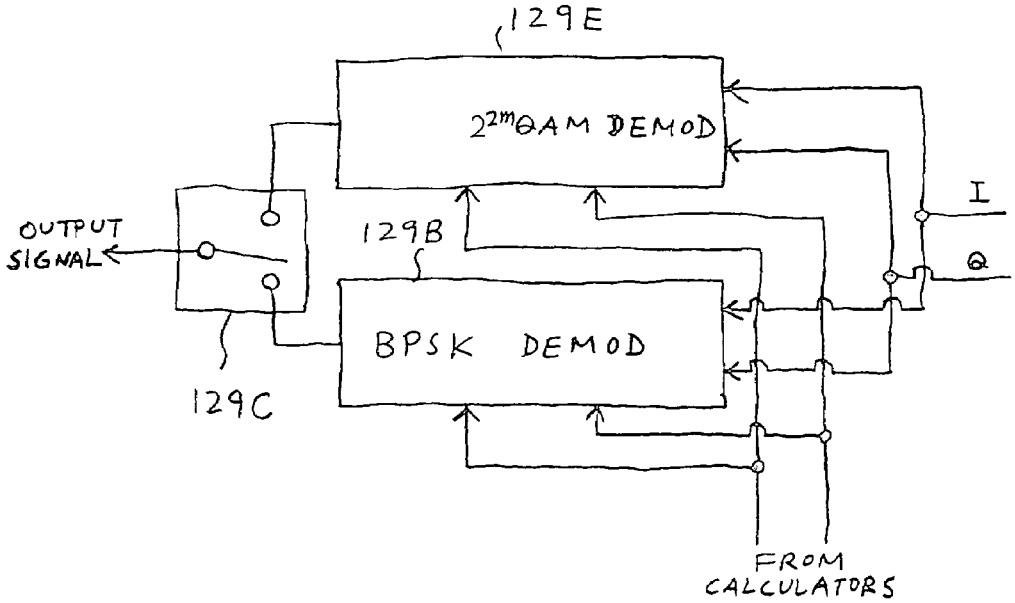
FIG. 48 is a block diagram of a quasi synchronous detector in a receiver in the radio communication system according to the seventeenth embodiment of this invention.

As shown in FIG. 48, a quasi synchronous detector in a receiver in the seventeenth embodiment of this invention includes a $2^{2m}$-value QAM demodulator 129E instead of the 8PSK demodulator 129A (see FIG. 33). The $2^{2m}$-value QAM demodulator 129E implements demodulation inverse with respect to the modulation by the QAM modulator 112G.

Figure 49:
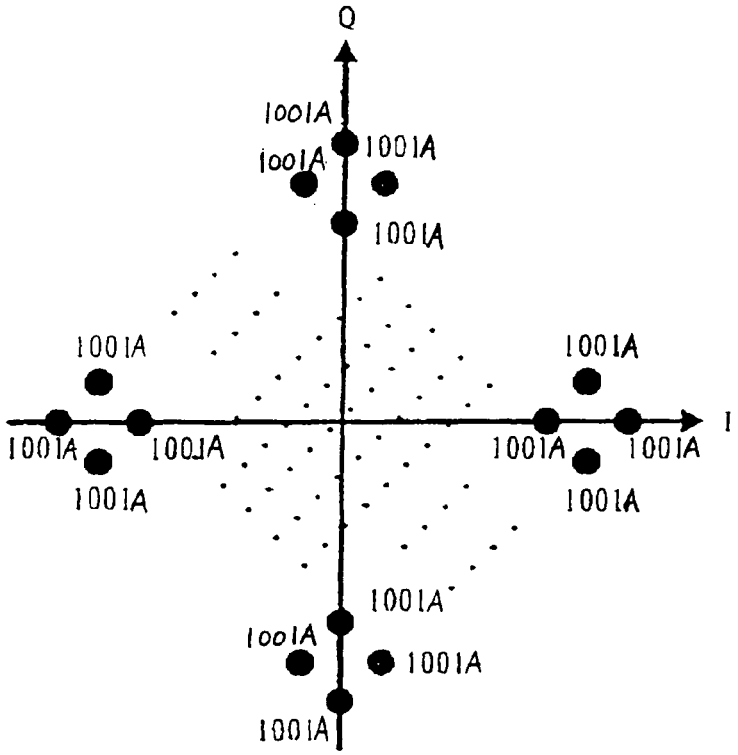
FIG. 49 is a diagram of an arrangement of signal points in an I-Q plane which are provided by $2^{2m}$QAM ($2^{2m}$-value QAM).

FIG. 49 shows an arrangement of signal points in an I-Q plane which are provided by $2^{2m}$-value QAM executed in the QAM modulator 112G. In FIG. 49, the signal points are denoted by the reference numeral "1001A". The signal points are assigned to different logic values respectively. The positions of the signal points in FIG. 49 result from rotation of the signal points in FIG. 42 through an angle of π/4 radian about the origin. Specifically, the positions ($I_{QAMR}$, $Q_{QAMR}$) of the signal points in FIG. 49 are given by the following equations.

$$I_{QAMR} = I_{QAM}\left\{\cos\left(\frac{\pi}{4} + \frac{n\pi}{2}\right)\right\} - Q_{QAM}\left\{\sin\left(\frac{\pi}{4} + \frac{n\pi}{2}\right)\right\} \tag{26}$$

$$Q_{QAMR} = I_{QAM}\left\{\sin\left(\frac{\pi}{4} + \frac{n\pi}{2}\right)\right\} + Q_{QAM}\left\{\cos\left(\frac{\pi}{4} + \frac{n\pi}{2}\right)\right\} \tag{27}$$

where "n" denotes an integer, and ($I_{QAM}$, $Q_{QAM}$) are given by the equations (22) and (23).

Figure 50:
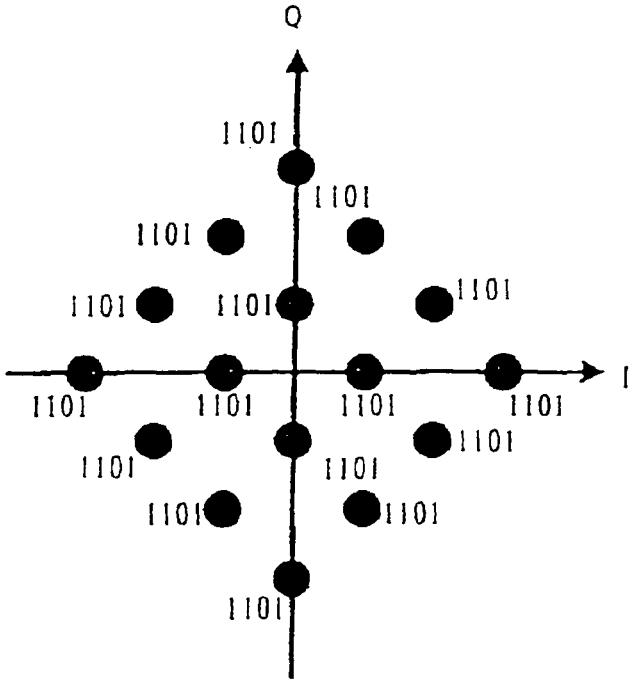
FIG. 50 is a diagram of an arrangement of signal points in an I-Q plane which are provided by 16QAM (16-value QAM).

An example of the $2^{2m}$-value QAM executed in the QAM modulator 112G is 16-value QAM. FIG. 50 shows an arrangement of signal points in an I-Q plane which are provided by the 16-value QAM. In FIG. 50, the signal points are denoted by the reference numeral "1101". The signal points are assigned to different logic states (different values) respectively. The positions of the signal points in FIG. 50 result from rotation of the signal points in FIG. 43 through an angle of π/4 radian about the origin. Specifically, the positions ($I_{16QAMR}$, $Q_{16QMAR}$) of the signal points in FIG. 50 are given by the following equations.

$$I_{16QAMR} = I_{16QAM}\left\{\cos\left(\frac{\pi}{4} + \frac{n\pi}{2}\right)\right\} - Q_{16QAM}\left\{\sin\left(\frac{\pi}{4} + \frac{n\pi}{2}\right)\right\} \tag{28}$$

$$Q_{16QAMR} = I_{16QAM}\left\{\sin\left(\frac{\pi}{4} + \frac{n\pi}{2}\right)\right\} + Q_{16QAM}\left\{\cos\left(\frac{\pi}{4} + \frac{n\pi}{2}\right)\right\} \tag{29}$$

where "n" denotes an integer, and ($I_{16QAM}$, $Q_{16QAM}$) are given by the equations (24) and (25).

A pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the BPSK modulation, and the second and later symbols result from the 16-value QAM. The first symbol in every frame (that is, the BPSK symbol in every frame) is used by the receiver as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to BPSK demodulation and outputs the BPSK-demodulation-resultant digital signal when the output I and Q signals of the RF portion 122 represent a pilot symbol. The quasi synchronous detector 129 subjects the output I and Q signals of the RF portion 122 to 16-value QAM demodulation and outputs the QAM-demodulation-resultant digital signal when the output I and Q signals of the RF portion 122 represent a normal symbol different from a pilot symbol.

Figure 51:
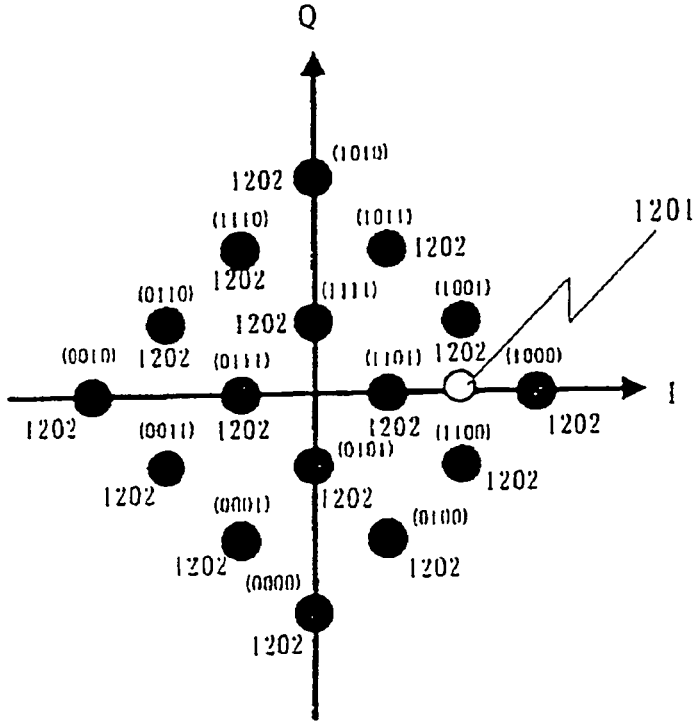
FIG. 51 is a diagram of signal points of 16QAM (16-value QAM), logic states assigned thereto, and a first signal point of BPSK.
Figure 52:
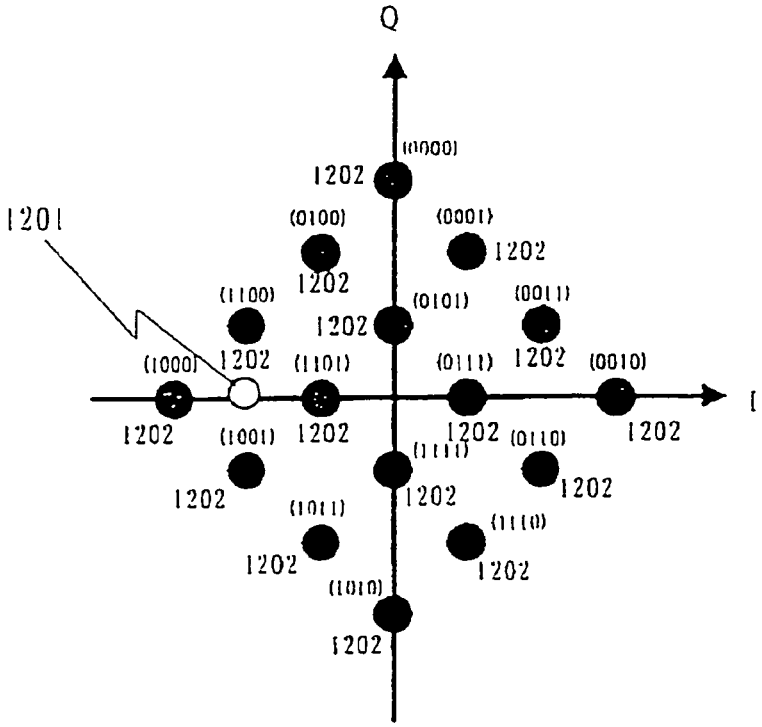
FIG. 52 is a diagram of signal points of 16QAM (16-value QAM), logic states assigned thereto, and a second signal point of BPSK.

The 16-value QAM implemented by the 16-value QAM modulator 112G provides 16 different signal points to which 16 different logic states are assigned respectively. For symbols following a BPSK symbol in every frame, the 16-value QAM modulator 112G determines the assignment of the logic states to the signal points on the basis of the signal point used by the BPSK symbol. The signal point used by the BPSK symbol is represented by a pair of BPSK-modulation-resultant I and Q signals fed from the BPSK modulator 112B. In the case where a signal point 1201 on the positive side of the I axis is used by a BPSK symbol, the 16-value QAM modulator 112G assigns 4-bit sets of "0000", "0001", "0010", . . . , "1110", and "1111" in the input digital signal to 16 signal points 1202 for following symbols as shown in FIG. 51. In the case where a signal point 1201 on the negative side of the I axis is used by a BPSK symbol, the 16-value QAM modulator 112G assigns 4-bit sets of "0000", "0001", "0010", . . . , "1110", and "1111" in the input digital signal to 16 signal points 1202 for following symbols as shown in FIG. 52.

Eighteenth Embodiment

An eighteenth embodiment of this invention is similar to the fifteenth embodiment thereof except for design changes indicated hereinafter.

Figure 53:
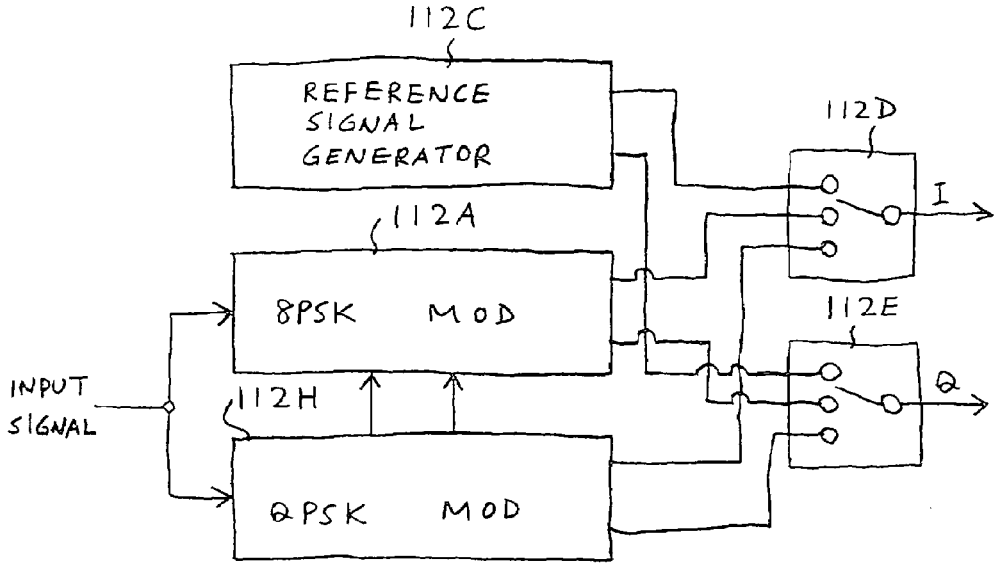
FIG. 53 is a block diagram of a modulator (a quadrature baseband modulator) in a transmitter in a radio communication system according to an eighteenth embodiment of this invention.

As shown in FIG. 53, a modulator (a quadrature baseband modulator) in a transmitter in the eighteenth embodiment of this invention includes a QPSK (quadrature phase shift keying) modulator 112H instead of the BPSK modulator 112B (see FIG. 31).

Figure 54:
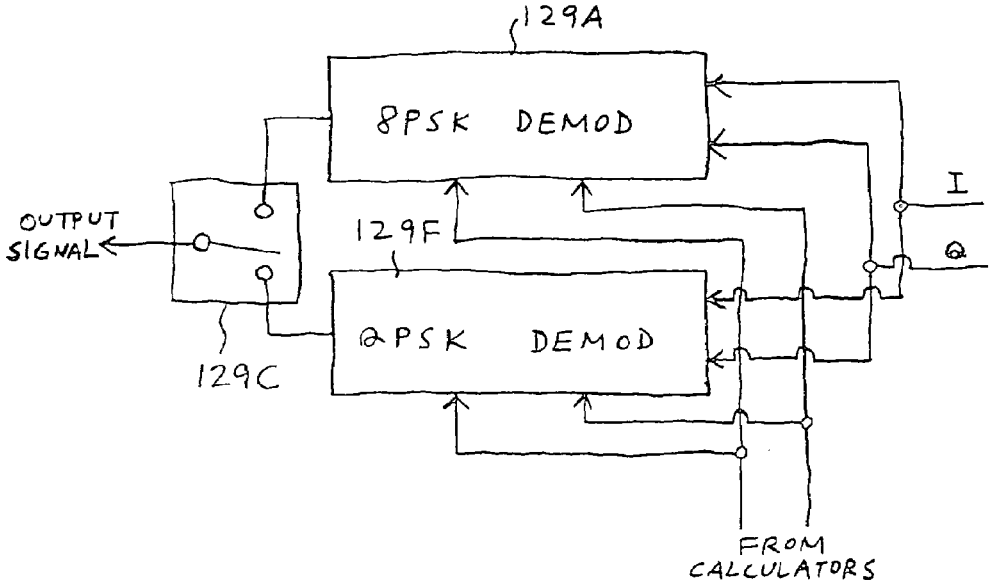
FIG. 54 is a block diagram of a quasi synchronous detector in a receiver in the radio communication system according to the eighteenth embodiment of this invention.

As shown in FIG. 54, a quasi synchronous detector in a receiver in the eighteenth embodiment of this invention includes a QPSK demodulator 129F instead of the BPSK demodulator 129B (see FIG. 33). The QPSK demodulator 129F implements demodulation inverse with respect to the modulation by the QPSK modulator 112H.

Figure 55:
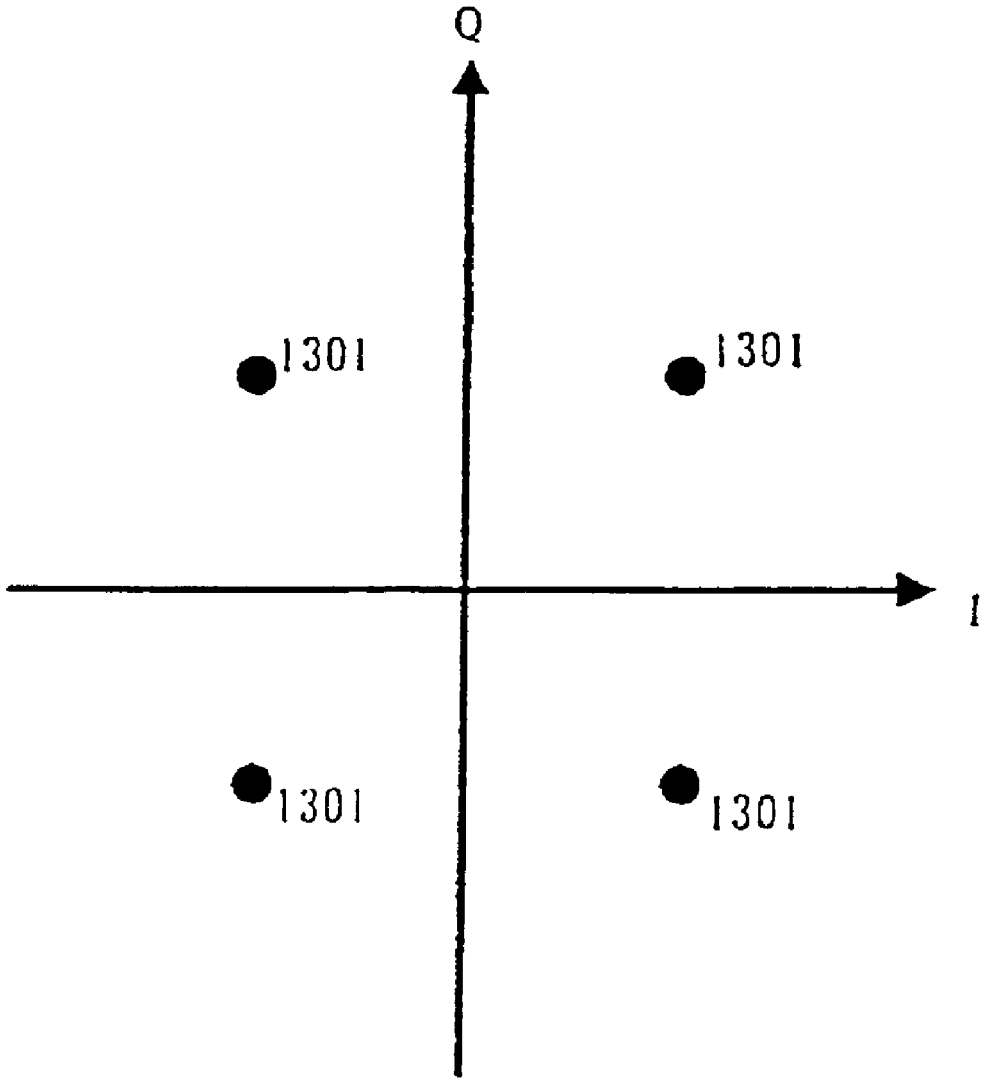
FIG. 55 is a diagram of an arrangement of signal points in an I-Q plane which are provided by QPSK.

FIG. 55 shows an arrangement of signal points in an I-Q plane which are provided by the QPSK modulation executed in the QPSK modulator 112H. In FIG. 55, the signal points are denoted by the reference numeral "1301". The positions ($I_{QPSK}$, $Q_{QPSK}$) of the signal points are given by the following equations.

$$I_{QPSK} = u\left\{\cos\left(\frac{\pi}{4}\right)\cos\left(\frac{k\pi}{2}\right) - \sin\left(\frac{\pi}{4}\right)\sin\left(\frac{k\pi}{2}\right)\right\} \tag{30}$$

$$Q_{QPSK} = u\left\{\cos\left(\frac{\pi}{4}\right)\sin\left(\frac{k\pi}{2}\right) + \sin\left(\frac{\pi}{4}\right)\cos\left(\frac{k\pi}{2}\right)\right\} \tag{31}$$

where "k" denotes a variable integer, and "u" denotes a predetermined constant. With reference to FIG. 55, all the signal points correspond to a same amplitude given by the constant "u". In addition, all the distances between the neighboring signal points are equal to a same value given by $\sqrt{2u}$. Furthermore, the signal points are spaced at equal angular intervals. Accordingly, a QPSK modulation-resultant signal is suited for detecting an amplitude distortion and a frequency offset.

Figure 56:
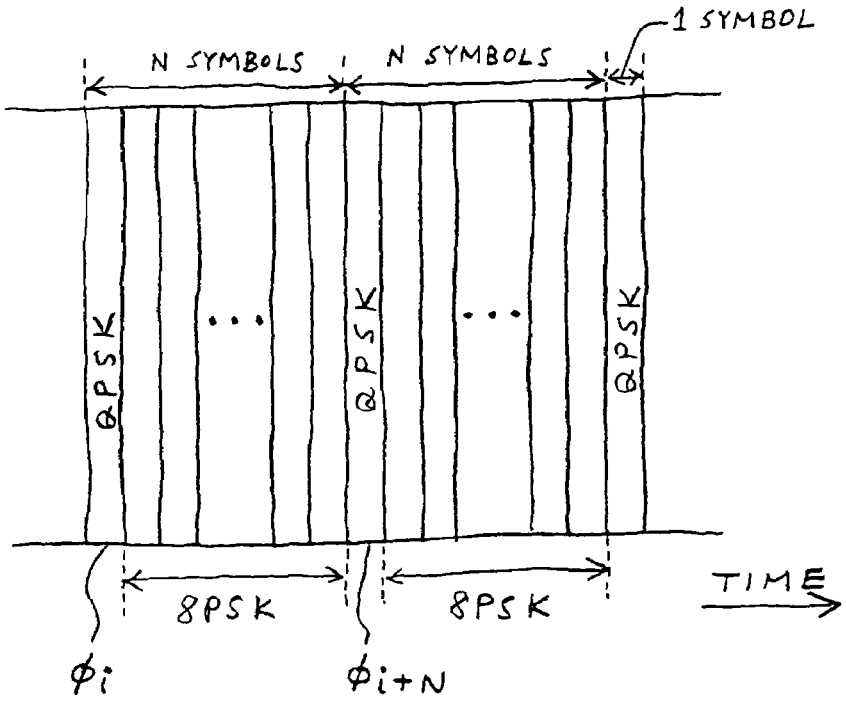
FIG. 56 is a time-domain diagram of a symbol stream.

With reference to FIG. 56, a pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 8PSK modulation. The first symbol in every frame (that is, the QPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK-demodulation-resultant digital signal when the output I and Q signals of the RF portion 122 represent a pilot symbol. The quasi synchronous detector 129 subjects the output I and Q signals of the RF portion 122 to 8PSK demodulation and outputs the 8PSK-demodulation-resultant digital signal when the output I and Q signals of the RF portion 122 represent a normal symbol different from a pilot symbol.

The QPSK modulator 112H in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$" The QPSK modulator 112H determines the phase "$\theta_{i+1}$" of the (i+1)-th QPSK symbol in an x-y plane on the basis of the difference between the phases "$\phi_i$" and "$\phi_{i+1}$" according to the following equation.

$$\theta_{i+1} = \phi_{i+1} - \phi_i (\text{mod. } 2\pi) \tag{32}$$

Figure 57:
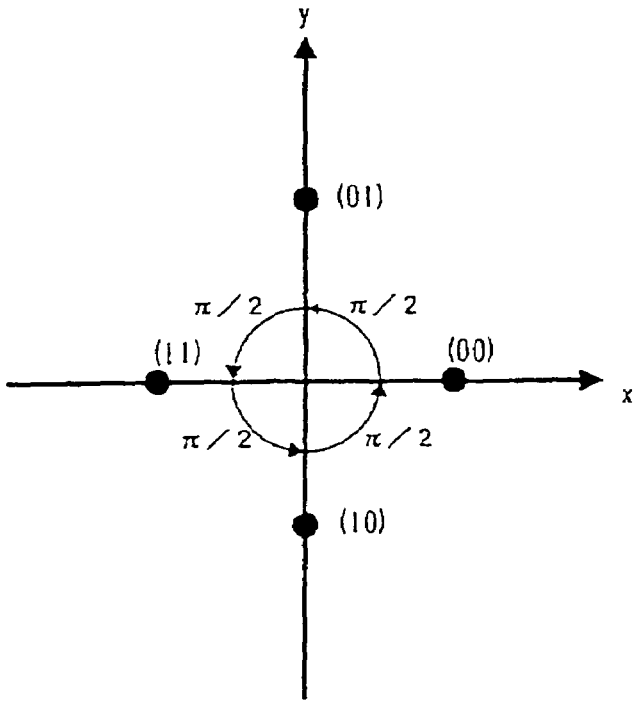
FIG. 57 is a diagram of signal points of QPSK, and logic states assigned thereto.

The QPSK modulator 112H implements QPSK modulation providing four signal points which are respectively on the positive side of the x axis, the negative side of the x axis, the positive side of the y axis, and the negative side of the y axis in the x-y plane as shown in FIG. 57. The QPSK modulator 112H assigns 2-bit sets of "00", "01", "10", and "11" to the positive-x signal point, the positive-y signal point, the negative-y signal point, and the negative-x signal point, respectively. Accordingly, a 2-bit set of "00" corresponds to the absence of any phase change between two successive symbols. A 2-bit set of "01" corresponds to the presence of a phase change of $\pi/2$ radian between two successive symbols. A 2-bit set of "11" corresponds to the presence of a phase change of $\pi$ radian between two successive symbols. A 2-bit set of "10" corresponds to the presence of a phase change of $3\pi/2$ radian between two successive symbols. The QPSK modulator 112H outputs a pair of modulation-resultant I and Q signals to the switches 112D and 112E. The QPSK modulator 112H includes a latch or a register for sampling and holding a pair of modulation-resultant I and Q signals which are selected by the switches 112D and 112E. The modulation-resultant I and Q signals held by the latch or the register are periodically updated. The QPSK modulator 112H outputs a pair of held modulation-resultant I and Q signals to the 8PSK modulator 112A.

Figure 58:
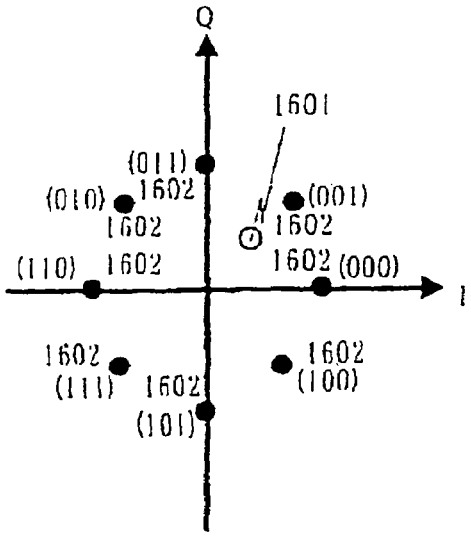
FIG. 58 is a diagram of signal points of 8PSK, logic states assigned thereto, and a first signal point of QPSK.
Figure 59:
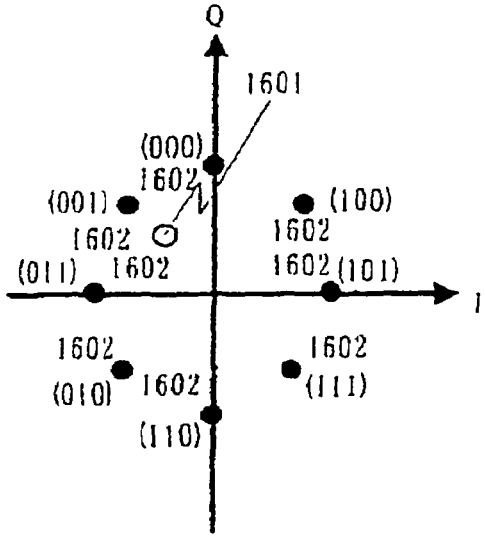
FIG. 59 is a diagram of signal points of 8PSK, logic states assigned thereto, and a second signal point of QPSK.
Figure 60:
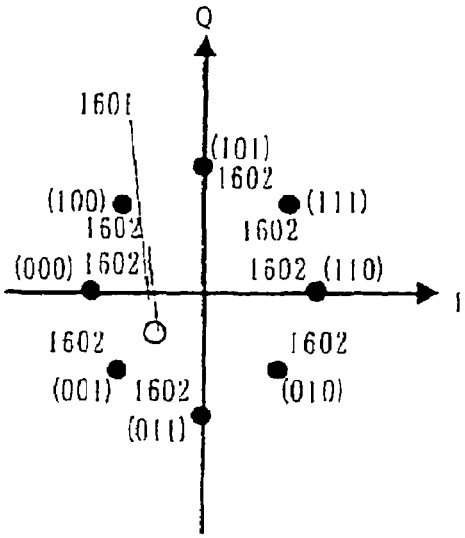
FIG. 60 is a diagram of signal points of 8PSK, logic states assigned thereto, and a third signal point of QPSK.
Figure 61:
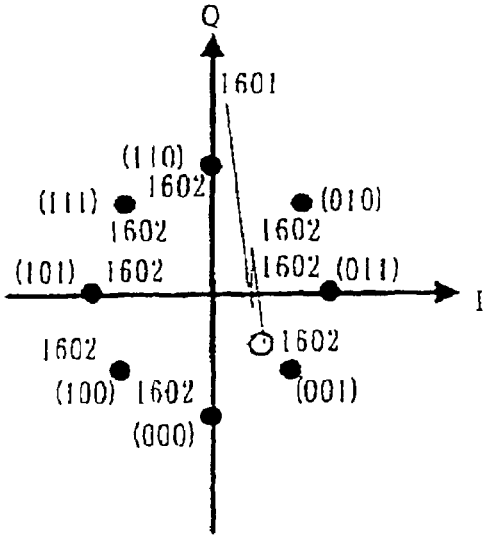
FIG. 61 is a diagram of signal points of 8PSK, logic states assigned thereto, and a fourth signal point of QPSK.

The 8PSK modulation implemented by the 8PSK modulator 112A provides 8 different signal points to which 8 different logic states are assigned respectively. For symbols following a QPSK symbol in every frame, the 8PSK modulator 112A determines the assignment of the logic states to the signal points on the basis of the signal point used by the QPSK symbol. The signal point used by the QPSK symbol is represented by a pair of QPSK-modulation-resultant I and Q signals fed from the QPSK modulator 112H. In the case where a positive-I positive-Q signal point 1601 is used by a QPSK symbol, the 8PSK modulator 112A assigns 3-bit sets of "000", "001", "010", "011", "100", "101", "110", and "111" in the input digital signal to eight signal points 1602 for following symbols as shown in FIG. 58. In the case where a negative-I positive-Q signal point 1601 is used by a QPSK symbol, the 8PSK modulator 112A assigns 3-bit sets of "000", "001", "010", "011", "100", "101", "110", and "111" in the input digital signal to eight signal points 1602 for following symbols as shown in FIG. 59. In the case where a negative-I negative-Q signal point 1601 is used by a QPSK symbol, the 8PSK modulator 112A assigns 3-bit sets of "000", "001", "010", "011", "100", "101", "110", and "111" in the input digital signal to eight signal points 1602 for following symbols as shown in FIG. 60. In the case where a positive-I negative-Q signal point 1601 is used by a QPSK symbol, the 8PSK modulator 112A assigns 3-bit sets of "000", "001", "010", "011", "100", "101", "110", and "111" in the input digital signal to eight signal points 1602 for following symbols as shown in FIG. 61.

Nineteenth Embodiment

A nineteenth embodiment of this invention is similar to the sixteenth embodiment thereof except for design changes indicated hereinafter.

Figure 62:
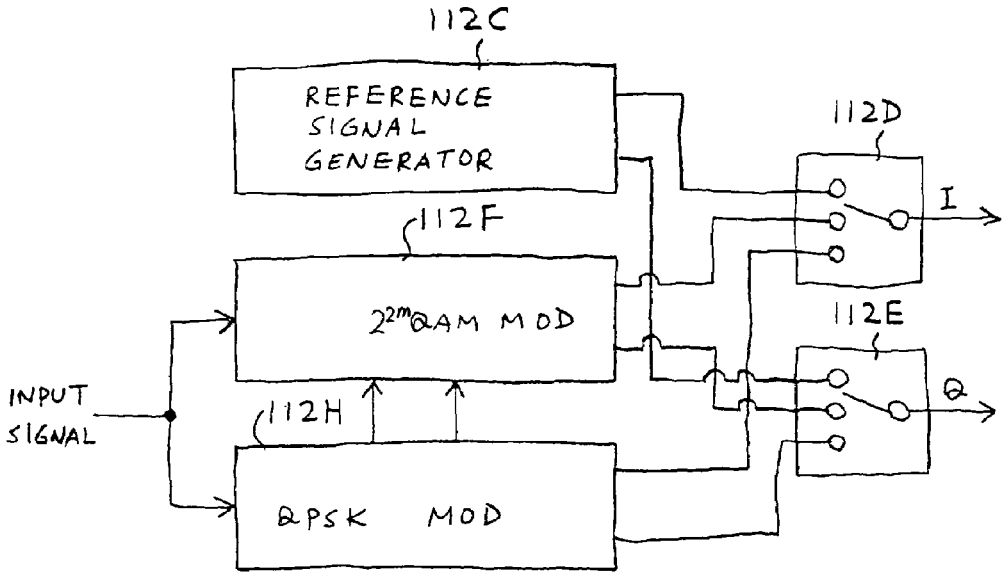
FIG. 62 is a block diagram of a modulator (a quadrature baseband modulator) in a transmitter in a radio communication system according to a nineteenth embodiment of this invention.

As shown in FIG. 62, a modulator (a quadrature baseband modulator) in a transmitter in the nineteenth embodiment of this invention includes a QPSK modulator 112H instead of the BPSK modulator 112B (see FIG. 40).

Figure 63:
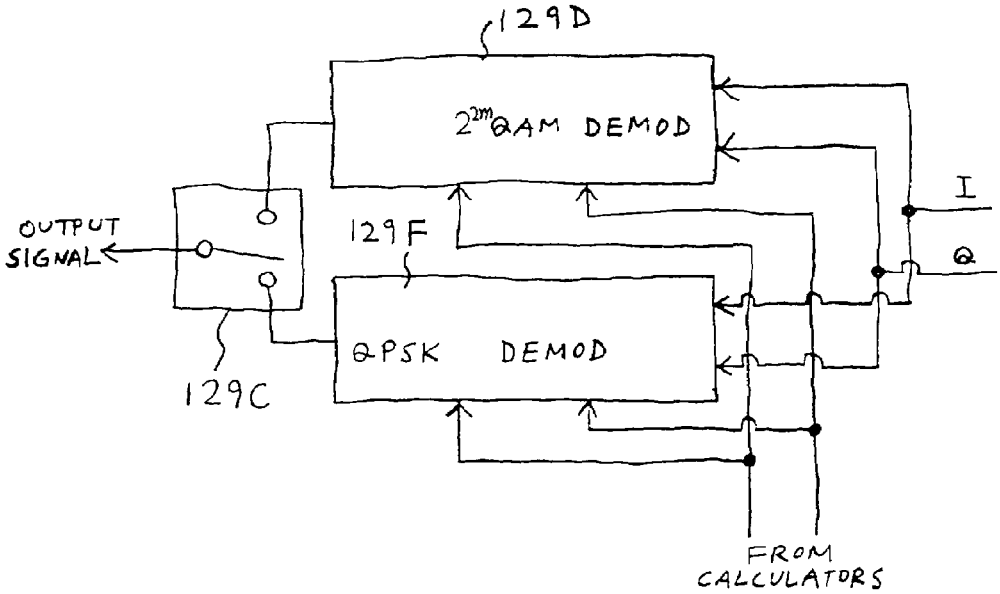
FIG. 63 is a block diagram of a quasi synchronous detector in a receiver in the radio communication system according to the nineteenth embodiment of this invention.

As shown in FIG. 63, a quasi synchronous detector in a receiver in the nineteenth embodiment of this invention includes a QPSK demodulator 129F instead of the BPSK demodulator 129B (see FIG. 41). The QPSK demodulator 129F implements demodulation inverse with respect to the modulation by the QPSK modulator 112H.

The QPSK modulator 112H implements QPSK modulation providing signal points which are arranged in an I-Q plane as shown in FIG. 55. The positions ($I_{QPSK}$, $Q_{QPSK}$) of the signal points are given by the equations (30) and (31).

Figure 64:
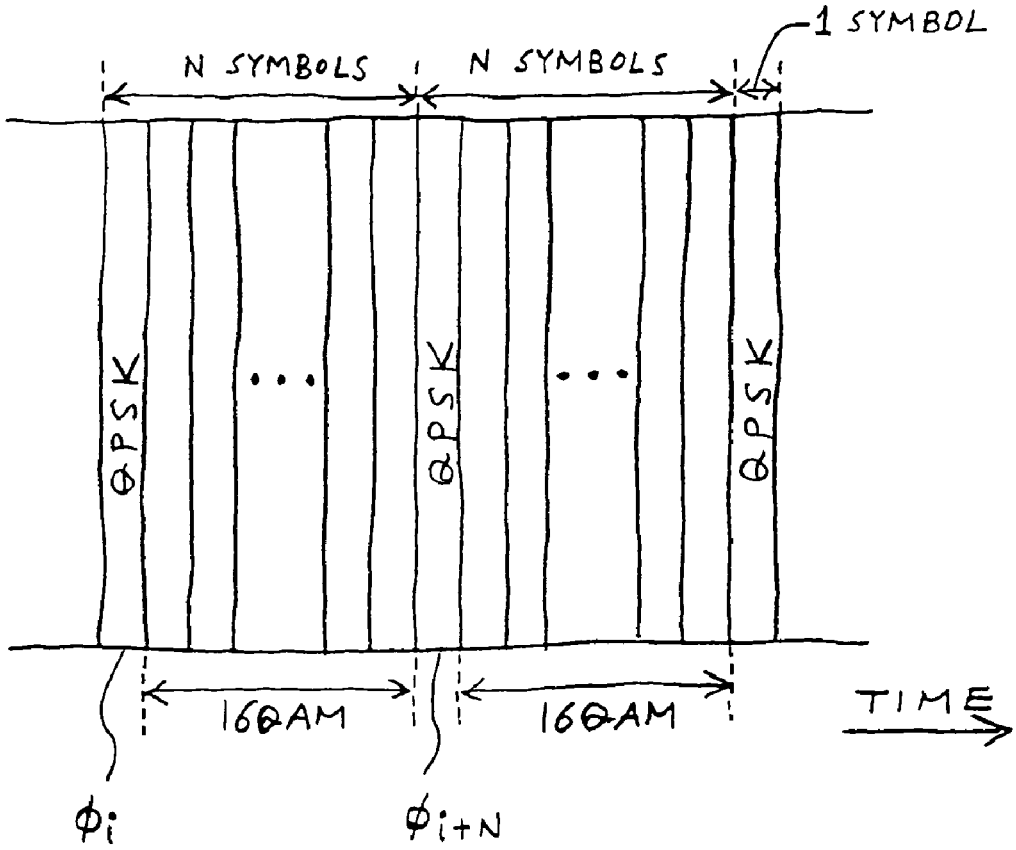
FIG. 64 is a time-domain diagram of a symbol stream.

With reference to FIG. 64, a pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM, for example, the 16-value QAM. The first symbol in every frame (that is, the QPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK demodulation-resultant digital signal when the output I and Q signals of the RF portion 122 represent a pilot symbol. The quasi synchronous detector 129 subjects the output I and Q signals of the RF portion 122 to $2^{2m}$-value QAM demodulation and outputs the QAM-demodulation-resultant digital signal when the output I and Q signals of the RF portion 122 represent a normal symbol different from a pilot symbol.

The QPSK modulator 112H in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$" The QPSK modulator 112H determines the phase "$\theta_{i+1}$" of the (i+1)-th QPSK symbol in an x-y plane on the basis of the difference between the phases "$\phi_i$" and "$\phi_{i+1}$" according to the equation (32). The QPSK modulator 112H implements QPSK modulation providing four signal points which are respectively on the positive side of the x axis, the negative side of the x axis, the positive side of the y axis, and the negative side of the y axis in the x-y plane as shown in FIG. 57. The QPSK modulator 112H assigns 2-bit sets of "00", "01", "10", and "11" to the positive-x signal point, the positive-y signal point, the negative-y signal point, and the negative-x signal point, respectively. The QPSK modulator 112H outputs a pair of modulation-resultant I and Q signals to the switches 112D and 112E. The QPSK modulator 112H includes a latch or a register for sampling and holding a pair of modulation-resultant I and Q signals which are selected by the switches 112D and 112E. The modulation-resultant I and Q signals held by the latch or the register are periodically updated. The QPSK modulator 112H outputs a pair of held modulation-resultant I and Q signals to the $2^{2m}$-value QAM modulator 112F.

Figure 65:
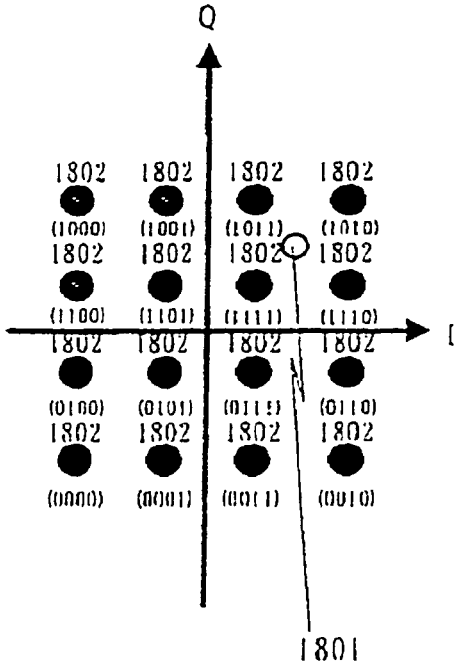
FIG. 65 is a diagram of signal points of 16QAM (16-value QAM), logic states assigned thereto, and a first signal point of QPSK.
Figure 66:
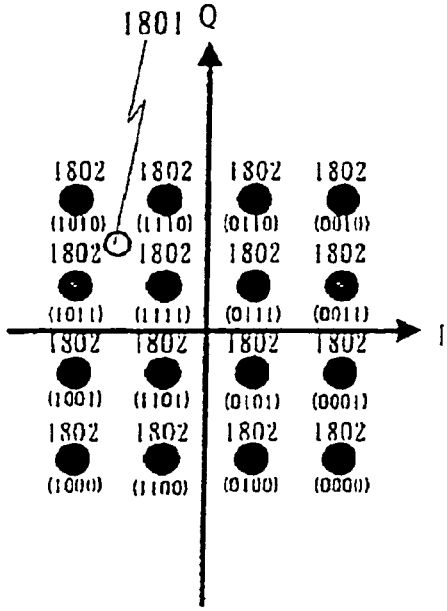
FIG. 66 is a diagram of signal points of 16QAM (16-value QAM), logic states assigned thereto, and a second signal point of QPSK.
Figure 67:
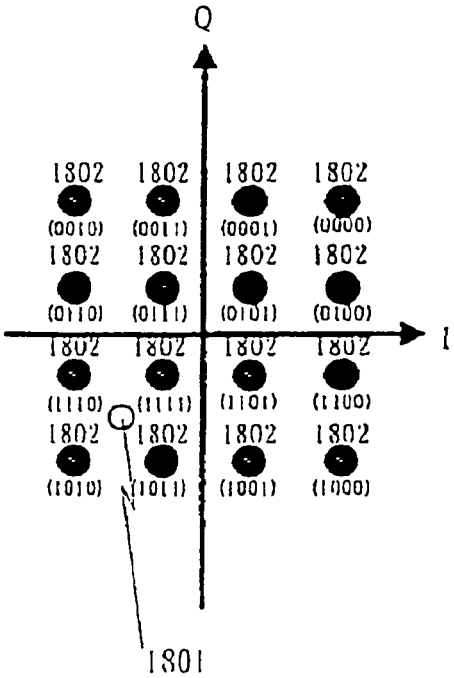
FIG. 67 is a diagram of signal points of 16QAM (16-value QAM), logic states assigned thereto, and a third signal point of QPSK.
Figure 68:
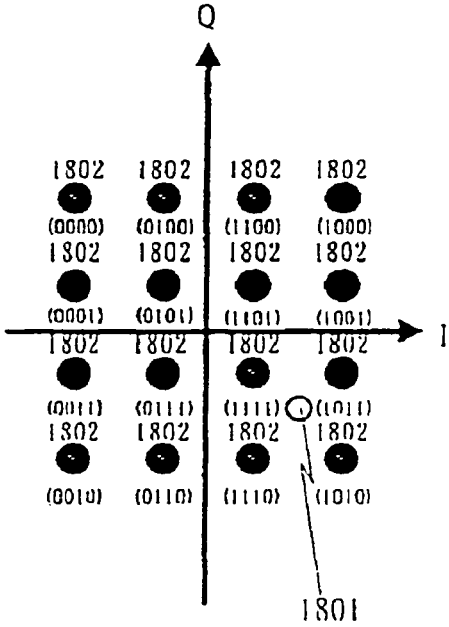
FIG. 68 is a diagram of signal points of 16QAM (16-value QAM), logic states assigned thereto, and a fourth signal point of QPSK.

An example of the modulation implemented by the $2^{2m}$-value QAM modulator 112F is the 16-value QAM. The 16-value QAM by the $2^{2m}$-value QAM modulator 112F provides 16 different signal points to which 16 different logic states are assigned respectively. For symbols following a QPSK symbol in every frame, the 16-value QAM modulator 112F determines the assignment of the logic states to the signal points on the basis of the signal point used by the QPSK symbol. The signal point used by the QPSK symbol is represented by a pair of QPSK-modulation-resultant I and Q signals fed from the QPSK modulator 112H. In the case where a positive-I positive-Q signal point 1801 is used by a QPSK symbol, the 16-value QAM modulator 112F assigns 4-bit sets of "0000", "0001", "0010", . . . , "1110", and "1111" in the input digital signal to sixteen signal points 1802 for following symbols as shown in FIG. 65. In the case where a negative-I positive-Q signal point 1801 is used by a QPSK symbol, the 16-value QAM modulator 112F assigns 4-bit sets of "0000", "0001", "0010", . . . , "1110", and "1111" in the input digital signal to sixteen signal points 1802 for following symbols as shown in FIG. 66. In the case where a negative-I negative-Q signal point 1801 is used by a QPSK symbol, the 16-value QAM modulator 112F assigns 4-bit sets of "0000", "0001", "0010", . . . , "1110", and "1111" in the input digital signal to sixteen signal points 1802 for following symbols as shown in FIG. 67. In the case where a positive-I negative-Q signal point 1801 is used by a QPSK symbol, the 16-value QAM modulator 112F assigns 4-bit sets of "0000", "0001", "0010", . . . , "1110", and "1111" in the input digital signal to sixteen signal points 1802 for following symbols as shown in FIG. 68.

Twentieth Embodiment

A twentieth embodiment of this invention is similar to the fifteenth embodiment thereof except for design changes indicated hereinafter.

Figure 69:
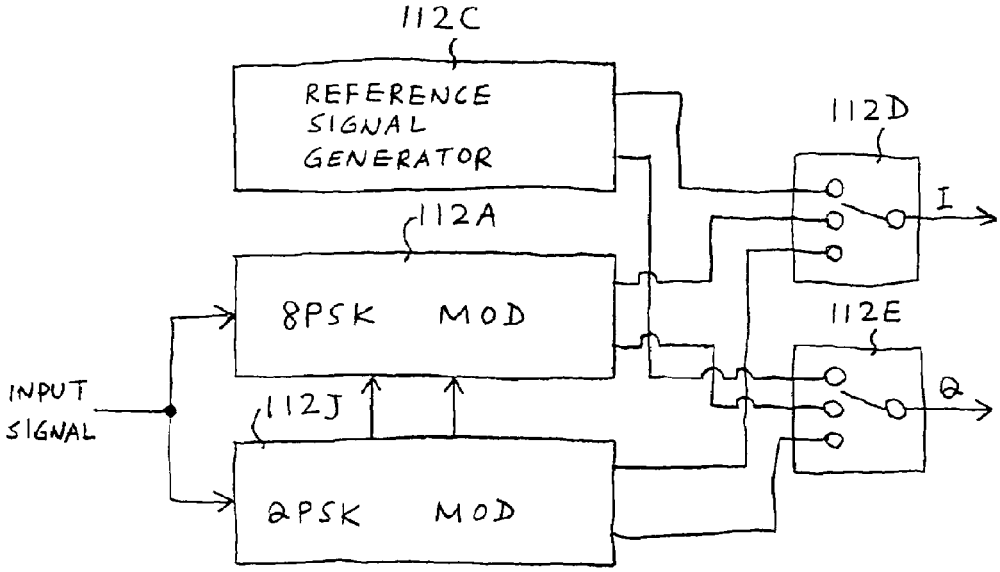
FIG. 69 is a block diagram of a modulator (a quadrature baseband modulator) in a transmitter in a radio communication system according to a twentieth embodiment of this invention.

As shown in FIG. 69, a modulator (a quadrature baseband modulator) in a transmitter in the twentieth embodiment of this invention includes a QPSK (quadrature phase shift keying) modulator 112J instead of the BPSK modulator 112B (see FIG. 31).

Figure 70:
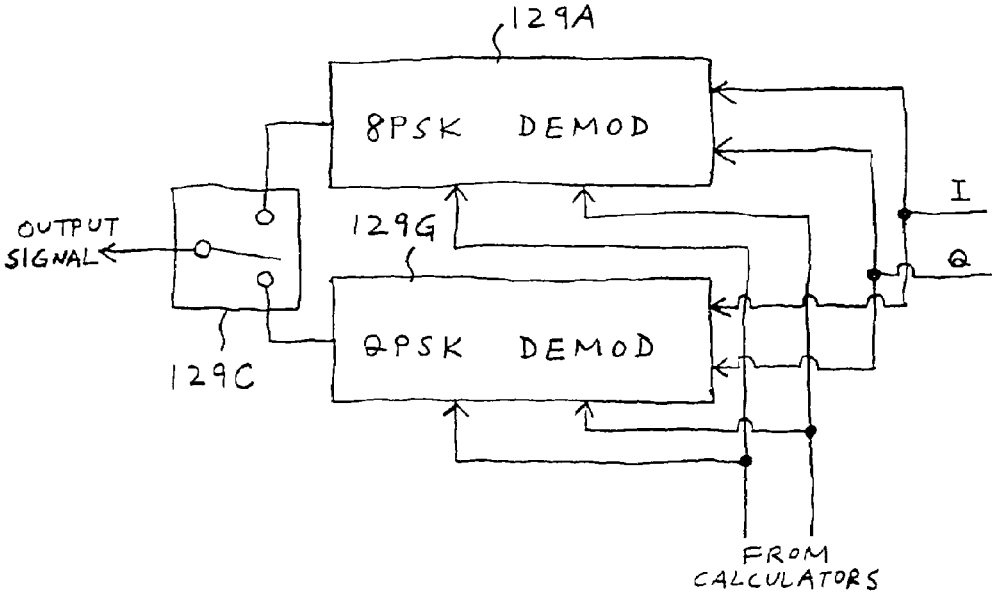
FIG. 70 is a block diagram of a quasi synchronous detector in a receiver in the radio communication system according to the twentieth embodiment of this invention.

As shown in FIG. 70, a quasi synchronous detector in a receiver in the twentieth embodiment of this invention includes a QPSK demodulator 129G instead of the BPSK demodulator 129B (see FIG. 33). The QPSK demodulator 129G implements demodulation inverse with respect to the modulation by the QPSK modulator 112J.

Figure 71:
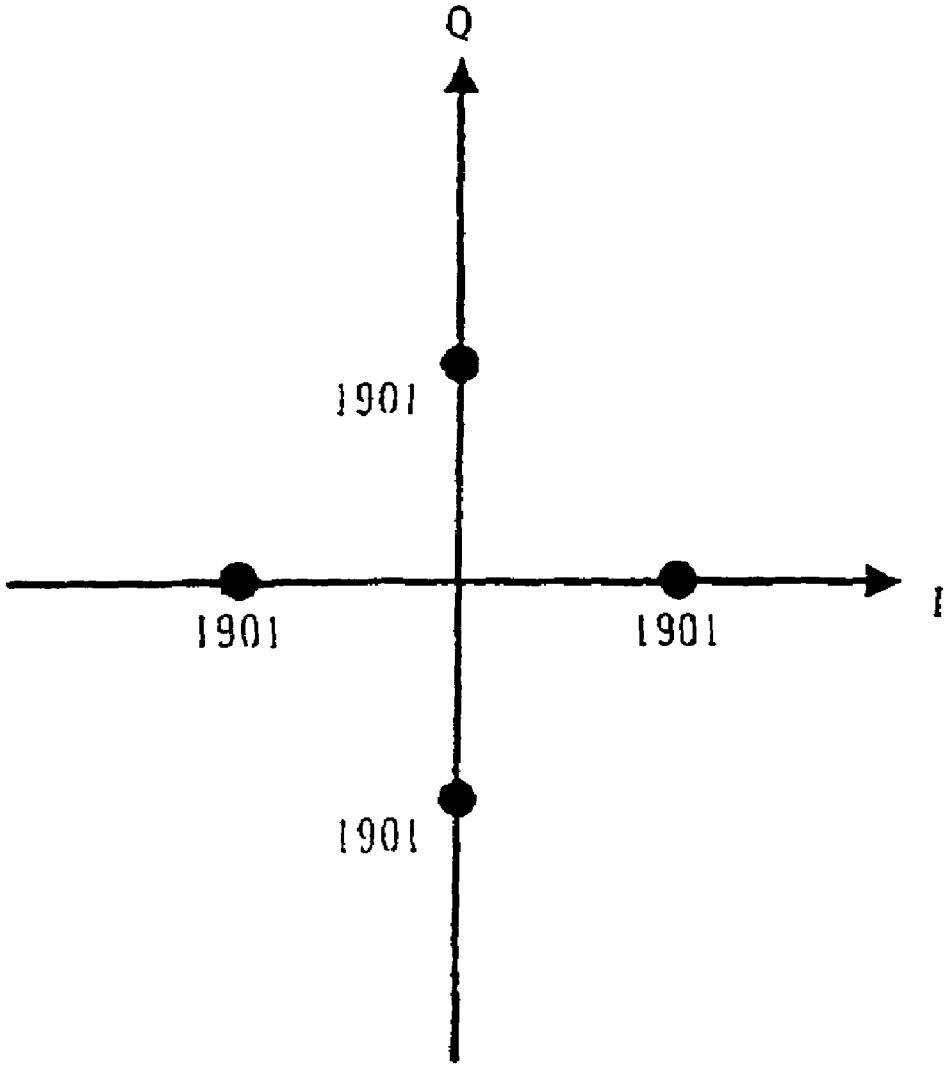
FIG. 71 is a diagram of an arrangement of signal points in an I-Q plane which are provided by QPSK.

FIG. 71 shows an arrangement of signal points in an I-Q plane which are provided by QPSK modulation implemented by the QPSK modulator 112J. In FIG. 71, the signal points are denoted by the reference numeral "1901". The positions ($I_{QPSKR}$, $Q_{QPSKR}$) of the signal points are given by the following equations.

$$I_{QPSKR} = I_{QPSK}\left\{\cos\left(\frac{\pi}{4} + \frac{n\pi}{2}\right)\right\} - Q_{QPSK}\left\{\sin\left(\frac{\pi}{4} + \frac{n\pi}{2}\right)\right\} \quad (33)$$

$$Q_{QPSKR} = I_{QPSK}\left\{\sin\left(\frac{\pi}{4} + \frac{n\pi}{2}\right)\right\} + Q_{QPSK}\left\{\cos\left(\frac{\pi}{4} + \frac{n\pi}{2}\right)\right\} \quad (34)$$

where "n" denotes an integer, and ($Q_{QPSK}$, $Q_{QPSK}$) are given by the equations (30) and (31). With reference to FIG. 71, all the signal points correspond to a same amplitude. In addition, all the distances between the neighboring signal points are equal to a same value. Furthermore, the signal points are spaced at equal angular intervals. Accordingly, a QPSK modulation-resultant signal is suited for detecting an amplitude distortion and a frequency offset.

A pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the 8PSK modulation. The first symbol in every frame (that is, the GPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK-demodulation-resultant digital signal when the output I and Q signals of the RF portion 122 represent a pilot symbol. The quasi synchronous detector 129 subjects the output I and Q signals of the RF portion 122 to 8PSK demodulation and outputs the 8PSK-demodulation-resultant digital signal when the output I and Q signals of the RF portion 122 represent a normal symbol different from a pilot symbol.

The QPSK modulator 112J in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$" The QPSK modulator 112J determines the phase "$\theta_{i+1}$" of the (i+1)-th QPSK symbol in an x-y plane on the basis of the difference between the phases "$\phi_i$" and "$\phi_{i+1}$" according to the following equation.

$$\theta_{i+1} = \phi_{i+1} - \phi_i (\text{mod. } 2\pi) \quad (35)$$

The QPSK modulator 112J implements QPSK modulation providing four signal points which are spaced at equal angular intervals. The QPSK modulator 112J assigns 2-bit sets of "00", "01", "10", and "11" to the four signal points respectively. The QPSK modulator 112J outputs a pair of modulation-resultant I and Q signals to the switches 112D and 112E. The QPSK modulator 112J includes a latch or a register for sampling and holding a pair of modulation-resultant I and Q signals which are selected by the switches 112D and 112E. The modulation-resultant I and Q signals held by the latch or the register are periodically updated. The QPSK modulator 112J outputs a pair of held modulation-resultant I and Q signals to the 8PSK modulator 112A.

Figure 72:
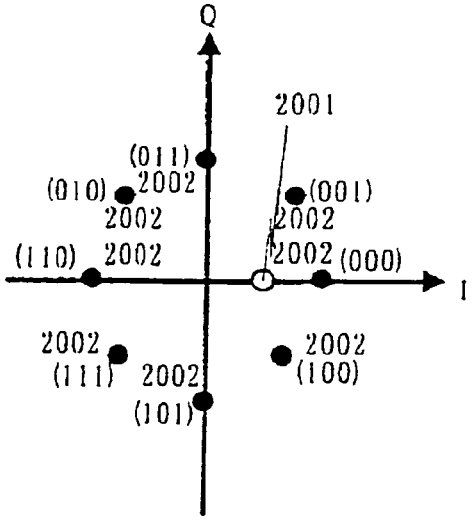
FIG. 72 is a diagram of signal points of 8PSK, logic states assigned thereto, and a first signal point of QPSK.
Figure 73:
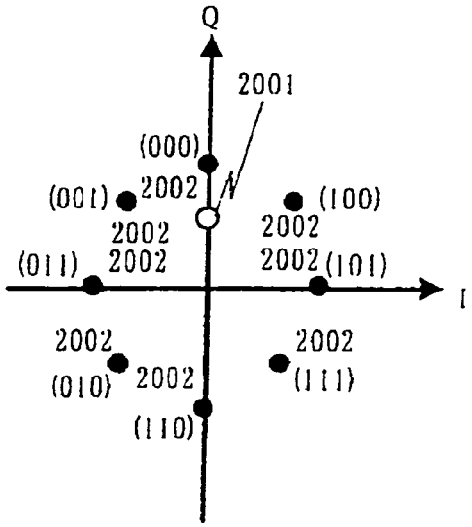
FIG. 73 is a diagram of signal points of 8PSK, logic states assigned thereto, and a second signal point of QPSK.
Figure 74:
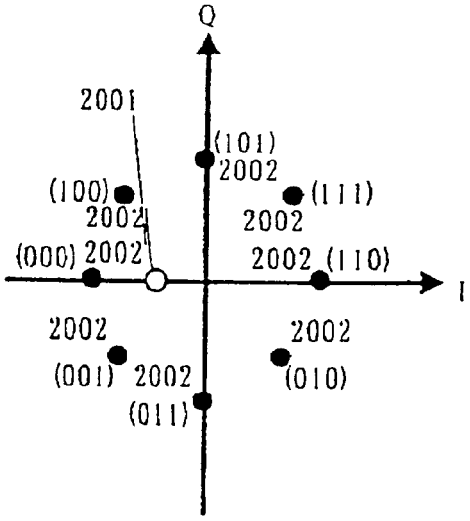
FIG. 74 is a diagram of signal points of 8PSK, logic states assigned thereto, and a third signal point of QPSK.
Figure 75:
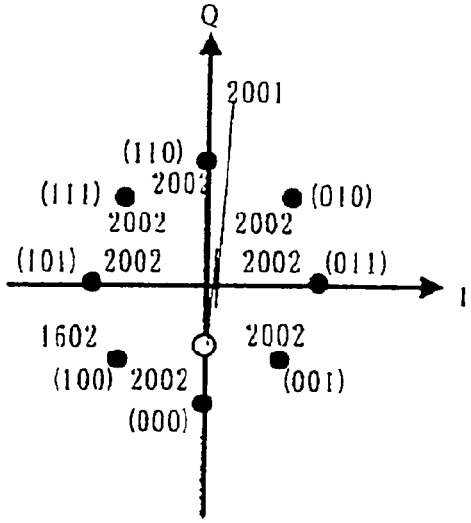
FIG. 75 is a diagram of signal points of 8PSK, logic states assigned thereto, and a fourth signal point of QPSK.

The 8PSK modulation implemented by the 8PSK modulator 112A provides 8 different signal points to which 8 different logic states are assigned respectively. For symbols following a QPSK symbol in every frame, the 8PSK modulator 112A determines the assignment of the logic states to the signal points on the basis of the signal point used by the QPSK symbol. The signal point used by the QPSK symbol is represented by a pair of QPSK-modulation-resultant I and Q signals fed from the QPSK modulator 112J. In the case where a signal point 2001 on the positive side of the I axis is used by a QPSK symbol, the 8PSK modulator 112A assigns 3-bit sets of "000", "001", "010", "011", "100", "101", "110", and "111" in the input digital signal to eight signal points 2002 for following symbols as shown in FIG. 72. In the case where a signal point 2001 on the positive side of the Q axis is used by a QPSK symbol, the 8PSK modulator 112A assigns 3-bit sets of "000", "001" "010", "011", "100", "101", "110", and "111" in the input digital signal to eight signal points 2002 for following symbols as shown in FIG. 73. In the case where a signal point 2001 on the negative side of the I axis is used by a QPSK symbol, the 8PSK modulator 112A assigns 3-bit sets of "000", "001", "010", "011", "100", "101", "110", and "111" in the input digital signal to eight signal points 2002 for following symbols as shown in FIG. 74. In the case where a signal point 2001 on the negative side of the Q axis is used by a QPSK symbol, the 8PSK modulator 112A assigns 3-bit sets of "000", "001", "010", "011", "100", "101", "110", and "111" in the input digital signal to eight signal points 2002 for following symbols as shown in FIG. 75.

Twenty-First Embodiment

A twenty-first embodiment of this invention is similar to the sixteenth embodiment thereof except for design changes indicated hereinafter.

Figure 76:
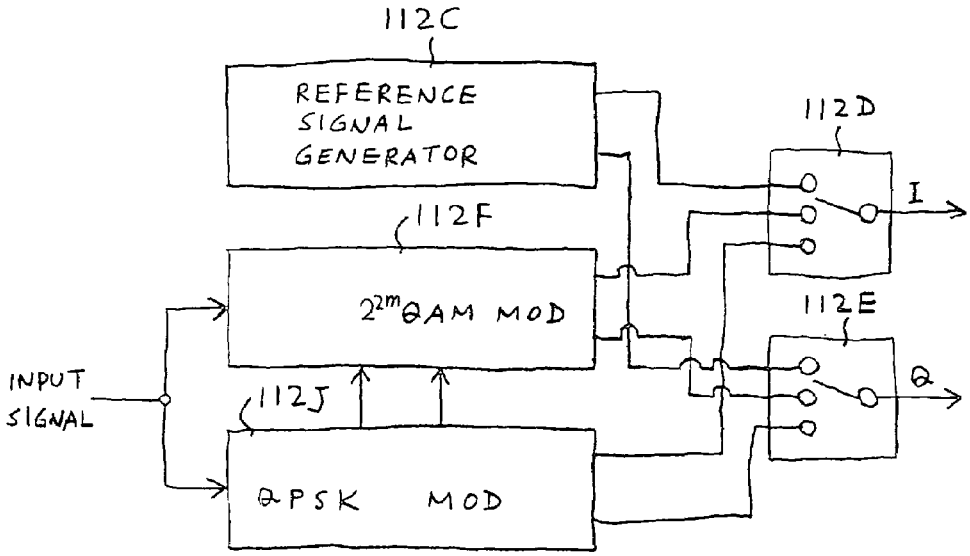
FIG. 76 is a block diagram of a modulator (a quadrature baseband modulator) in a transmitter in a radio communication system according to a twenty-first embodiment of this invention.

As shown in FIG. 76, a modulator (a quadrature baseband modulator) in a transmitter in the twenty-first embodiment of this invention includes a QPSK (quadrature phase shift keying) modulator 112J instead of the BPSK modulator 112B (see FIG. 40). The QPSK modulator 112J implements QPSK modulation providing signal points which are arranged in an I-Q plane as shown in FIG. 71.

Figure 77:
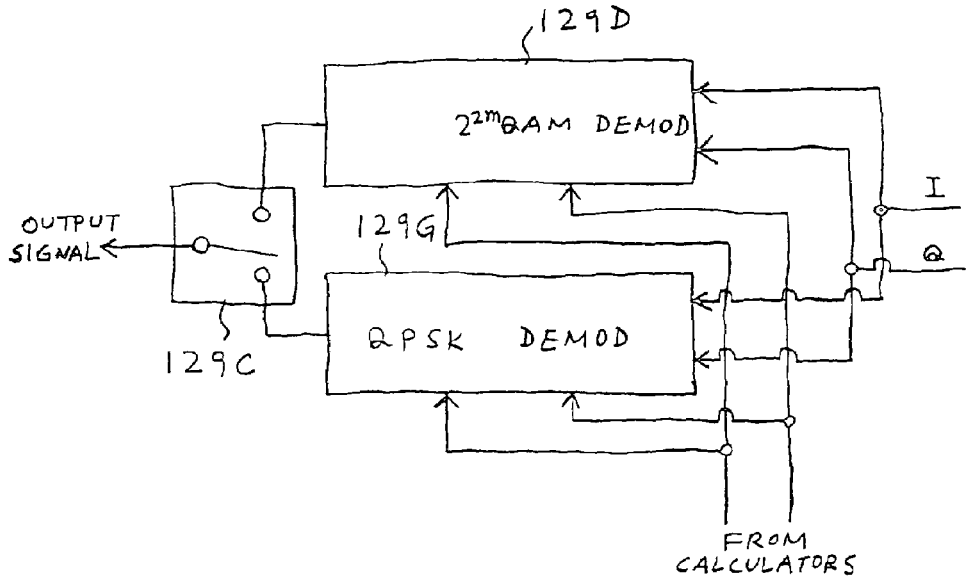
FIG. 77 is a block diagram of a quasi synchronous detector in a receiver in the radio communication system according to the twenty-first embodiment of this invention.

As shown in FIG. 77, a quasi synchronous detector in a receiver in the twenty-first embodiment of this invention includes a QPSK demodulator 129G instead of the BPSK demodulator 129B (see FIG. 41). The QPSK demodulator 129G implements demodulation inverse with respect to the modulation by the QPSK modulator 112J.

A pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM modulation. The first symbol in every frame (that is, the QPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK-demodulation-resultant digital signal when the output I and Q signals of the RF portion 122 represent a pilot symbol. The quasi synchronous detector 129 subjects the output I and Q signals of the RF portion 122 to $2^{2m}$-value QAM demodulation and outputs the QAM-demodulation-resultant digital signal when the output I and Q signals of the RF portion 122 represent a normal symbol different from a pilot symbol.

The QPSK modulator 112J in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$". The QPSK modulator 112J determines the phase "$\theta_{i+1}$" of the (i+1)-th QPSK symbol in an x-y plane on the basis of the difference between the phases "$\phi_i$" and "$\phi_{i+1}$" according to the equation (35). The QPSK modulator 112J implements QPSK modulation providing four signal points which are spaced at equal angular intervals. The QPSK modulator 112J assigns 2-bit sets of "00", "01", "10", and "11" to four signal points in the x-y plane respectively. The QPSK modulator 112J outputs a pair of modulation-resultant I and Q signals to the switches 112D and 112E. The QPSK modulator 112J includes a latch or a register for sampling and holding a pair of modulation-resultant I and Q signals which are selected by the switches 112D and 112E. The modulation-resultant I and Q signals held by the latch or the register are periodically updated. The QPSK modulator 112J outputs a pair of held modulation-resultant I and Q signals to the $2^{2m}$-value QAM modulator 112F.

Figure 78:
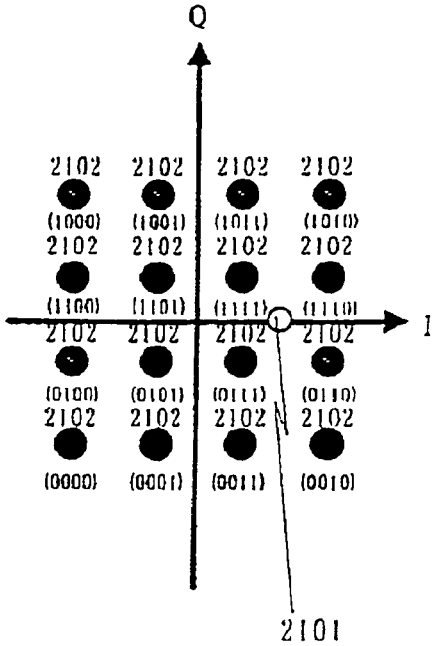
FIG. 78 is a diagram of signal points of 16QAM (16-value QAM), logic states assigned thereto, and a first signal point of QPSK.
Figure 79:
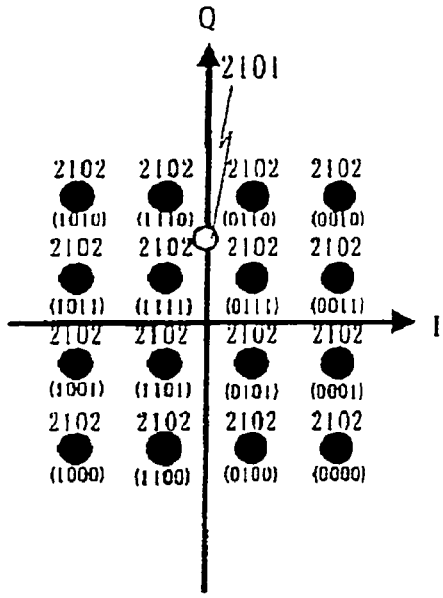
FIG. 79 is a diagram of signal points of 16QAM (16-value QAM), logic states assigned thereto, and a second signal point of QPSK.
Figure 80:
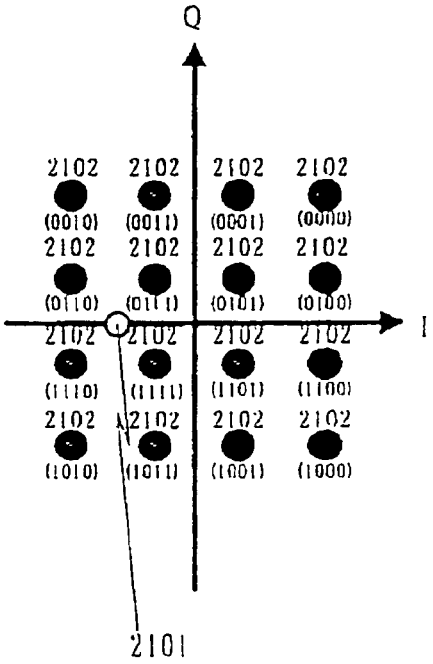
FIG. 80 is a diagram of signal points of 16QAM (16-value QAM), logic states assigned thereto, and a third signal point of QPSK.
Figure 81:
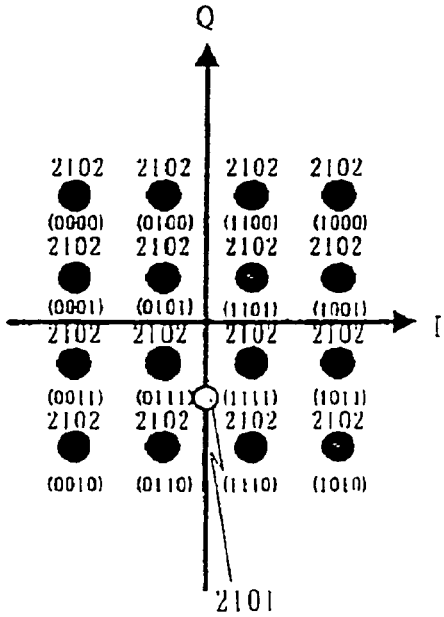
FIG. 81 is a diagram of signal points of 16QAM (16-value QAM), logic states assigned thereto, and a fourth signal point of QPSK.

An example of the modulation implemented by the $2^{2m}$-value QAM modulator 112F is the 16-value QAM. The 16-value QAM by the $2^{2m}$-value QAM modulator 112F provides 16 different signal points to which 16 different logic states are assigned respectively. For symbols following a QPSK symbol in every frame, the 16-value QAM modulator 112F determines the assignment of the logic states to the signal points on the basis of the signal point used by the QPSK symbol. The signal point used by the QPSK symbol is represented by a pair of QPSK-modulation-resultant I and Q signals fed from the QPSK modulator 112J. In the case where a signal point 2101 on the positive side of the I axis is used by a QPSK symbol, the 16-value QAM modulator 112F assigns 4-bit sets of "0000", "0001", "0010", . . . , "1110", and "1111" in the input digital signal to sixteen signal points 2102 for following symbols as shown in FIG. 78. In the case where a signal point 2101 on the positive side of the Q axis is used by a QPSK symbol, the 16-value QAM modulator 112F assigns 4-bit sets of "0000", "0001", "0010", . . . , "1110", and "1111" in the input digital signal to sixteen signal points 2102 for following symbols as shown in FIG. 79. In the case where a signal point 2101 on the negative side of the I axis is used by a QPSK symbol, the 16-value QAM modulator 112F assigns 4-bit sets of "0000", "0001", "0010", . . . , "1110", and "1111" in the input digital signal to sixteen signal points 2102 for following symbols as shown in FIG. 80. In the case where a signal point 2101 on the negative side of the Q axis is used by a QPSK symbol, the 16-value QAM modulator 112F assigns 4-bit sets of "0000", "0001", "0010", . . . , "1110", and "1111" in the input digital signal to sixteen signal points 2102 for following symbols as shown in FIG. 81.

Twenty-Second Embodiment

A twenty-second embodiment of this invention is similar to the seventeenth embodiment thereof except for design changes indicated hereinafter.

Figure 82:
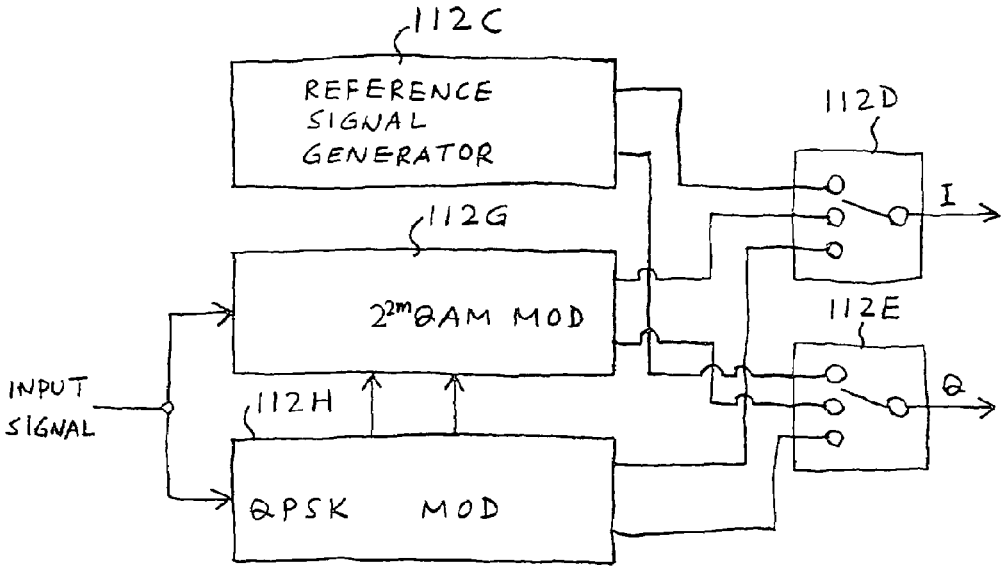
FIG. 82 is a block diagram of a modulator (a quadrature baseband modulator) in a transmitter in a radio communication system according to a twenty-second embodiment of this invention.

As shown in FIG. 82, a modulator (a quadrature baseband modulator) in a transmitter in the twenty-second embodiment of this invention includes a QPSK (quadrature phase shift keying) modulator 112H instead of the BPSK modulator 112B (see FIG. 47). The QPSK modulator 112H implements QPSK modulation providing signal points which are arranged in an I-Q plane as shown in FIG. 55.

Figure 83:
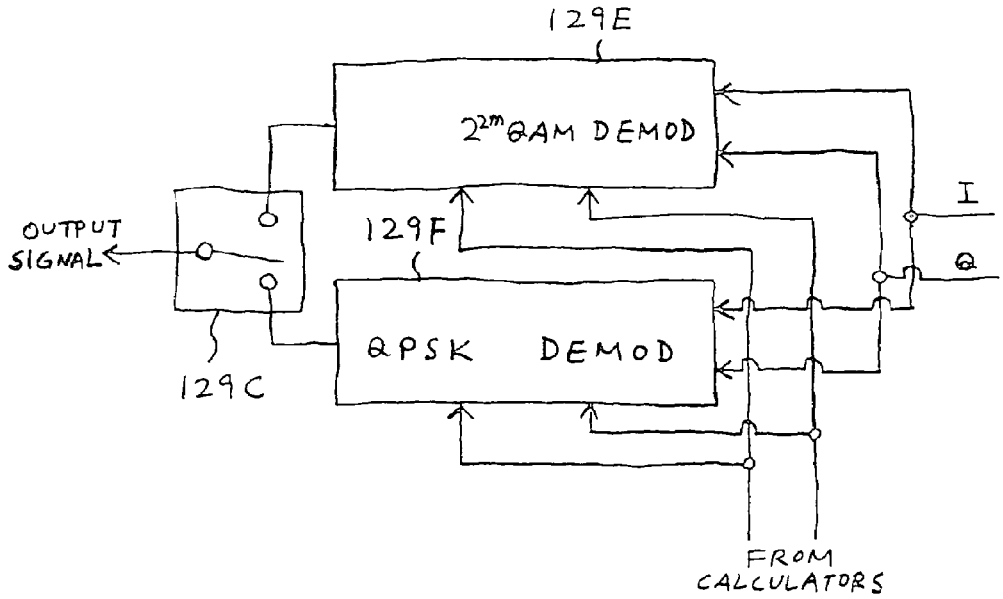
FIG. 83 is a block diagram of a quasi synchronous detector in a receiver in the radio communication system according to the twenty-second embodiment of this invention.

As shown in FIG. 83, a quasi synchronous detector in a receiver in the twenty-second embodiment of this invention includes a QPSK demodulator 129F instead of the BPSK demodulator 129B (see FIG. 48). The QPSK demodulator 129F implements demodulation inverse with respect to the modulation by the QPSK modulator 112H.

A pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM modulation. The first symbol in every frame (that is, the QPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal) having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK-demodulation-resultant digital signal when the output I and Q signals of the RF portion 122 represent a pilot symbol. The quasi synchronous detector 129 subjects the output I and Q signals of the RF portion 122 to $2^{2m}$-value QAM demodulation and outputs the QAM-demodulation-resultant digital signal when the output I and Q signals of the RF portion 122 represent a normal symbol different from a pilot symbol.

The QPSK modulator 112H in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$" The QPSK modulator 112H determines the phase "$\theta_{i+1}$" of the (i+1)-th QPSK symbol in an x-y plane on the basis of the difference between the phases "$\phi_i$" and "$\phi_{i+1}$" according to the equation (32). The QPSK modulator 112H implements QPSK modulation providing four signal points which are spaced at equal angular intervals. The QPSK modulator 112H assigns 2-bit sets of "00", "01", "10", and "11" to four signal points in the x-y plane respectively. The QPSK modulator 112H outputs a pair of modulation-resultant I and Q signals to the switches 112D and 112E. The QPSK modulator 112H includes a latch or a register for sampling and holding a pair of modulation-resultant I and Q signals which are selected by the switches 112D and 112E. The modulation-resultant I and Q signals held by the latch or the register are periodically updated. The QPSK modulator 112H outputs a pair of held modulation-resultant I and Q signals to the $2^{2m}$-value QAM modulator 112G.

Figure 84:
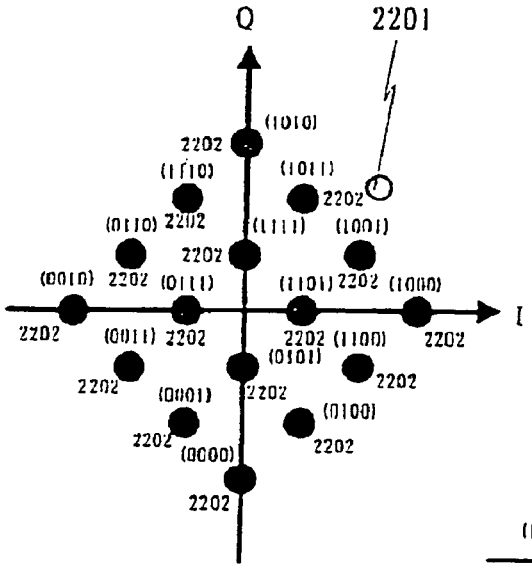
FIG. 84 is a diagram of signal points of 16QAM (16-value QAM), logic states assigned thereto, and a first signal point of QPSK.
Figure 85:
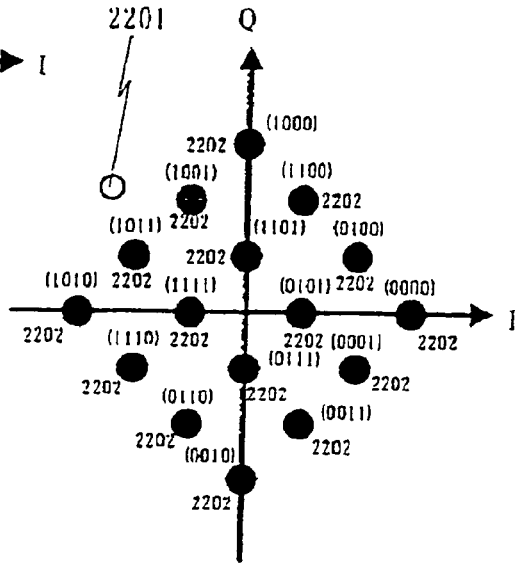
FIG. 85 is a diagram of signal points of 16QAM (16-value QAM), logic states assigned thereto, and a second signal point of QPSK.
Figure 86:
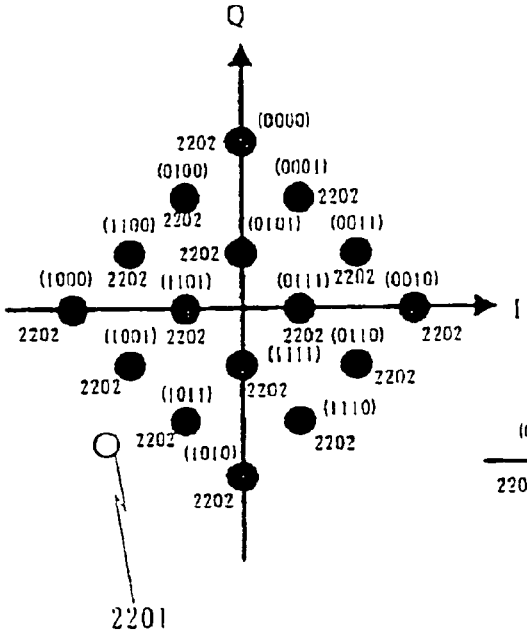
FIG. 86 is a diagram of signal points of 16QAM (16-value QAM), logic states assigned thereto, and a third signal point of QPSK.
Figure 87:
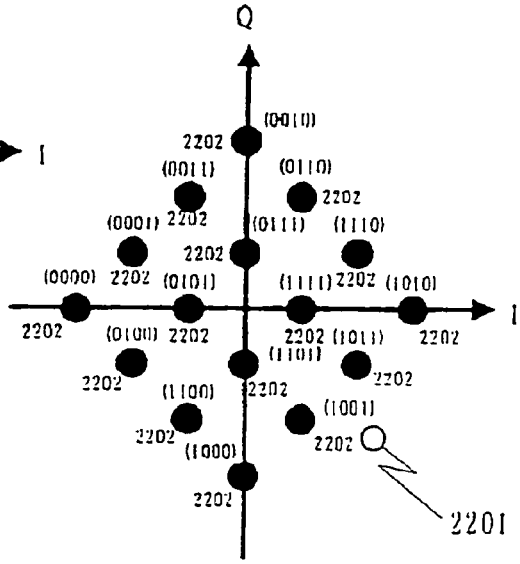
FIG. 87 is a diagram of signal points of 16QAM (16-value QAM), logic states assigned thereto, and a fourth signal point of QPSK.

An example of the modulation implemented by the $2^{2m}$-value QAM modulator 112G is the 16-value QAM. The 16-value QAM by the $2^{2m}$-value QAM modulator 112G provides 16 different signal points to which 16 different logic states are assigned respectively. For symbols following a QPSK symbol in every frame, the 16-value QAM modulator 112G determines the assignment of the logic states to the signal points on the basis of the signal point used by the QPSK symbol. The signal point used by the QPSK symbol is represented by a pair of QPSK-modulation-resultant I and Q signals fed from the QPSK modulator 112H. In the case where a positive-I positive-Q signal point 2201 is used by a QPSK symbol, the 16-value QAM modulator 112G assigns 4-bit sets of "0000", "0001", "0010", . . . , "1110", and "1111" in the input digital signal to sixteen signal points 2202 for following symbols as shown in FIG. 84. In the case where a negative-I positive-Q signal point 2201 is used by a QPSK symbol, the 16-value QAM modulator 112G assigns 4-bit sets of "0000", "0001", "0010", . . . , "1110", and "1111" in the input digital signal to sixteen signal points 2202 for following symbols as shown in FIG. 85. In the case where a negative-I negative-Q signal point 2201 is used by a QPSK symbol, the 16-value QAM modulator 112G assigns 4-bit sets of "0000", "0001", "0010", . . . , "1110", and "1111" in the input digital signal to sixteen signal points 2202 for following symbols as shown in FIG. 86. In the case where a positive-I negative-Q signal point 2201 is used by a QPSK symbol, the 16-value QAM modulator 112G assigns 4-bit sets of "0000", "0001", "0010", . . . , "1110", and "1111" in the input digital signal to sixteen signal points 2202 for following symbols as shown in FIG. 87.

Twenty-Third Embodiment

A twenty-third embodiment of this invention is similar to the seventeenth embodiment thereof except for design changes indicated hereinafter.

Figure 88:
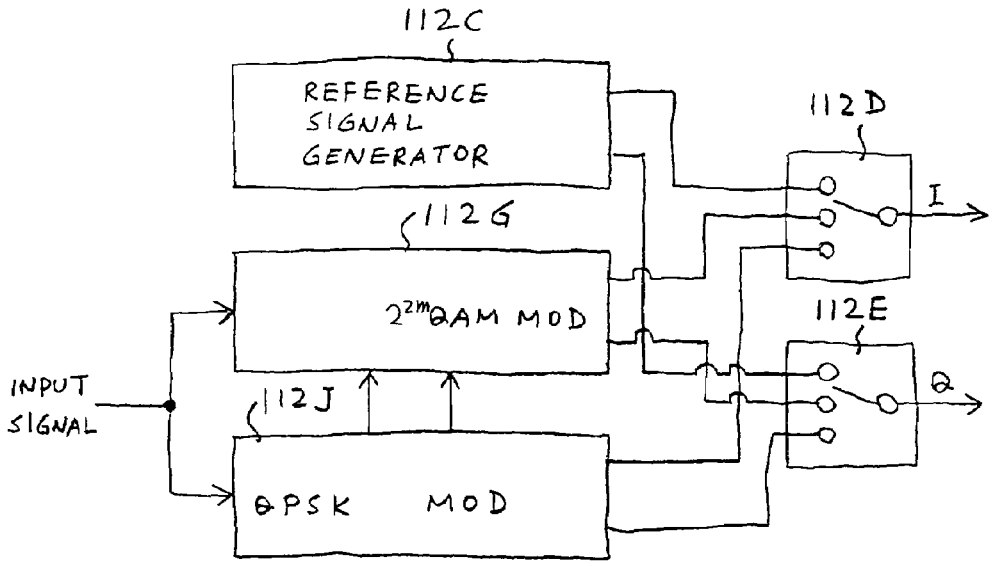
FIG. 88 is a block diagram of a modulator (a quadrature baseband modulator) in a transmitter in a radio communication system according to a twenty-third embodiment of this invention.

As shown in FIG. 88, a modulator (a quadrature baseband modulator) in a transmitter in the twenty-third embodiment of this invention includes a QPSK (quadrature phase shift keying) modulator 112J instead of the BPSK modulator 112B (see FIG. 47). The QPSK modulator 112J implements QPSK modulation providing signal points which are arranged in an I-Q plane as shown in FIG. 71.

Figure 89:
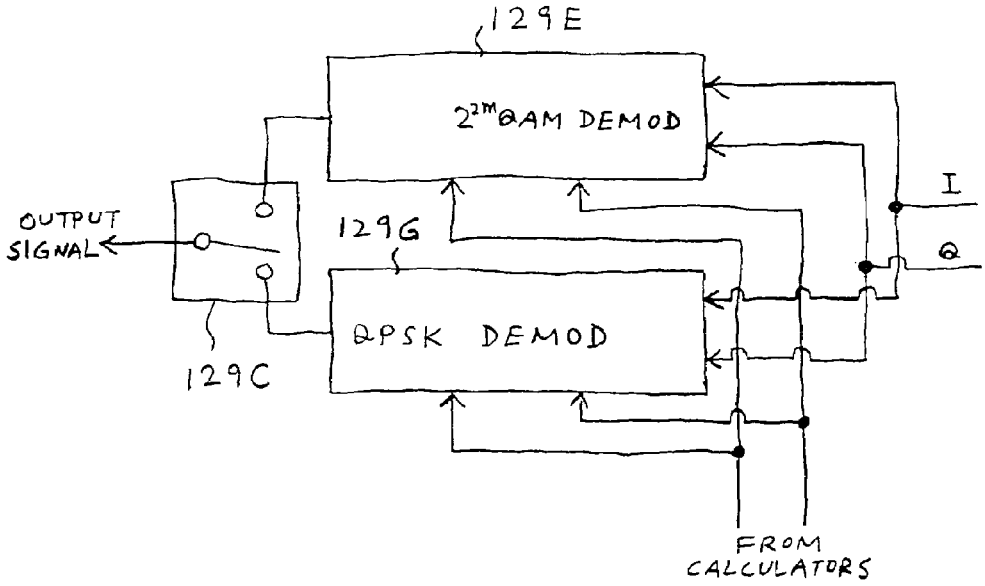
FIG. 89 is a block diagram of a quasi synchronous detector in a receiver in the radio communication system according to the twenty-third embodiment of this invention.

As shown in FIG. 89, a quasi synchronous detector in a receiver in the twenty-second embodiment of this invention includes a QPSK demodulator 129G instead of the BPSK demodulator 129B (see FIG. 48). The QPSK demodulator 129G implements demodulation inverse with respect to the modulation by the QPSK modulator 112J.

A pair of the I signal and the Q signal outputted from the quadrature baseband modulator in the transmitter (see FIG. 30), or the RF signal outputted from the RF portion in the transmitter is composed of a stream of frames each having N successive symbols. Here, N denotes a predetermined natural number. In every frame, the first symbol results from the QPSK modulation, and the second and later symbols result from the $2^{2m}$-value QAM modulation. The first symbol in every frame (that is, the QPSK symbol in every frame) is used by the receiver (see FIG. 32) as a pilot symbol for estimating an amplitude distortion amount and a frequency offset amount. It should be noted that every pilot symbol also carries a part of the main information to be transmitted.

In the receiver (see FIG. 32), the calculator 125 separates pilot symbols (first symbols in frames) from the output I and Q signals of the RF portion 122 in response to a signal (a frame and symbol sync signal) having a period corresponding to N symbols. The calculator 125 estimates an amplitude distortion amount from the separated pilot symbols. Similarly, the calculator 126 separates pilot symbols (first symbols in frames) from the output I and Q signals of the RF portion 122 in response to a signal (a frame and symbol sync signal)

having a period corresponding to N symbols. The calculator 126 estimates a frequency offset amount from the separated pilot symbols.

The quasi synchronous detector 129 in the receiver (see FIG. 32) is designed to implement the following processes. The quasi synchronous detector 129 subjects the output I and Q signals of the RF portion 122 to QPSK demodulation and outputs the QPSK-demodulation-resultant digital signal when the output I and Q signals of the RF portion 122 represent a pilot symbol. The quasi synchronous detector 129 subjects the output I and Q signals of the RF portion 122 to $2^{2m}$-value QAM demodulation and outputs the QAM-demodulation-resultant digital signal when the output I and Q signals of the RF portion 122 represent a normal symbol different from a pilot symbol.

The QPSK modulator 112J in the quadrature baseband modulator 112 of the transmitter is designed to implement processes indicated below. The phase of an i-th QPSK symbol in the I-Q plane is denoted by "$\phi_i$", and the phase of an (i+1)-th QPSK symbol in the I-Q plane is denoted by "$\phi_{i+1}$". The QPSK modulator 112H determines the phase "$\theta_{i+1}$" of the (i+1)-th QPSK symbol in an x-y plane on the basis of the difference between the phases "$\phi_i$" and "$\phi_{i+1}$" according to the equation (35). The QPSK modulator 112J implements QPSK modulation providing four signal points which are spaced at equal angular intervals. The QPSK modulator 112J assigns 2-bit sets of "00", "01", "10", and "11" to four signal points in the x-y plane respectively. The QPSK modulator 112J outputs a pair of modulation-resultant I and Q signals to the switches 112D and 112E. The QPSK modulator 112J includes a latch or a register for sampling and holding a pair of modulation-resultant I and Q signals which are selected by the switches 112D and 112E. The modulation-resultant I and Q signals held by the latch or the register are periodically updated. The QPSK modulator 112J outputs a pair of held modulation-resultant I and Q signals to the $2^{2m}$-value QAM modulator 112G.

Figure 90:
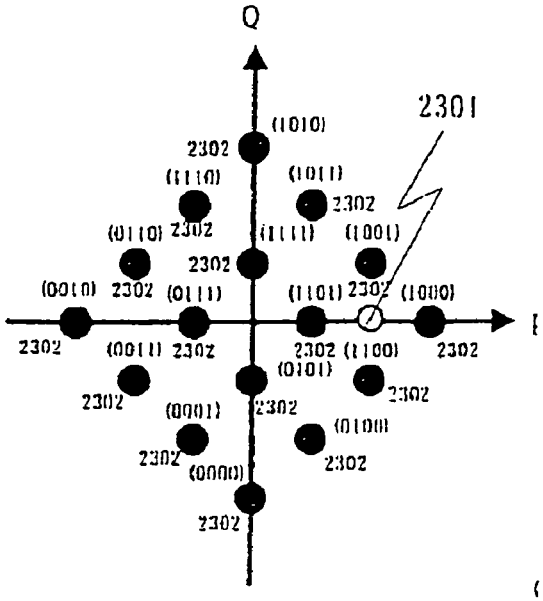
FIG. 90 is a diagram of signal points of 16QAM (16-value QAM), logic states assigned thereto, and a first signal point of QPSK.
Figure 91:
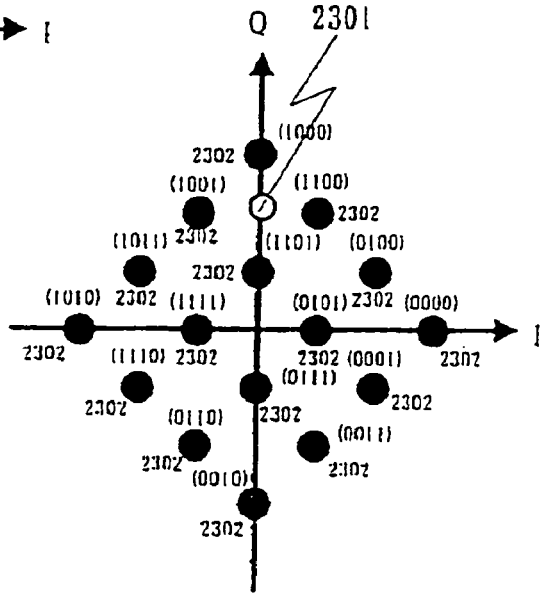
FIG. 91 is a diagram of signal points of 16QAM (16-value QAM), logic states assigned thereto, and a second signal point of QPSK.
Figure 92:
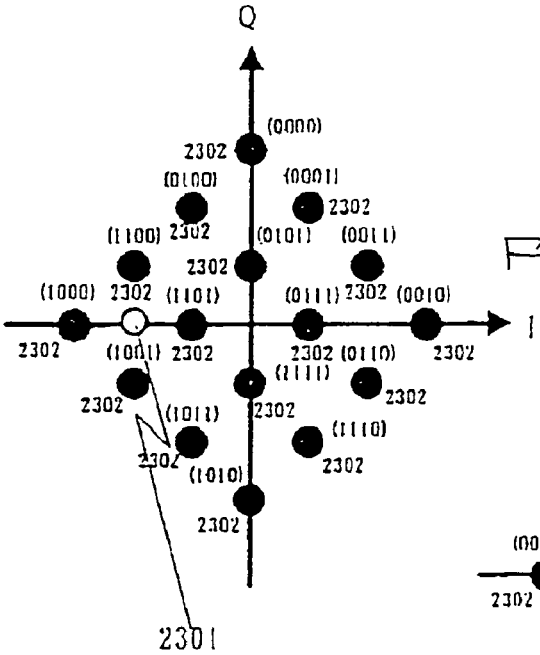
FIG. 92 is a diagram of signal points of 16QAM (16-value QAM), logic states assigned thereto, and a third signal point of QPSK.
Figure 93:
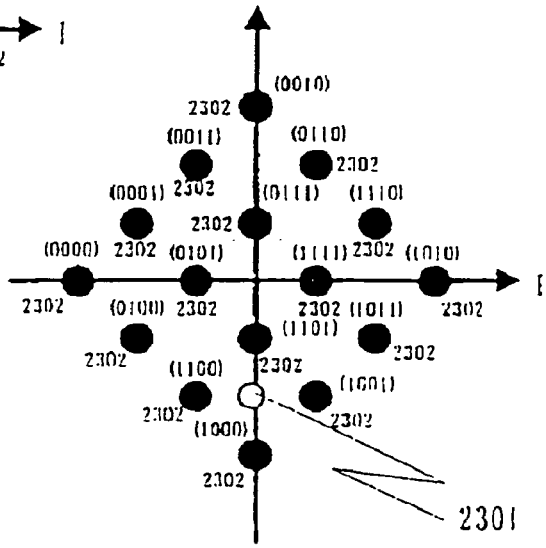
FIG. 93 is a diagram of signal points of 16QAM (16-value QAM), logic states assigned thereto, and a fourth signal point of QPSK.

An example of the modulation implemented by the $2^{2m}$-value QAM modulator 112G is the 16-value QAM. The 16-value QAM by the $2^{2m}$-value QAM modulator 112G provides 16 different signal points to which 16 different logic states are assigned respectively. For symbols following a QPSK symbol in every frame, the 16-value QAM modulator 112G determines the assignment of the logic states to the signal points on the basis of the signal point used by the QPSK symbol. The signal point used by the QPSK symbol is represented by a pair of QPSK-modulation-resultant I and Q signals fed from the QPSK modulator 112J. In the case where a signal point 2301 on the positive side of the I axis is used by a QPSK symbol, the 16-value QAM modulator 112G assigns 4-bit sets of "0000", "0001", "0010", . . . , "1110", and "1111" in the input digital signal to sixteen signal points 2302 for following symbols as shown in FIG. 90. In the case where a signal point 2301 on the positive side of the Q axis is used by a QPSK symbol, the 16-value QAM modulator 112G assigns 4-bit sets of "0000", "0001", "0010", . . . , "1110", and "1111" in the input digital signal to sixteen signal points 2302 for following symbols as shown in FIG. 91. In the case where a signal point 2301 on the negative side of the I axis is used by a QPSK symbol, the 16-value QAM modulator 112G assigns 4-bit sets of "0000", "0001", "0010", . . . , "1110", and "1111" in the input digital signal to sixteen signal points 2302 for following symbols as shown in FIG. 92. In the case where a signal point 2301 on the negative side of the Q axis is used by a QPSK symbol, the 16-value QAM modulator 112G assigns 4-bit sets of "0000", "0001", "0010", . . . , "1110", and "1111" in the input digital signal to sixteen signal points 2302 for following symbols as shown in FIG. 93.

Simulation

Simulation was executed by a computer. During the simulation, normal symbols were made on the basis of 16-value QAM while pilot symbols were made on the basis of QPSK modulation according to this invention. The normal symbols and the pilot symbols were combined into a symbol stream in a way based on this invention. In the symbol stream, the number of normal symbols between pilot symbols (that is, a data symbol length) was equal to a given natural number "n" while each of the separate pilot symbols was equal to "1" in length. The given natural number "n" was "1", "7", or "15". Accordingly, symbol streams of three types were generated. During the simulation, each of the first-type symbol stream, the second-type symbol stream, and the third-type symbol stream was transmitted from a transmitter to a receiver. In the receiver, normal symbols were subjected to quasi synchronous detection using 16-value QAM demodulation while pilot symbols were subjected to delayed detection using QPSK demodulation. Regarding the transmission of each of the first-type symbol stream, the second-type symbol stream, and the third-type symbol stream, the bit error rate was calculated at a varying ratio of the 1-bit signal energy "Eb" to the noise power density "N0". In the case where the given natural number "n" was equal to "1", as the ratio of the 1-bit signal energy "Eb" to the noise power density "N0" increased, the calculated bit error rate decreased along the curve D1 of FIG. 94. In the case where the given natural number "n" was equal to "7", as the ratio of the 1-bit signal energy "Eb" to the noise power density "N0" increased, the calculated bit error rate decreased along the curve D7 of FIG. 94. In the case where the given natural number "n" was equal to "15", as the ratio of the 1-bit signal energy "Eb" to the noise power density "N0" increased, the calculated bit error rate decreased along the curve D15 of FIG. 94.

As comparative examples, similar simulation was implemented on a prior-art system. Specifically, normal symbols were made on the basis of 16-value QAM while a signal point corresponding to a maximum amplitude was used as pilot symbols. The normal symbols and the pilot symbols were combined into a symbol stream in a prior-art way. In the symbol stream, the number of normal symbols between pilot symbols (that is, a data symbol length) was equal to a given natural number "n" while each of the separate pilot symbols was equal to "1" in length. The given natural number "n" was "1", "7", or "15". Accordingly, symbol streams of three types were generated. Each of the first-type symbol stream, the second-type symbol stream, and the third-type symbol stream was transmitted from a transmitter to a receiver. In the receiver, the transmitted symbol stream was subjected to quasi synchronous detection using 16-value QAM demodulation. Regarding the transmission of each of the first-type symbol stream, the second-type symbol stream, and the third-type symbol stream, the bit error rate was calculated at a varying ratio of the 1-bit signal energy "Eb" to the noise power density "N0". In the case where the given natural number "n" was equal to "1", as the ratio of the 1-bit signal energy "Eb" to the noise power density "N0" increased, the calculated bit error rate decreased along the curve E1 of FIG. 94. In the case where the given natural number "n" was equal to "7", as the ratio of the 1-bit signal energy "Eb" to the noise power density "N0" increased, the calculated bit error rate decreased along the curve E7 of FIG. 94. In the case where the given natural number "n" was equal to "15", as the ratio of the 1-bit signal energy "Eb" to the noise power density "N0" increased, the calculated bit error rate decreased along the curve E15 of FIG. 94.

Figure 94:
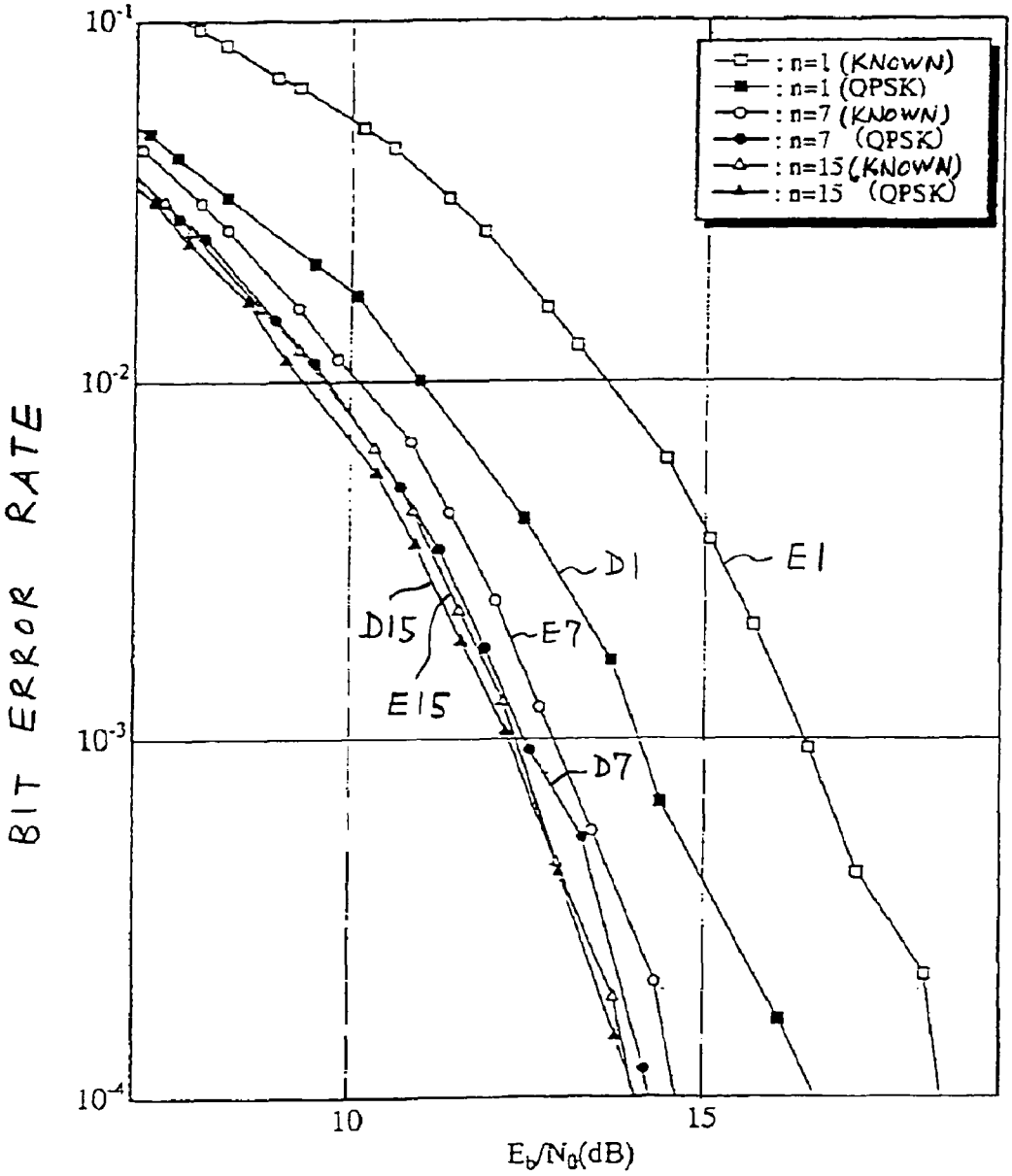
FIG. 94 is a diagram of relations between the bit error rate and the ratio of the 1-bit signal energy "Eb" to the noise power density "N0".

As shown in FIG. 94, the bit error rates (the curves D1, D7, and D15) in this invention are better than the corresponding prior-art bit error rates (the curves E1, E7, and E15).

What is claimed is:

1. A method for modulation, comprising the steps of:

regularly subjecting an input digital signal to first modulation and second modulation to convert the input digital signal into a pair of a baseband I signal and a baseband Q signal, the first modulation and the second modulation being different from each other *and regularly applied*; and outputting the pair of the baseband I signal and the baseband Q signal;

wherein the first modulation is at least 8-signal-point modulation, and the second modulation is phase shift keying;

wherein the phase shift keying provides periodically-spaced symbols which represent corresponding portions of the input digital signal in terms of differences between phases of the periodically-spaced symbols; and wherein the at least 8-signal-point modulation assigns logic states of the input digital signal to respective signal points for a first symbol in response to a signal point used by a second symbol of the phase shift keying which precedes the first symbol.

2. A method as recited in claim 1, wherein the phase shift keying is quadrature phase shift keying.

3. A method as recited in claim 2, wherein the quadrature phase shift keying provides signal points on an I axis and a Q axis in an I-Q plane.

4. A method as recited in claim 1, wherein the at least 8-signal-point modulation is at least 8 quadrature amplitude modulation.

5. A method as recited in claim 3, wherein the at least 8-signal-point modulation is at least 8 quadrature amplitude modulation.

6. A method as recited in claim 4, wherein at least 8 quadrature amplitude modulation is 16 quadrature amplitude modulation.

7. A method as recited in claim 5, wherein the at least 8 quadrature amplitude modulation is 16 quadrature amplitude modulation.

8. A method as recited in claim 4, wherein the at least 8 quadrature amplitude modulation provides signal points which result from rotation of signal points of at least 8-value normal quadrature amplitude modulation through an angle of $\pi/4$ radian about an origin in an I-Q plane.

9. A method as recited in claim 5, wherein the at least 8 quadrature amplitude modulation provides signal points which result from rotation of signal points of at least 8-value normal quadrature amplitude modulation through an angle of $\pi/4$ radian about an origin in an I-Q plane.

10. A method as recited in claim 6, wherein the 16 quadrature amplitude modulation provides signal points which result from rotation of signal points of 16-value normal quadrature amplitude modulation through an angle of $\pi/4$ radian about an origin in an I-Q plane.

11. A method as recited in claim 7, wherein the 16 quadrature amplitude modulation provides signal points which result from rotation of signal points of 16-value normal quadrature amplitude modulation through an angle of $\pi/4$ radian about an origin in an I-Q plane.

12. A method as recited in claim 1, wherein a maximum of amplitudes corresponding to signal points of the at least 8-signal-point modulation in an I-Q plane is equal to an amplitude of a signal point of the phase shift keying in the I-Q plane.

13. A transmission apparatus comprising:

first means for periodically and alternately subjecting an input digital signal to first modulation and second modulation to convert the input digital signal into a pair of a baseband I signal and a baseband Q signal, the first modulation and the second modulation being different from each other, the first modulation being at least 8-signal-point modulation, the second modulation being phase shift keying;

second means for outputting the pair of the baseband I signal and the baseband Q signal;

wherein the phase shift keying provides periodically-spaced symbols which represent corresponding portions of the input digital signal in terms of differences between phases of the periodically-spaced symbols;

wherein the at least 8-signal-point modulation assigns logic states of the input digital signal to respective signal points for a first symbol in response to a signal point used by a second symbol of the shift keying which precedes the first symbol; and wherein said first symbol is demodulated by using said second symbol which is not a known prescribed pattern but a part of information transmitted by said transmission apparatus.

14. A transmission apparatus as recited in claim 13, wherein the symbols provided by the phase shift keying are used as a pilot symbol for estimating at least one of (1) a transmission path distortion and (2) a frequency offset.

* * * * *

UNITED STATES PATENT AND TRADEMARK OFFICE

CERTIFICATE OF CORRECTION

PATENT NO. : RE43,338 E
APPLICATION NO. : 12/764512
DATED : May 1, 2012
INVENTOR(S) : Yutaka Murakami et al.

It is certified that error appears in the above-identified patent and that said Letters Patent is hereby corrected as shown below:

In the Specifications
Column 1, Line 9:
Please add the following paragraph: --Notice: This is a first reissue patent of U.S. Patent No. 7,362,824. A second application for reissue of U.S. Patent No. 7,362,824 is U.S. Patent Application No. 13/916,324, filed June 12, 2013.--.

Signed and Sealed this
Twenty-third Day of July, 2013

Teresa Stanek Rea
*Acting Director of the United States Patent and Trademark Office*